(12) United States Patent
Gardner et al.

(10) Patent No.: US 6,907,310 B2
(45) Date of Patent: Jun. 14, 2005

(54) PRODUCTION AND VISUALIZATION OF GARMENTS

(75) Inventors: James Holden Patrick Gardner, Bo'ness (GB); Timothy Bryan Niblett, Glasgow (GB)

(73) Assignee: Virtual Mirrors Limited, Edinburgh (GB)

( * ) Notice: Subject to any disclaimer, the term of this patent is extended or adjusted under 35 U.S.C. 154(b) by 0 days.

(21) Appl. No.: 10/466,851

(22) PCT Filed: Jan. 18, 2002

(86) PCT No.: PCT/GB02/00205

§ 371 (c)(1),
(2), (4) Date: Jul. 18, 2003

(87) PCT Pub. No.: WO02/057964

PCT Pub. Date: Jul. 25, 2002

(65) Prior Publication Data

US 2004/0049309 A1 Mar. 11, 2004

(30) Foreign Application Priority Data

Jan. 19, 2001 (GB) .............................................. 0101371

(51) Int. Cl.⁷ .............................................. G06F 19/00
(52) U.S. Cl. ...................................................... 700/132
(58) Field of Search ................................ 700/130, 131, 700/132, 134, 135; 345/419, 619, 629, 632, 633, 634

(56) References Cited

U.S. PATENT DOCUMENTS

| | | | |
|---|---|---|---|
| 4,486,774 A | 12/1984 | Maloomian | |
| 4,539,585 A | 9/1985 | Spackova et al. | |
| 4,598,376 A | 7/1986 | Burton | |
| 4,605,294 A | 8/1986 | Bourdier et al. | |
| 4,916,624 A | 4/1990 | Collins et al. | |
| 4,926,344 A | 5/1990 | Collins et al. | |
| 5,163,006 A | 11/1992 | Deziel | |
| 5,530,652 A | 6/1996 | Croyle et al. | |
| 5,680,528 A | 10/1997 | Korszun | |
| 5,757,661 A | 5/1998 | Surville | |
| 5,850,222 A | 12/1998 | Cone | |
| 5,956,525 A | 9/1999 | Minsky | |
| 6,307,568 B1 | 10/2001 | Rom | |
| 6,473,671 B1 * | 10/2002 | Yan | 700/134 |

FOREIGN PATENT DOCUMENTS

| | | |
|---|---|---|
| EP | 838167 A1 | 4/1998 |
| EP | 933728 A2 | 4/1999 |
| FR | 2586182 A1 | 2/1987 |

(Continued)

*Primary Examiner*—John J. Calvert
*Assistant Examiner*—Brian Kauffman
(74) *Attorney, Agent, or Firm*—Drinker Biddle & Reath LLP

(57) ABSTRACT

Methods and systems for modelling and modifying garments, providing a basis for integrated "virtual tailoring" systems and processes. The garment models provided relate specific design points of the garment to specific body regions in terms of explicit 3D relationship rules, enabling garments to be modified holistically, by a constrained 3D warp process, to fit different body shapes/sizes, either in order to generate a range of graded sizes or made-to-measure garments, for the purposes of visualization and/or garment production. The methods described further facilitate the generation of 2D pattern pieces by flattening 3D representations of modified garments using a constrained internal energy minimization process, in a manner that ensures that the resulting pattern pieces can be assembled in substantially the same way as those of the base garment. The methods enable the visualisation and/or production of bespoke or graded garments, and garment design modifications, within an integrated virtual tailoring environment.

63 Claims, 34 Drawing Sheets

FOREIGN PATENT DOCUMENTS

| | | |
|---|---|---|
| FR | 2746601 A1 | 10/1997 |
| JP | 59-106069 | 6/1984 |
| JP | 08-044785 | 2/1996 |
| JP | 09-223247 | 8/1997 |
| JP | 09-258651 | 10/1997 |
| WO | WO 89/08409 A1 | 9/1989 |
| WO | WO 97/10573 A2 | 3/1997 |
| WO | WO 00/53040 A1 | 9/2000 |
| WO | WO 00/70976 A1 | 11/2000 |
| WO | WO 00/77744 A1 | 12/2000 |
| WO | WO 01/11886 A1 | 2/2001 |
| WO | WO 01/30189 A2 | 5/2001 |
| WO | WO 01/35342 A1 | 5/2001 |
| WO | WO 01/46911 A1 | 6/2001 |
| WO | WO 01/75750 A1 | 10/2001 |
| WO | WO 01/86512 A2 | 11/2001 |

* cited by examiner

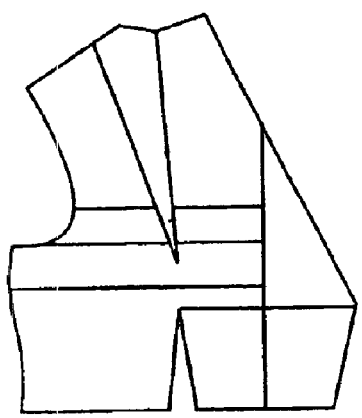
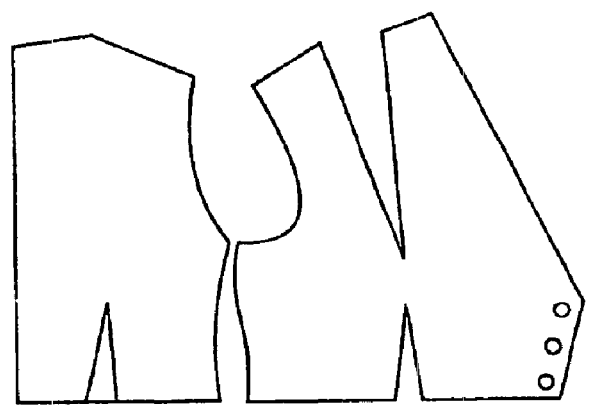
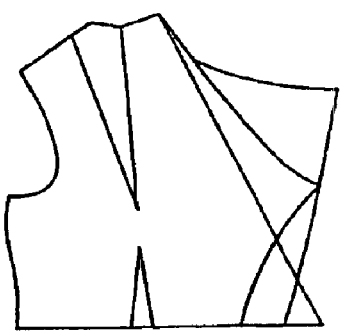
Fig. 17

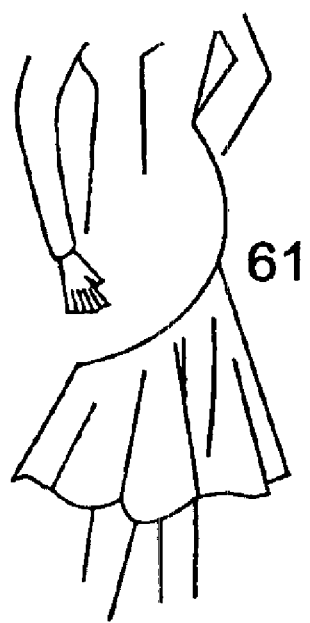
Fig. 26a                    Fig. 26b

PRODUCTION AND VISUALIZATION OF GARMENTS

1 FIELD OF THE INVENTION

This invention relates to methods and systems for the production and visualisation of garments based on three-dimensional representations.

2 BACKGROUND TO THE INVENTION

2.1 Production

Hitherto, garments have been designed and made by converting conceptual sketches into 2D pattern pieces that are cut and sewn to produce a 3D garment. This process has relied on the judgement and skill of designers and pattern cutters to create the 2D pattern pieces such that they will make up in 3D in an appropriate size and shape and with the effect intended by the designer.

Typically, this process will initially be carried out in a single standard size. The prototype garment is tried on a model matching that standard size as closely as possible. The pattern pieces are then adjusted, and further trial garments made until a satisfactory result is achieved. The garment design will then have to be converted into a range of sizes. Each pattern piece must be modified, for each desired size of garment, to produce a finished garment of the desired size and shape in a process known as "grading". This is not a simple scaling up or down of dimensions, but requires adjustment of both the sizes and the proportions of the various pattern pieces. Once again, this relies on the skills and experience of particular individuals.

The further step of automating the production of made to measure garments is very largely confined to a limited range of men's suits and shirts. Automated production of women's made to measure garments is almost totally unknown.

It will be appreciated that these traditional processes can be inexact, require high levels of individual skill and experience, and are time-consuming and costly to carry out. Moreover, it is inherent in the nature of sized clothing that the end result is rarely an ideal fit on a substantial proportion of eventual customers. In addition, efforts to produce sized clothes that fit a higher proportion of eventual customers frequently have the side effect of eliminating designs that are closely fitting to the body, due to the likelihood of the lower tolerances involved reducing the numbers of consumers that the garment will fit. Such closely fitting designs can, however, be very pleasing.

It is desirable therefore to provide improved methods for converting a conceptual design into producible garments, and for producing sized versions. However, a further and radically new end result is to provide a rapid and low cost method of producing pattern pieces that, when sewn together, will fit individual consumers on the equivalent of a "made to measure" basis.

2.2 Visualisation

A further field of interest in relation to the present invention is that of remote selling. Garments have been sold for many years through mail-order catalogues. This relies on the use of catalogue illustrations, which, even with the availability of high-quality colour photography and reproduction, can give only a partial impression of the appearance of the article. It is also not practicable to illustrate the garment from more than one, or at most two, viewpoints in conventional mail order catalogues. Further, there are practical limitations in showing a given style in the variety of textiles and accessories that are available.

In recent years, it has become possible to sell clothes remotely via the Internet or on CDs or DVDs. (These three methods of selling are referred to hereafter as selling through Virtual Clothes Shops). However, techniques for displaying the garments on offer in Virtual Clothes Shops are essentially those of catalogue selling and illustrations are bas d on the use of a limited number of photographs.

The reason for the limitation is that traditional methods of showing the model wearing the clothes from a range of viewpoints or in a range of textiles and accessories is costly to organise and, in the case of the Internet, carries the additional disadvantage of making the images slow to download if broadband communications are not available.

There is therefore a requirement to improve the visualisation of garment designs by enabling a garment to be viewed in the round from any desired angle, by enabling the garment to be viewed at will in any desired size, colour or material, by enabling different garments to be shown together, (e.g. a blouse underneath a jacket) and possibly from different suppliers, or by enabling the consumer to see a visualisation of the garment as worn by her/himself.

Some of these visualisation elements are only possible, and all of them work better, in a 3D environment.

3 SUMMARY OF THE PRIOR ART

There have been numerous prior art efforts to apply computing techniques to the design, modelling, visualisation and production of garments. However, none of these prior proposals have satisfactorily addressed the practical issues involved in providing an integrated suite of technologies suitable for creating a commercially useful "virtual tailoring" environment. A commercially useful virtual tailoring environment, as envisaged by the present Applicant, would enable a base garment (a) to be modified automatically to fit a particular consumer on a made to measure basis, or (b) to provide graded sizes of the base garment, for the purposes of visualisation and/or production.

The present applicant has determined that four quite separate factors need to be present in order to create such a commercially useful environment.

1. A type of process that can be completely automated once an initial 3D representation of the base garment has been created.
2. A process that can produce realistic and satisfactory visualisation of the base garment, the modified garment and of consumers.
3. A process that can output pattern pieces of at least comparable quality to those produced through conventional technology.
4. A process that can with equal facility produce pattern pieces for any known 3D shape of a model or a consumer, thereby allowing the pattern pieces of mass customized sized clothes or of bespoke clothes to be created with equal facility.

If all of these four factors are present the process acquires comprehensive commercial value.

Carginan [Carignan et at., 1992](see "References") describes processes for virtual garment creation and virtual dressing, and references an earlier paper [Weil, 1986] concerning cloth modelling. The system described by Carignan is implemented in the "Stitch" software referred to herein, which also uses a physical simulation system disclosed by [Baraff and Witkin, 1998].

U.S. Pat. No. 4,926,344 discloses a computerised system for creating garment patterns or garments. This document teaches a system which is essentially an attempt to create an expert system replicating the existing skills of pattern cutters and graders. A knowledge base of generic garment styles is used, together with the identification of key measurements in the 2D pattern pieces of these styles. Measurement of corresponding key dimensions of an individual's body are taken by tape measure or equivalent. The pattern piece key measurements are adjusted according to a set of rules to produce modified pattern pieces that should make up into a garment to fit the individual.

Published European Patent Application EP-A-0,933,728 discloses a system for producing three-dimensional images of persons wearing selected garments, in which the representation of a base garment is modified to fit images of a given person. This document also discusses the possibility that the representation of the modified garment could be used to generate pattern pieces for producing the modified garment. In the system described, pattern pieces of the base garment are deformed to collide with a 3D human model and with each other, and are then virtually sewn together. This provides a 3D representation of the base garment fitted to a first human model. The first human model is deformed to match the shape/size of a consumer, and the base garment is modified simply by deforming the 3D representation of the base garment in a similar manner to the first human model. The 3D representation of the modified garment can be used for visualisation ("virtual try-on"), and/or as the basis for generating 2D pattern pieces for production of the modified garment. The document describes the 2D pattern pieces being generated by developing the corresponding 3D parts of the 3D representation into 2D shapes. This system relies on colliding base garment pattern pieces with the standard body shape and modifying the resultant 3D representation of the base garment on the basis of a geometrical deformation of the standard body shape to match a consumer body shape. This relatively simple approach provides no guarantee that the modified garment will preserve the design or style of the base garment, or that pattern pieces developed from the modified 3D representation of the garment will be capable of being assembled to produce an acceptable garment. The inherent limitations of the described process means that it fails to meet the requirements set out in (1), (2), (3) and (4) above.

Methods for warping 3D shapes are known as such from, for example,

[Sederberg and Parry, 1986,

Duchon, 1977,

Powell, 1995,

Kass et al., 1987]. The process of developing 3D shapes into 2D shapes (flattening) is similar to texture mapping, see for example [Ma and Lin, 1988a, Bennis et al., 1991]. In [Okabe et al., 1992] there is a description of an iterative process for flattening in relation to apparel, but it does not address the problem of ensuring that a plurality of pattern pieces will fit together in an acceptable manner.

4 THE PRESENT INVENTION

In accordance with a first aspect, the present invention provides a method of processing information relating to a garment, the method comprising: providing or obtaining information defining the 3D shape of a garment designed to fit and as worn by a first body of a person of a first size and shape;

providing or obtaining data defining the first body's size and shape in 3D without the garment in question;

identifying defined body regions on the first body;

identifying one or more design points on the garment, each design point being related in 3D to one or more of the defined body regions of the first body;

providing relationship rules that define the said 3D relationships between said design points and said body regions;

storing data defining the garment, the design points, the body regions, and the relationship rules.

The use of relationship rules defining the 3D relationships between the design points and the body regions enables the garment to be modelled in a manner that captures the style and fit of the garment as created by the Designer of the base garment and as implemented through the skills of the Pattern Maker.

The method may be applied so as to modify a garment to fit a second body by the additional steps of: providing data defining a second body size and shape in three dimensions;

processing said data to identify the defined body regions of the second body; and modifying the data for the garment to defin a modified 3D garment which fits the second body by bringing each design point into a predetermined relationship with the associated b dy region of the second body through the use of the relationship rules.

This application of the method provides the basis for producing bespoke or graded garment representations and/or pattern piece information for use in the visualisation and/or production of modified versions of a base garment.

The method may also be used for modifying one or more aspects or features of the design of the garment by varying the relationship rules relating to said one or more aspects or features.

In accordance with a second aspect, the present invention provides a method of producing pattern piece information from a three-dimensional representation of a garment, said three-dimensional representation having been formed by modifying data defining an original set of pattern pieces representing an original garment of one size to produce data defining a modified set of pattern pieces representing a modified garment of another size;

the method comprising performing an unwrapping operation on the 3D representation of the modified garment, the unwrapping operation comprising (a) defining parameters and constraints of each of the original pattern pieces in the garment, and (b) performing a numerical optimization to determine values of the parameters which minimize the internal energy in each pattern piece in the modified garment within the constraints defined in relation to the original pattern pieces.

The invention provides an approach to modelling garments in a manner that provides a basis for fully integrated "virtual tailoring" systems and processes. Garment models provided by the invention relate specific design points of the garment to specific body regions (and/or construction lines related to body regions) in terms of explicit 3D relationship rules that nevertheless incorporate the traditional tailoring knowledge of clothing in a form that will be readily recognisable to those practiced in the art of conventional tailoring. This enables garments to be modified holistically, in 3D, to fit diff rent body shapes/sizes (either in order to generate a range of graded sizes or made-to-measure garments) in a manner that satisfies the relationship rules and thus preserves the design and styling of the base garment, for the purposes of visualisation and/or garment production. Design "tweaks" can also be effected by modifying the relationship rules for a particular garment. The invention further facilitates the generation of 2D pattern pieces from 3D representations of modified garments in a manner that ensures that the resulting pattern pieces are properly matched to one another and can thus be sewn together in substantially the same way as those of the base garment.

Other aspects and preferred features of the invention are defined in the claims appended hereto.

5 SUMMARY OF PREFERRED FORMS OF THE INVENTION

In the preferred forms of the invention, the method comprises core steps, followed by one or more options, the core steps being:

1. Obtaining a garment design to fit a person, tailor's dummy or a mannequin of a first size and shape ("The Model"), the garment design comprising a number of pattern pieces.
2. Capturing or creating a 3D image of The Model unclothed or in underclothes or a leotard.
3. Capturing or creating a 3D image of The Model wearing the design. The 3D image of the model wearing the design may be created by means of virtual dressing of the model using a computer program to construct a representation of the clothing draped to fit the Model.
4. Adjusting the pose of The Model in the two 3D images to be the same, if the pose differs.
5. Creating a 3D representation of the garment, by removing the model from the 3D image of the model wearing the garment.
6. Identifying on each pattern piece on the captured or created 3D representation of the garment (or on the 2D pattern pieces prior to assembly) one or more critical points of the design ("design points").
7. Identifying a series of pre-defined areas on the body of The Model ("body regions").
8. Relating each design point to one or more body regions through rules that have general applicability when the garment is to be made or shown on other persons differently shaped or tailor's dummies, or mannequins. Most commonly these other persons or differently shaped tailor's dummies or mannequines will be a consumer interested in the clothes. We refer hereafter to all subsequent wearers of the clothes under the generic title "The Consumer".
9. As as optional addditional step amending the relationship rules to create a new design.
10. Storing data and/or images defining the pattern pieces, the design points, the body regions relevant to the garment in question, and the generic rules relating the design points to the body regions in a computer or other device capable of digital recording.
11. Obtaining data defining and normally visually representing the body size and shape of The Consumer in three dimensions.
12. Conforming the pose of The Consumer to that of The Model wearing the garment in question.
13. Processing the data to identify the defined body regions of The Consumer.
14. Applying the rules to modify the 3D representation of the garment by means of a constrained warp of th garment which brings each design point into a defined 3D relationship with the associated body region of the second body while preserving important relationships between body and garment which reflect the design of the garment. This modified garment fits The Consumer and by virtue of the rules being satisfied conforms to the design intention of the garment designer.
15. Flattening the pattern pieces on the modified 3D representation of the garment to form a modified set of 2D pattern pieces suitable for garment construction. The flattening process generates, by means of a constrained energy minimization process, a set of pattern pieces which are as close as possible to the modified 3D representation when sewn and draped on The Consumer. These modified 2D pattern pieces enable the physical garment to be constructed.

This core method may be applied in a variety of scenarios.

Scenario 1 To create sets of pattern pieces for a range of different sizes, possibly using the database of representative shapes and sizes.

Scenario 2 To create tweaks to the design by modifying the relationship rules.

Scenario 3 To use the original 3D representation of the garment, or data modified to fit a selected range of models, to display the clothes in a 3D Catalogue with the facility to exchange fabrics and trim as requested and to see different combinations of clothing worn together. Such 3D Catalogue may be used in sales within the trade and to consumers.

Scenario 4 To use the modified data representing The Consumer wearing the garment to produce instructions for the creation of the pattern pieces that, when sewn together, will produce an actual garment to fit The Consumer.

Other features and advantages of the present invention will be apparent from the following description and claims.

6 DESCRIPTION OF PREFERRED EMBODIMENTS

Embodiments of the present invention will now be described, by way of example only, with reference to the drawings, in which:

FIGS. 1 to 29 illustrate garment pattern pieces, including design points in accordance with the invention, as follow:

FIG. 1: basic woman's bodice block

FIG. 2: main pattern pieces for woman's jacket bodice

FIG. 3: main pattern pieces for man's jacket bodice

FIG. 4: bust darts

FIG. 5: Shoulder blade dart

FIG. 6: dart concealed in back panel finishing on shoulder line

FIG. 7: dart concealed in back panel finishing on armhole

FIG. 8: simple internal front waist dart

FIG. 9: half dart/half cut on front piece

FIG. 10: Combined bust and waist dart

FIG. 11: Armhole and sleeve

FIG. 12: Halter neck bodice

FIG. 13: Yoke with additional fullness

FIG. 14: Saddle yoke

FIG. 15: Styles of collars

FIG. 16: Revers

FIG. 17: Wraps

FIG. 18: Capes

FIG. 19: Tight fitting sleeve block

FIG. 20: Kimono sleeve

FIG. 21: Raglan sleev

FIG. 22: Three basic shapes of skirts

FIG. 23: Two panelled skirt

FIG. 24: Fullness in gores

FIG. 25: Hip Yokes

FIG. 26: Flares

FIG. 27: Godets

FIG. 28: trouser block

FIG. 29: Crotch point;

and in which

6.1 CAPTURE OF THE BODY OF THE MODEL

6.1.1 Use of Articulated Deformable Models

Figure 1:
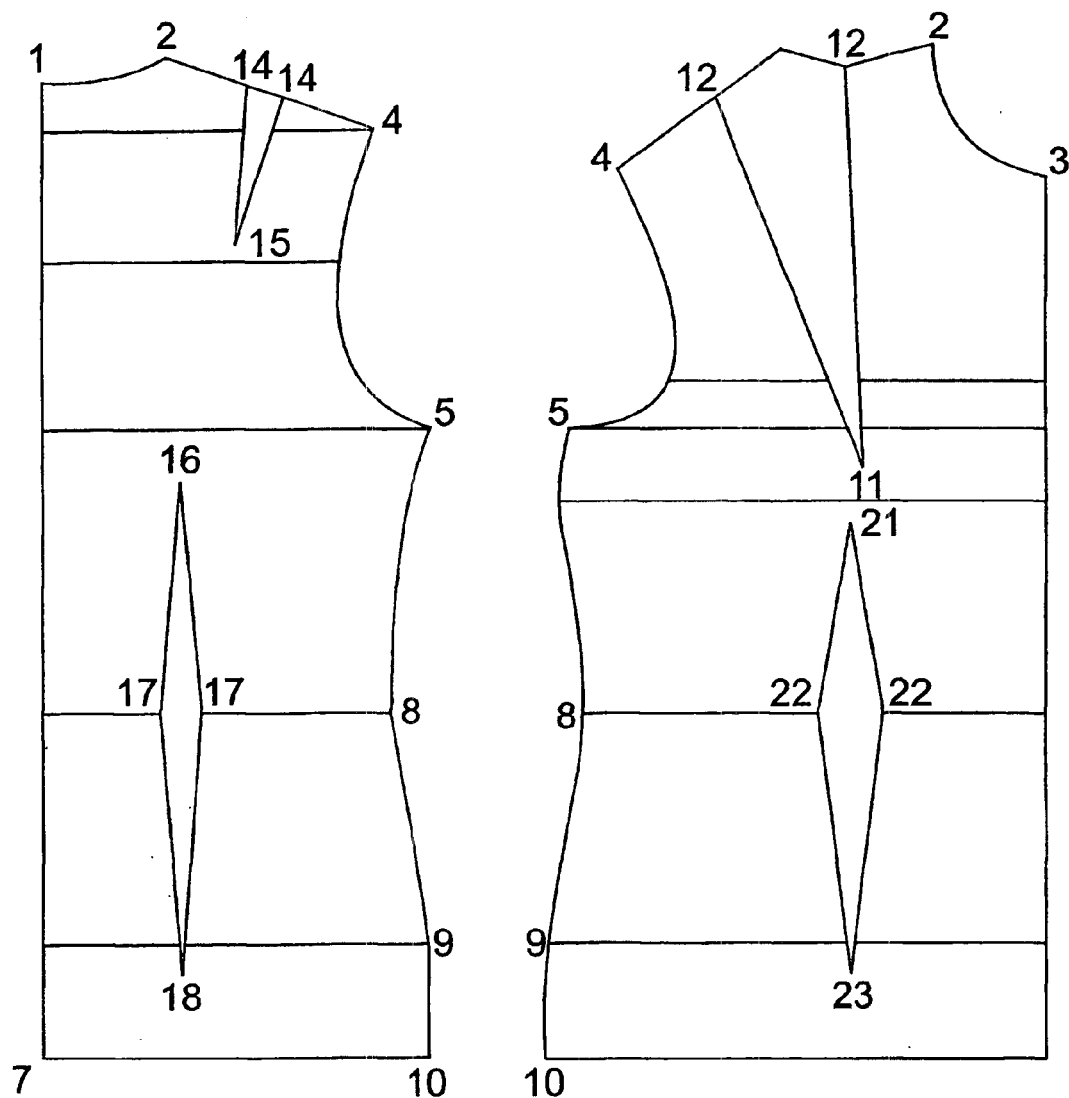

The invention requires the use of suitable 3D models of the bodies of the Model and Consumers etc. Preferred embodiments of the invention use Articulated Body Models (ADMs).

An ADM has the following components
1. A standardized triangle mesh, with significant body regions and areas indicated on the mesh.
2. A skeleton, with associated pose information.
3. A mapping between mesh vertices and the skeleton, so that the mesh can be posed given a pose specification.
4. A conformation function, as a map of the vertices, which specifies how vertices are deformed from their rest position. The conformation is constant under change of p se.

The advantages of using an ADM are:
1. The ADM can be conformed allowing two ADMs to be matched with little computational effort.
2. When body data is captured by a 3D digital body scanner such as the body scanner by Wicks & Wilson Limited of Basingstoke, England, missing data from the scan, such as hands, feet, and the back of the head can be interpolated in a plausible fashion by the ADM.
3. The location of body regions can be defined on the ADM, and are therefore located on the scanned body by virtue of the conformation function.

6.1.2 Conformation of Scanned Data to an ADM 3D digital bodyscanners are known and commercially available, for example the bodyscanner by Wicks & Wilson Ltd of Basingstoke, Hampshire, England, which is being used by Virtual-Mirrors Limited in the development of this technology. Briefly stated, such scanners take a series of digital photographs from multiple viewpoints, by the use of multiple cameras and/or movable mirrors, to produce digital data providing a map of the body's surface and/or a garment's surface in three dimensions, together with data defining visual characteristics (colour, reflectance etc) of the person and/or the garment at each point.

The Wicks & Wilson bodyscanner is preferably modified to better suit the 3D Tailoring process by incorporating additional lighting, by raising the upper cameras to capture the tops of the shoulders (a critical area of clothing) and for the capture of The Consumer as described below, and by the incorporation of a head scanner to obtain a good quality 3D image of the face of The Consumer.

We are presented with a 3-D model of a human subject, mannequin or tailor's dummy captured by a body scanner such as that produced by Wicks & Wils n. Conformation fits the scanned data to a "standard" 3-D human articulated deformable body model (ADM).

The preferred method of conformation is a variation on the elastic matching technique of [Bajcsy and Broit, 1982], as refined by [Bajcsy and Kovacic, 1989] and [Cachier et. al., 1999]. This approach is effective if all scans are conducted in a standard posture, as is the case with the Wicks & Wilson scanner.

The conformation algorithm takes as input a triangulated mesh A representing the scanned data, and a triangulated mesh B representing the ADM. The output is a warping function $\phi:R^3 \rightarrow R^3$, which transforms B to A. The algorithm takes advantage both of the standard posture imposed by the scanner, and of the shape of the human body. Both mesh A and mesh B have a "front" and "back" defined, which determines which triangles lie on the front, and which on the back, of the body. For mesh A this is determined at scan time.

Figure 30:
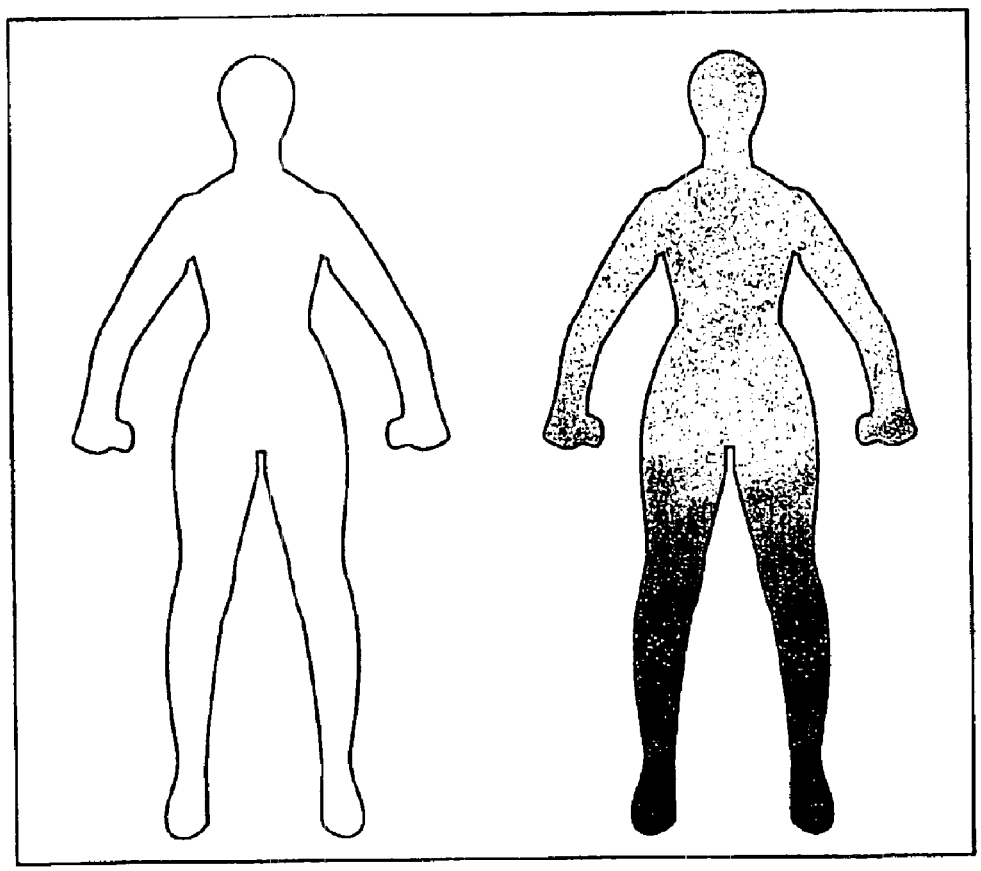
FIG. 30 shows a frontal silhouette and distance map of a body

The algorithm proceeds as follows:
1. Initial alignment of the meshes is determined by taking moments. Each triangular facet $i \in 0 \ldots N$ in a mesh is assigned a center $c_i$ and a a weight $w_i$ which is its normalized area. If the center of the mesh is $C=1/N\Sigma c_i w_i$, then the covariance matrix $M=1/N\Sigma_i w_i(c_i-C)^T(c_i-C)$. The principal axes for the mesh can be found as the eigenvectors $u_k$, k=0, 1, 2 of M, and the extents of the aligned bounding box are the extreme values of the project-ions. Mesh B can then be roughly aligned to mesh A by translating, rotating and scaling its bounding box to that of A.
2. An initial transform is determined by using frontal silhouettes of A and B. The silhouttes are an orthographic projection of the meshes A and B, with pixels inside the silhouette being white, those outside black. By frontal we mean a full frontal view of the meshes, as shown in FIG. 30. Use of silhouettes is advantageous sinc 2-D registration is significantly faster than registration in 3-D, and is less liable to get stuck in local minima. The binary frontal silhouettes are converted into 2-D "distance images", with each pixel in a map having a (floating point) value corresponding to its distance from the perimeter of the silhouette. A distance map is shown in FIG. 30. A multi-resolution elastic warp, as described in [Cachier et at., 1999] then maps the silhouette of B to that of A, which in turn induces a map $\sigma:R^3 \rightarrow R^3$. This map operates in the x-y plane (with the z-axis coming out of the page.
3. The map of 2 can be extended to the z axis by mapping the front of B to the front of A, and similarly for the back. In each case the mapping is the direct mapping of z-values. The induces a warp $\sigma$ from B to A.
4. A full elastic warp, as described in [Cachier et al., 1999] is performed to bring A and B into registration with the warp $\sigma$ as the initial approximation.

The accuracy of the conformation process depends on the initial degree of similarity between the scanned mesh A and the (ADM) mesh B. A refinement of the above process involves selection amongst several different meshes B as the starting point for the conformation. These meshes correspond to different basic body shapes. The precise choice is determined by higher order moments of the silhouette image of step 1.

6.2 Capture or Creation of a 3D Representation of the Garment

The shape of the garment can be extracted from such a scan, and the lines of the pattern pieces identified directly from the scan.

An alternative, and preferred, method of capturing the 3D representation of the garment is to provide a digital representation of the 2D pattern pieces, sized to fit The Model, and then to create a virtual representation of the garment in 3D by meands of a program such as Stitch from Size8 Software of Jacksonville, Fla. The advantage of the virtual representation is that the relationship betewen the 2D pattern pieces and the 3D representation is known with precision, which increases the accuracy of the later unwrapping stage, and there is no missing data, which inevitably occurs with a 3D scan.

The step-by-step process reflected in the preferred embodiment is set out below. Those practiced in the art will appreciate that there are many alternative approaches to the detail of the procedure; the preferred option in the current version of the technology has been selected on the grounds that the input procedures draw on the existing skills and experience of Pattern Makers. Pattern Makers are expected to be prime users of this part of the system. The procedure in the preferred embodiment 1. The pattern pieces are exported into a front end to the Stitch system in digital form. This may be from a CAD system such as those created by Gerber Technology Inc, Lectra Systemes or Investronica Sistemas or from the simple scanning and digitising of a paper pattern piece.
2. The pattern piece is given a discrete name (e.g. centre back)
3. The horizontal construction lines (bust line, waist line, hip line) are added if not already present. Where more than one construction line is present this enables the pattern piece to be orientated at the correct angle.
4. The Design Points (as further discussed below) are added utilising a set of numbers. Where, as in most cases the Design Points lie on a seam the Design Point is entered on both pattern pieces.
5. The system will accumulate a knowledge base of garments where known pattern pieces are assembled into virtual garments.
6. The combination of the name of the pattern piece, the construction lines (where present), the matching of the Design Points on different pattern pieces and the knowledge base of completed garments makes it possible for an initial rough juxtapositioning of the pattern pieces to be carried out automatically, although the capability to carry out a manual juxtapositioning would be present as a fall-back.
7. The Garment Maker part of Size8s overall program then draws the pattern pieces together into a virtual garment.
8. The Stitch element of Size8s overall program permits the entry of data about the characteristics of the fabrics that are in use. Using this data the Stitch program drapes the garment onto a "collision object", for example a digital version of the tailor's dummy for whom the base garment was made. The program also handles the "self collisions" where the garment comes into contact with itself.

6.3 Fit of the Model Image where a Bodyscanned 3D Representation of the Garment is Used Where the 3D representation of the garment is created by a bodyscanner (rather than the preferred embodiment of creating the 3D representation from digitised pattern pieces) the next stage is to fit the image of the unclothed/underclothed image of The Model into the same pose as when she was wearing the garment. This is preferably done as follows.

Given a 3D image of the Model clothed (image A), and an Articulated Deformable Model (ADM) of the Model, captured from a 3D scan of the Model unclothed or in underclothes, we fit the ADM to image A in a 3-step process as follows 1. A rough alignment of the ADM with image A is achieved by posing the ADM to the image.
2. A more precise alignment is achieved automatically, by determining a fit by posing the ADM to maximise the degree to which the ADM fits inside the clothes.
3. The shap of the ADM is adjusted in those are as where it extends outside the clothes, and this adjustement is recorded, so that a corresponding adjustment can be made to the customer ADM at a later stage.

The output of this fit, is the same detailed knowledge of the relationship between the body of the Model, and the article of clothing worn by the Model as obtained from the preferred emobodiment.

6.4 Identification of Body Regions

In both the preferred and the alternative approach to creating a 3D representation of the garment it is then necessary to define significant points, referred to herein as "body regions" on the body of The Model. The body regions define features of the body that are significant in 3D tailoring of any garment.

The preferred method of obtaining the body regions for both The Model and subsequently The Consumer is by performing a 3D digital scan in the same manner as described above, but capturing The Model or The Consumer unclothed, or in underclothes or a leotard.

The person's body regions can be defined by manual input, such as by pointing and clicking on appropriate parts of displayed images. It is preferred, however, to define the body regions automatically by software.

In this connection, it should be noted that the term "body region" (rather than, for example, "body point" or "anatomical landmark") is used herein to indicate that a body region need not be a precise point in the geometric sense, but rather a recognised region or zone of the human body (though usually quite small in area) such as the centre front waist or the end of the shoulder, such points being variable, and dependent on the garment being worn for their precise location.

A key concept in the overall 3D Tailoring-process is that the fitting of the clothes to the consumer's body is treated holistically. This is described further in the section on the warping process. At this point we merely observ that a very precise definition of a specific point for any body region is not critical to the inventive process.

Within this context, the required body regions can be determined automatically by examining the 3D data representation for example to define the waist as the minimum girth within the central part of the body, and the hips as the maximum girth within the lower central part.

Suitable algorithms for such analysis already exist, from example from TC2 Inc in USA, from University College London in England, and from Cyberware Inc in USA (in conjunction with the US Apparel Research Network).

The preferred embodiment, however, is to manually identify the location of the set of body regions on a large database of scanned consumers; perhaps 1000 men and 1000 women. The locations of a set of body regions on a newly scanned consumer is then carried out by warping the shape of the nearest database subject to the shape of the new consumer. This will automatically transfer the location of the body regions to the consumer.

This technique will identify the body regions with adequate accuracy for the process. The process would be further enhanced by the use of statistical "average" body models rather than a sample of actual 3D images of real people, as the database will have been specifically constructed so as to minimise the differences between the sample and the consumer.

The statistical models used can be termed "eigen-bodies", after the term "eigenface", introduced in kirby and Sirovich, 1990,

[Turk and Pentland, 1992] and the term "eigenhead" introduced in [Atick et al., 1996b, Atick et at., 1996a].

We produce eigen-bodies from range images, in a manner similar to [Atick et al., 1996a], by taking advantage of the Articulated Deformable Body model representation used (see below for details) to isolate the trunk of the body, and to represent the shape as a cylindrical projection from the principal axis of the trunk of th body, in a manner similar to that used in [Lee et al., 1995] for faces, mapped cylindrically from a Cyberware scanner.

6.5 An Introduction to the 3D Tailoring Methodology

Section 6.1 defined the preferred embodiment of the process by which a 3D representation of The Model would be created. Section 6.2 defined the preferred embodiment of the process by which the 3D representation of a garment being worn by The Model would be created. Section 6.3 dealt with the pose of The Model and Section 6.4 how the body regions of The Model (often called "landmarks") would be automatically located.

The following sections (6.6 to 6.8) describe the means by which the garment is defined in terms of the 3D relationship that exists between the 3D representation of the garment and the 3D representation of The Model.

Section 6.6 provides an overview of the central features of the overall process in a manner that will be readily understandable to those familiar with conventional 2D based clothing processes. This section of the description of the overall process draws together the core elements of the overall process in conventional tailoring terms.

Section 6.7 sets out how the process handles the central elements of garments namely 1. The looseness (or "comfort") at bust/chest, waist, hip and hem.
2. The balance of the garment, focusing on the neckline and shoulder of a bodice, the crown of the sleeve, and the waist for skirts and trousers.
3. The methods of fullness reduction that can be used.
4. Symmetry and how unsymmetrical bodies can be handled when (as is normally the case) the garment is designed to be symmetrical.

Section 6.8 provides a detailed explanation of how the processes described above are applied and can be used to tailor a wide range of garment types and/or garment features in 3D.

Section 6.9 describes the extension of the basic 3D Tailoring processes to facilitate modifications to the design of the base garment. ("3D Designing")

Section 6.10 reviews the steps to date and provides a brief overview of the computing processes in terms that will be comprehensible to those skilled in the art of pattern making but unskilled in the arts of –3D programming and 3D computer representations.

The last sections (6.11, 6.12 and 6.13) contain a detailed explanation of the computing techniques used to create the effects and the desired end results described in the earlier sections. In applying these processes the programs utilise the 3D related knowledge about individual garments whose nature has been described in the earlier sections.

Terminology

Pattern Makers We refer hereafter to those familiar with the traditional 2D Pattern Making process as Pattern Makers, though others familiar with this element (e.g. some designers) can fulfil the role ascribed hereunder to Pattern Makers.

Base garment The term "base garment" means a first instance of a physical garment created conventionally from, for example, a designer drawing.

The Model The human model, the tailor's dummy or the mannequin for whom the base garment has been made so that (often following a number of iterations of the base garment) good or perfect fit of the base garment on The Model is obtained.

Body regions Body regions are a defined set of body regions that are used in the process. A list is provided that would be adequate for a large majority of garments.

Body point The centre of a body region.

Design points Design points are a set of defined locations that are important to the fit and/or style of a garment. Their relation to one or more body regions defines the 3D locations of the design points.

Looseness Looseness (sometimes called "comfort") is the amount of spare space between the garment and the body. The looseness at the bust (or chest), waist, hip and hem are important to the 3D definition of the garment.

3D tailoring rule A defined and constant relationship that should be maintained as far as possible between a given feature of the garment and one or more body regions on the body of any wearer.

The "base garment" as the starting point for use of the technology The use of the technology described in this application commences once a base garment has been created and digitised representations of the pattern pieces used to make that base garment have been obtained. These pattern pieces may simply have been obtained from a digitiser. Alternatively they may have been obtained from a CAD system (such as those created by Gerber Technology Inc, Lectra Systemes and Investronica Sistemas) that has digitised the pattern pieces.

The bias or angle of the grain of the fabric on the base garment pattern pieces would be included in (or added to) these digitised representations of the pattern pieces. The bias or grain of the individual pattern pieces is maintained in the modified garment.

If the base design is a radically new design then the base design may best be created by conventional Pattern Making technology. Once this first instance has been created all modifications to that base design (3D Design), and the subsequent creation of sized and bespoke garments (3D Tailoring) can be carried out using the overall process defined herein.

It should be noted, however, that a Designer might introduce significant modifications to an existing 3D representation of a base design obtained, for example, from a library of 3D representations of base designs. This modified design effectively becomes a new "base design" for the next season without the need for creating a physical piece using conventional Pattern Making technology.

Procedure for the input of the design points In the preferred embodiment the Pattern Maker would use a simple points editor, of a type that will be apparent to those skilled in the art, to mark the design points on the digitised pattern pieces. Where (as is very common) design points occur on a seam, it is beneficial to indicate the location of the design points on all the pattern pieces that are joined at the seam.

The optimum time to input the design points (together with the 3D tailoring rules) is immediately following the creation of the base design as this will permit the use of the full range of 3D Clothing Technology processes. Technically speaking, however, the design points and 3D definitions of the relationship between the design point and the associated body region(s) can be input at any time.

6.6 The Core Elements of the 3D Tailoring Process

There are six core elements that cumulatively create an inherently simpler method of tailoring. The six core elements are:

1. The 3D relationships between The Model and the base garment. The concept that a garment can be satisfactorily defined by the 3D relationship between a 3D representation of The Model and a 3D representation of the base garment. (The process by which this is achieved has been described in 6.1 and 6.2 above.)
2. A holistic approach to tailoring. The concept that 3D Tailoring should work holistically, in other words that the fit of the garment on The Model and on any consumer should be approached from the perspective of the fit of the garment on the body as a whole. A consequence of this approach has been (a) to limit the number of body regions to which specific 3D relationships are established (b) to permit body regions (rather than body points) to be used, thereby introducing the controlled degree of flexibility that is necessary if a holistic view of the fit of the garment on individual bodies is to be obtained
3. The focus on the key elements of how a garment fits onto a body. The focus on these key elements (looseness, balance, fullness reduction and symmetry) creates a solid base for the much simplified process for tailoring that has been invented.
4. Minimalisation. The computing processes used to implement the 3D Tailoring process have been built on the principle of minimising (a) the changes to the base garment needed to warp the base garment to fit the shape of the wearer of the modified garment; (b) to the pattern pieces needed to physically create the garment when the warped representation is unwrapped. The effect of the minimalisation procedures is to maximise the degree to which the features of the design are maintained.
5. Lack of ambiguity in the definition of the garment. The 3D process requires that unambiguous definitions of the 3D relationships be given. For example, a skirt hem on The Model might be three inches above the knee, fifteen inches below the hip. The definition of the 3D relationship needs to state whether it is the actual distance above the knee or below the hip or the proportionate distance as found with The Model. This method of thinking will be novel but at the same time will be of perceived relevance to Pattern Makers.
6. Sets of pre-defined options. The sections set out below refer throughout to the process under which "A drop down menu could provide the following options." The concept that underlies this process is that Pattern Makers would benefit from the availability of a set of options when the 3D location of a particular design point was to be described. In the preferred embodiment individual users would define the design points that were most useful to them from an overall menu. A correspondence table would relate these to a Master List of design points with attached options. The number of design points in the Master List would no doubt grow with time, as would the options that could be considered. It should be noted that this sixth point is not critical to the operation of the 3D Tailoring process. The preferred embodiment herein described should, however, simplify the task of creating 3D definitions for users.

6.7 The Three Initial Elements of a Garment

The three initial elements of a garment are (a) The degree of looseness at the bust (chest), waist, hip and hem (b) The balance of the garment (c) The symmetry of the garment (in most cases)

The manner in which 3D Tailoring handles each of these elements is now examined. In each case it will be seen that these "framework" elements can be very simply defined in terms of desired end results. There is great value in this since the desired "end result" is the first (rather than the last) step in the overall process.

6.7.1 Looseness of Garments

The description set out below first covers the method by which the looseness (or comfort) of the base design is to be maintained in the modified garment.

The topic is subdivided into

1. Bust (or chest) looseness
2. Waist looseness
3. Hip looseness
4. Hem looseness In all cases the default would be that the distribution of looseness between the back and the front would be as found with The Model.

6.7.1.1 Bust or Chest Looseness

A drop down menu defining the bust or chest looseness could provide the following options.

1. Maintain the same looseness at the back and the front as found with The Model.
2. Increase (or reduce) the bust or chest looseness at the back and/or the front by x cms if the bust or chest measurement is greater (less) than y cms.
3. Increase (or reduce) the bust or chest looseness at the back and/or the front by x cms for every y cms the bust or chest measurement is greater (less) than z cms.
4. Increase (or reduce) the bust or chest looseness in the same manner as prescribed for a related Eigen shape.
5. As defined through a parameter input screen permitting Pattern Makers to define rules in simple terms that are automatically turned into machine understandable rules.
6. Increase (or reduce) the bust or chest looseness in the same manner as prescribed for a related Eigen shape.

6.7.1.2 Waist Looseness

There is a difference in the rule sets to be used depending on whether the waist is fitted or not. With a fitted waist the rule set follows the same principles as for the bust (or chest), namely in the preferred embodiment a drop down menu providing the following options.

1. Maintain the same looseness at the back and the front as found with The Model (default)
2. Increase (or reduce) the waist looseness at the back and/or the front by x cms if the waist measurement is greater (less) than y cms.
3. Increase (or reduce) the waist looseness at the back and/or the front by x cms for every y cms the waist measurement is greater (less) than z cms.
4. Increase (or reduce) the bust or chest looseness in the same manner as prescribed for a related Eigen shape.
5. As defined through a parameter input screen permitting Pattern Makers to define rules in simple terms that are automatically turned into machine understandable rules.

With a non-fitted waist, the objective is to mirror the shape or character of the garment as shown found with The Model. The bust (or chest) and the hip configurations are established. A drop down menu for a non-fitted waist defining its 3D location could provide the following options 1. The line of the garment down the side seam is maintained in the closest manner (i) that is consistent with the other requirements of the garment and (ii) that allows a minimum of x cms additional space (default). This is a simple and straightforward approach that normally allows the underlying computing processes described below to produce a satisfactory result. The defined process will automatically ensure that the garment is larger than the waist (by the defined amount), even if this necessitates changes to the line of the garment.
2. Increase (or reduce) the minimum additional waist looseness at the back and/or the front by x cms if the waist measurement is greater (less) than y cms.
3. Increase (or reduce) the minimum additional waist looseness at the back and/or the front by x cms for every y cms the waist measurement is greater (less) than z cms.
4. Use the Eigen based procedure described above.
5. As defined through a parameter input screen permitting Pattern Makers to define rules in simple terms that are automatically turned into machine understandable rules.

6.7.1.3 Hip Looseness

The procedures and options are the same as for the bust/chest.

6.7.1.4 Hem Looseness

The procedures and options are the same as for the bust/chest.

6.7.2 The Balance or Hang of the Garment

In a bodice or dress the correct natural hang comes from (a) a correct neckline for the garment and (b) the correct balance between the front and the back panels.

With a sleeve the correct hang is achieved when it naturally falls in a perpendicular line from the shoulder point, or in some cases with a slight swing forward.

Trousers and skirts simply need to have horizontal waists to hang nicely though the line of a skirt (often called the hang in the trade) is very important from a fashion perspective. The height of the waistline of the garment can be derived from its position on The Model.

In this section the balance or hang of the bodice and sleeve are considered on the basis that correct balance or hang is nearly always fundamental rather than the subject of fashion considerations. The line of the skirt is discussed under section 6.8.

The body regions, construction lines and the associations between design points and body regions/construction lines as discussed below are summarised in Tables 1 and 2 appended to the present description. In FIGS. 1 to 29, the numerals identify the design points as discussed below and summarised in Table 2.

6.7.2.1 The Neck Lines

Design points 1, 2, 3 (1A, 2A, 3A)

Neck lines with 2D Tailoring Achieving a correct neckline is a critical and quite difficult task in conventional 2D Tailoring. Taken together with the shoulder line (next section) a correct neckline is indispensable if a good balance of a garment is to be achieved. (The "balance of a garment" is the outcome from the correct distribution of material between back and front panels.) A correct neckline is also an indispensable starting point for a well fitting collar. A poorly fitting collar also affects the dcolletage, revers etc.

Neck lines with 3D Tailoring Obtaining a correct neckline (and shoulder line—see next section) is far simpler using 3D Tailoring since the correct end result is very easy to define. Since 3D Tailoring deals first with end results, the 3D process circumvents all of the difficulties of building up pattern pieces to obtain the correct end result.

There is a "body neck line" that runs through the nape point, the two side neck points and the front neck point. The width, depth and inclination of these points are varied (it is this that causes all the complexities working in 2D).

The neckline of the design will very frequently follow this line. However, when it does not do so the neckline of the garment, (in particular the back of the neck line from where the garment hangs) will bear a clear relationship to the "body neckline". (For example with a built up neck line the top of the bodice is extended above the body neckline with the top of the built up neckline at the nape and side neck design points being definable distances above the nape and side neck body regions.)

Figure 2:
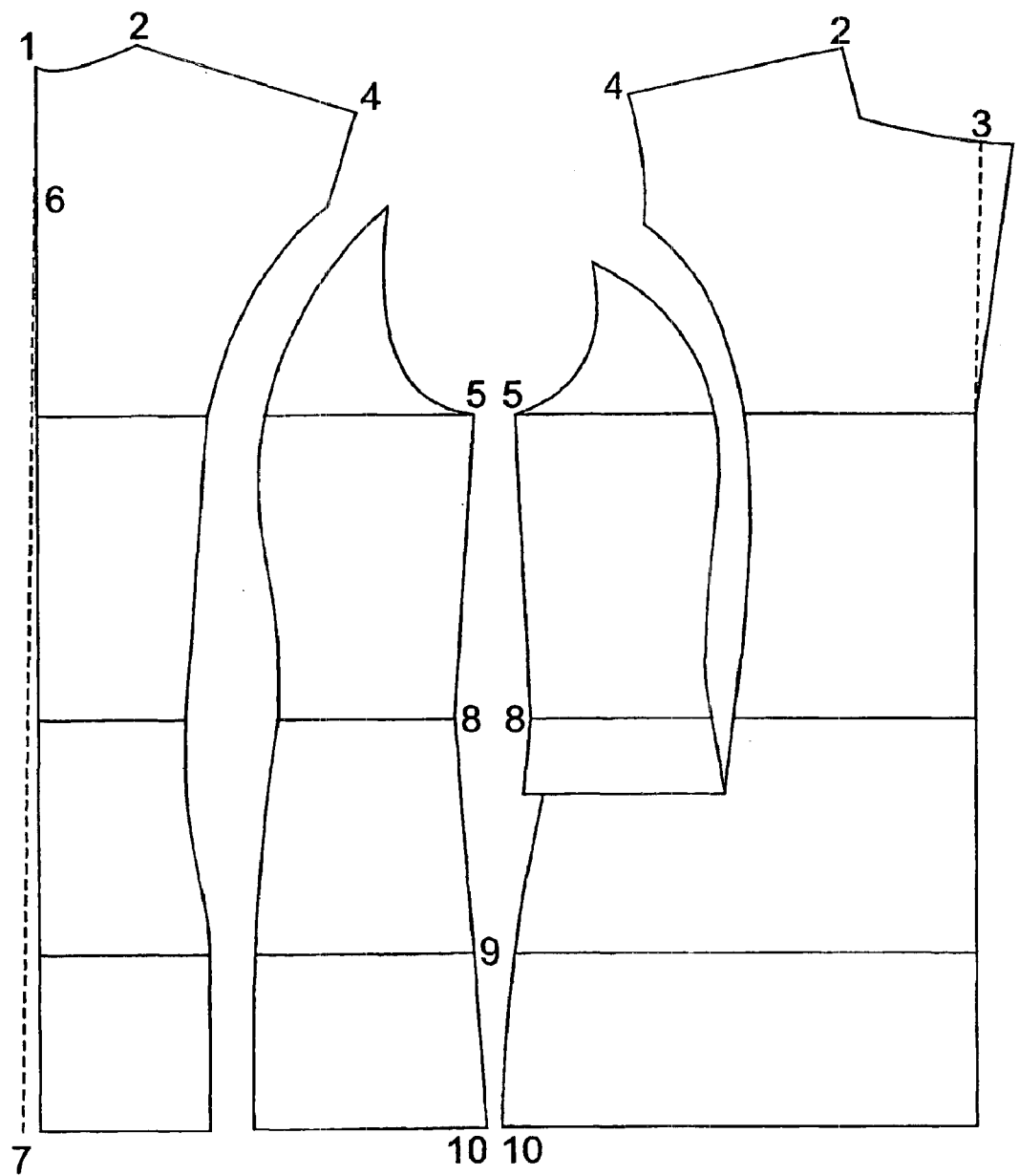
Figure 3:
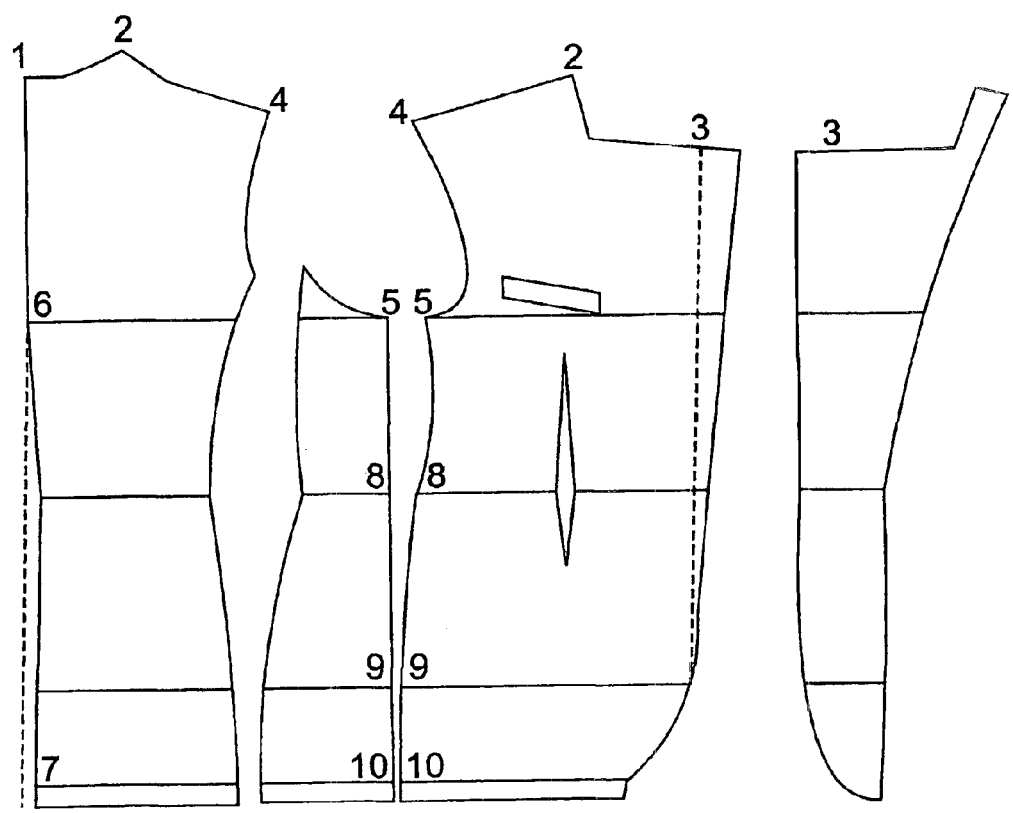
Figure 4A:
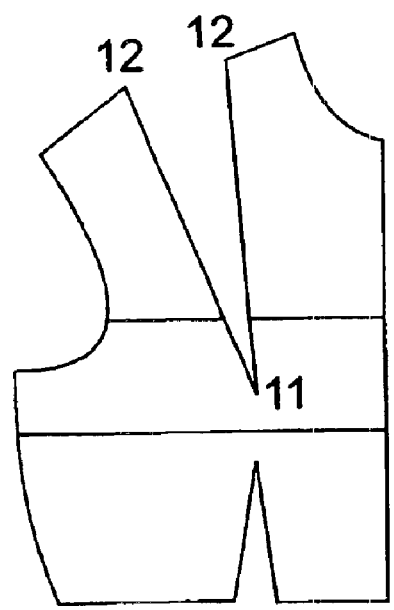
Figure 4B:
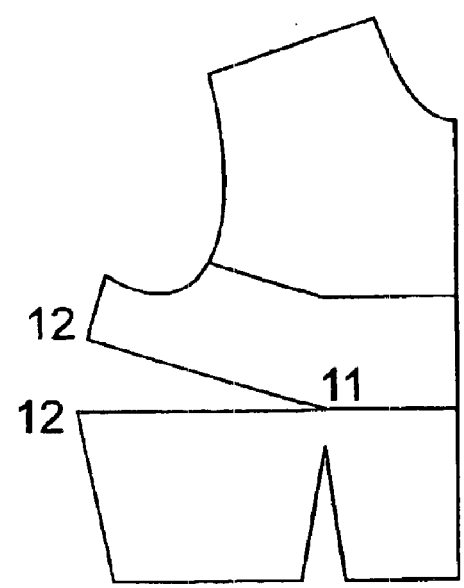
Figure 5:
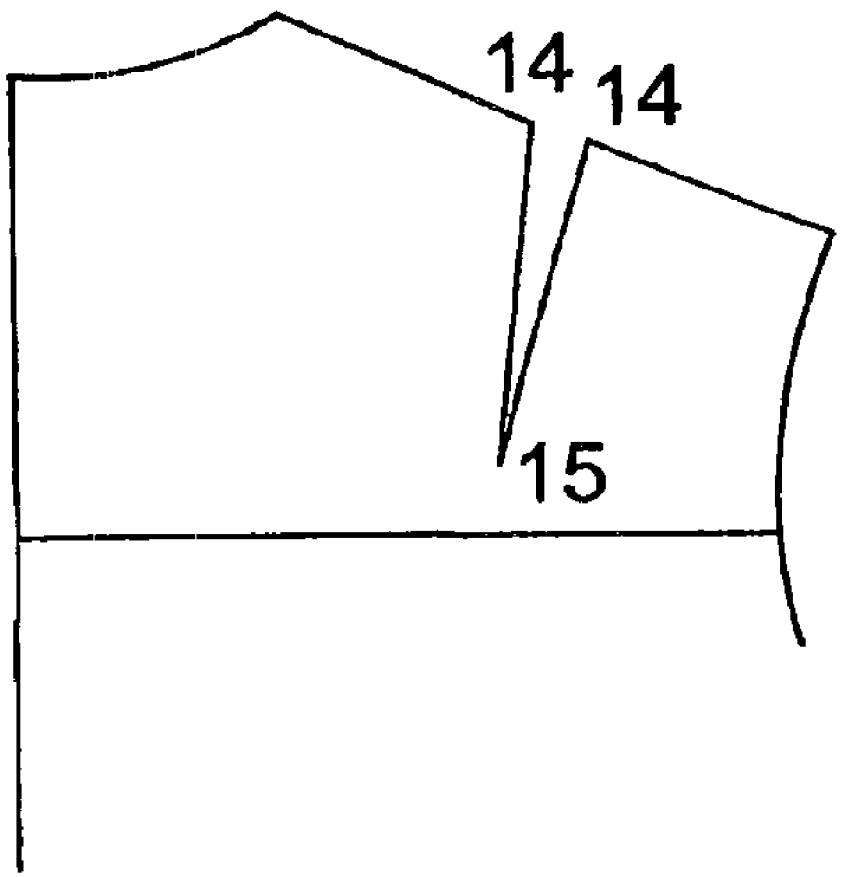

Design point 1 is the nape point on the bodice as illustrated on the FIGS. 1, 2 and 3. The nape point is normally found on the garment exactly at the nape body region. The function of the nape point is to define the 3D location of the back centre of the collar, the 3D location of the back of the neckline and the 3D location of the top of the Centre Back Line.

A drop down menu could provide the following options.

1. The nape design point is immediately outside the nape body region.
2. The nape design point has the same relationship to the nape body region as exists in the 3D representation of the base garment on The Model.
3. The nape design point's relationship can be defined through a parameter input screen permitting Pattern Makers to define rules in simple-terms that are automatically turned into machine understandable rules.

(NOTE: It is anticipated that additional specified options will be added as further experience with the new 3D Clothing Technology and 3D Tailoring rules is obtained. This evolution in the detailed options that will have been preprogrammed applies to all the examples set out below.)

Design Point 2 is the side neck point. A drop down menu defining its 3D location could provide the following options.

1. The side neck design point is immediately outside the side neck body region.
2. The side neck design point has the same relationship to the side neck body region as exists in the 3D representation of the base garment on The Model.
3. The side neck design point's relationship can be defined through a parameter input screen permitting Pattern Makers to define rules in simple terms that are automatically turned into machine understandable rules.

Design Point 3 is the front neck point. A drop down menu defining its 3D location could provide the following options.
1. The front neck design point is immediately outside the front neck body region.
2. The front neck design point has the same relationship to the front neck body region as exists in the 3D representation of the base garment on The Model.
3. The front neck design point's relationship can be defined through a parameter input screen permitting Pattern Makers to define rules in simple terms that are automatically turned into machine understandable rules.

6.7.2.2 Shoulder Lines

Design points 2 and 4 The 3D location of the shoulder line is on the top of the shoulder. In a large percentage of cases the shoulder seam will follow this line. A garment may, however, have a shoulder seam (i.e. a seam running close to the top of the shoulder) with a defined relationship to the shoulder line. In other words, the shoulder seam and the shoulder line are deliberately designed to be different. This would be defined by the relation of the shoulder seam to the shoulder line with The Model.

The shoulder line is defined by a relationship to the body region on the side of the neck (the side neck body region) and the body region at the end of the shoulder (the end shoulder body region).

Design Point 4 is the shoulder point. The location of the shoulder point is determined in the same way as the nape point, with the same three options for identifying the location. In this case the location of the shoulder point will be quite variable, depending on the nature of the design.

The function of the shoulder point from the fit perspective (together with the neck point) is to define the shoulder line. A drop down menu defining the location of the shoulder-line could provide the following options for the shoulder end and the neck end of the shoulder line.
1. The shoulder end of the shoulder seam starts at a given vector distance from the shoulder point.
2. The shoulder end of the shoulder seam starts at the vector distance in from the shoulder point as found with The Model.
3. The neck end of the shoulder seam starts at a given vector distance in from the neck point.
4. The neck end of the shoulder seam starts at the vector distance from the neck point as found with The Model.
5. As defined through a parameter input screen permitting Pattern Makers to define rules in simple terms that are automatically turned into machine understandable rules.

NOTE: Shoulder pads are reflected in an increased height of the shoulder point over the shoulder body region.

6.7.2.3 The Crown of a Sleeve

Design Points 4 and 5 (FIGS. 1, 2 and 3) The crown of the sleeve has a size, a shape and an incidence (angle). If these three elements are correct the sleeve will hang correctly. In addition the armhole will fit individual wearers well and be comfortable for them.

With 3D Tailoring the size, shape and incidence of the crown are determined by

The 3D location of the shoulder point (a defined relationship to the shoulder body region)

The 3D location of the underarm point (a defined relationship to the underarm body region)

The shape of the crown as found on The Model

The shoulder point (Design Point 4) has been defined above.

Design Point 5 is the underarm point. It is defined in relation to the underarm body region that lies immediately beneath the centre of the armhole. Those expert in the trade intuitively knows the body region and the procedures for locating body regions that have been described above will be applied.

A drop down menu could provide the following options for defining the underarm point by reference to the underarm body region.
1. At the underarm body region
2. The same distance and vector relationship to the underarm body region as found with The Model.
3. As defined through a parameter input screen permitting Pattern Makers to define rules in simple terms that are automatically turned into machine understandable rules.

We now examine five crown related situations that are well known to those practiced in the traditional Pattern Making art.

(We express the problems that might arise in terms of why it might be found that a crown had insufficient depth or length. Those practiced in the art will readily extrapolate to other related situations, for example a crown that had excessive depth or length.)

Figure 19:
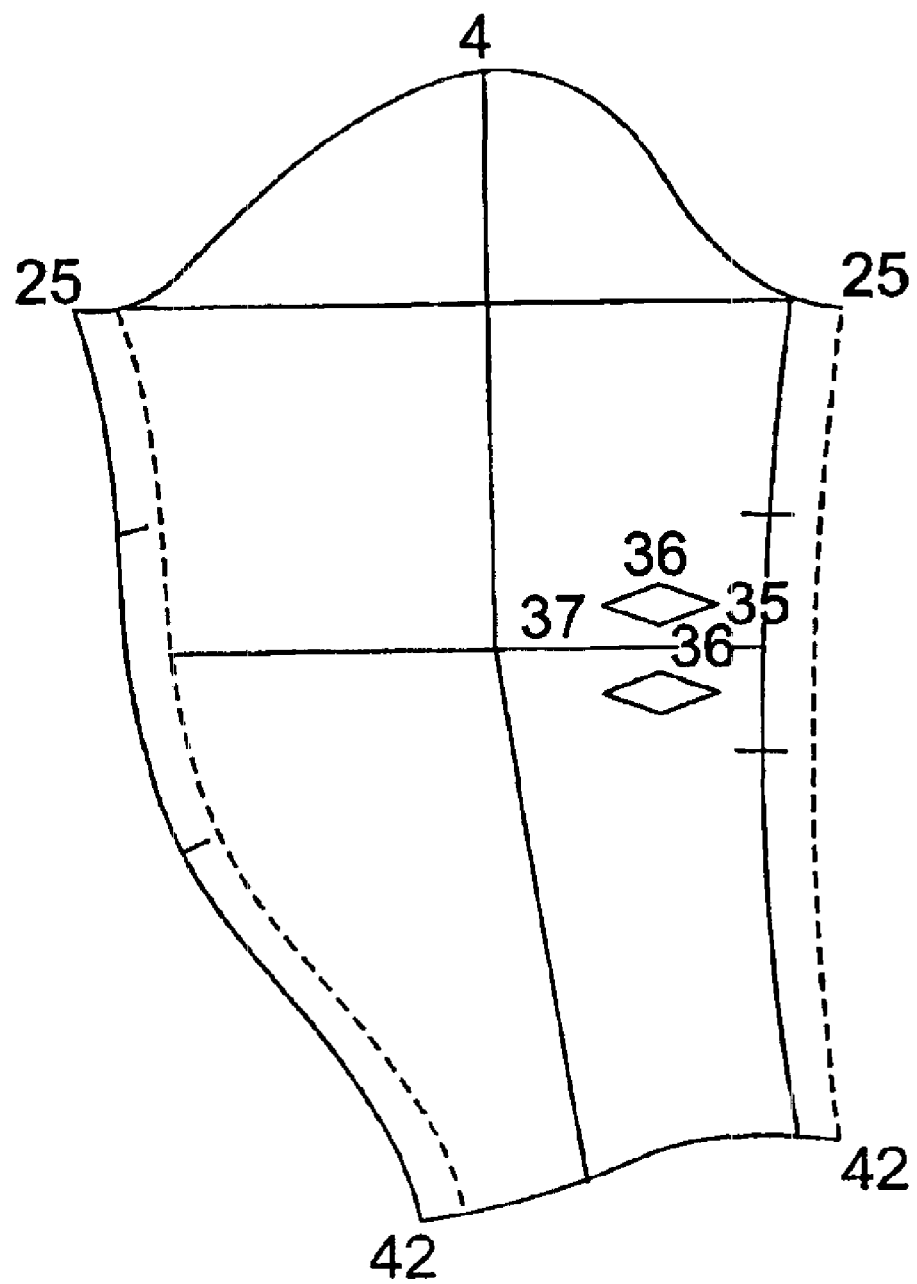
Figure 20:
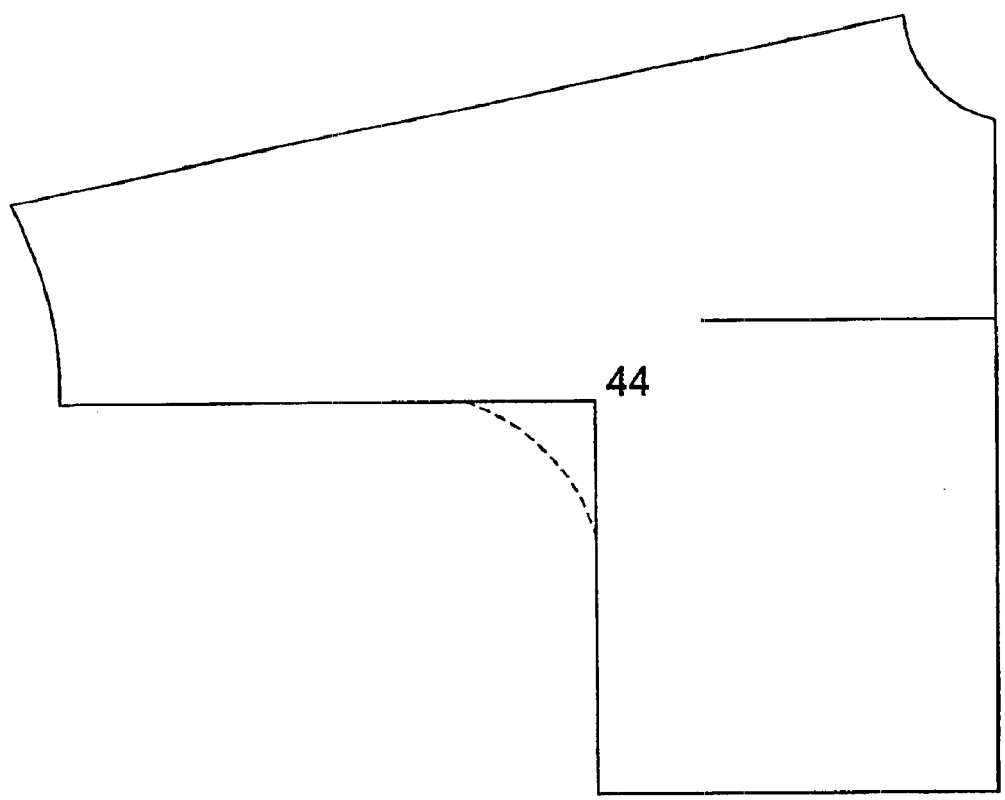
Figure 21:
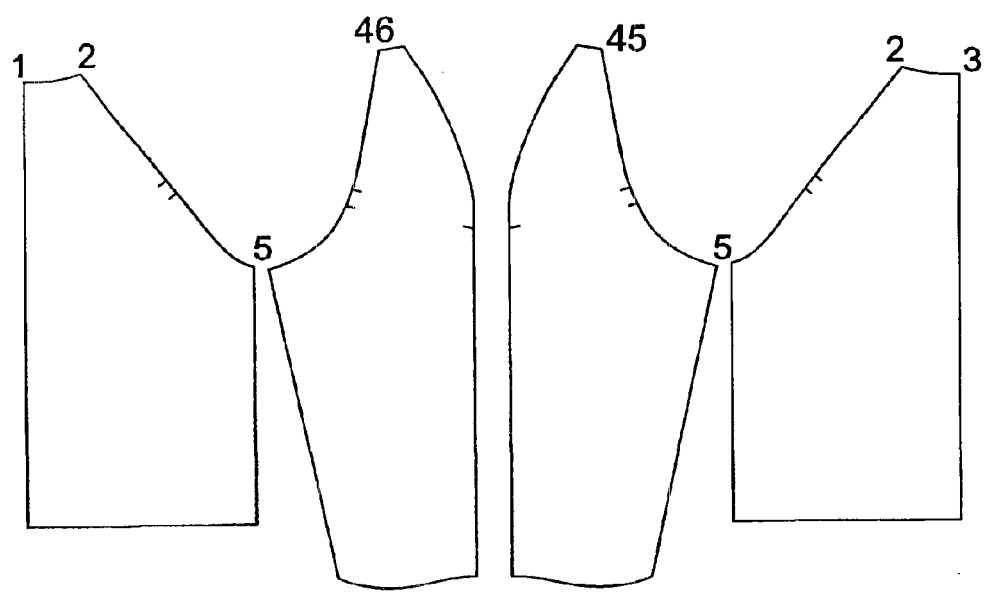

1. A higher or squarer shoulder point than normal. This is a function of the design of the garment or of the person wearing it and is recognised by the 3D Tailoring process through the 3D location of the shoulder design point. The higher than normal location of the shoulder point automatically adds depth to the crown preventing insufficient depth in the armhole.
2. A padded or stiffened shoulder. This also creates a higher or squarer shoulder. The same simple adjustment mechanism based on the 3D location of the shoulder design point applies.
3. A very short shoulder seam. This is a function of design with accommodations being required in the base design in order to accommodate the shortage in length consequent upon the armhole being more nearly vertical. In 3D Tailoring the depth problem will have been accommodated by the Pattern Maker as part of the process of creating a base design. When the 3D Design function is being used drop down menus would provide selections of methods by which the loss of length can be compensated (e.g. by adding looseness to the bust/chest, thereby creating greater armhole width).
4. An overdeveloped arm muscle. The upper arm measurement plus 12–13 cms is the traditional 2D yardstick for the size of the armhole. The upper arm measurement is, however, merely a readily measurable proxy for the musculature of the shoulder, the principle being that muscular shoulders normally accompany the muscular upper arms. With 3D Tailoring the garment is draped around the actual body of the consumer. The musculature of the shoulder automatically creates extra width in the armhole. (The "fitting" process in 3D is equivalent to a physical 2D fitting where a tailor would adjust the crown of the sleeve to the individual shape of the customers shoulder to ensure optimum size of armhole and/or hang of the sleeve.
5. Moving a seam back. FIG. 19 shows how (in order to improve the fit) a seam has been moved back by transferring the dotted edge from the front to the back of the seam in the 2D pattern piece. This changes the position of the underarm point relative to the underarm body region on The Model. The 3D definition of the underarm design point is maintained as the base garment is modified, maintaining the desired location of the underarm seam.

6.7.3 Symmetry

Garments are generally symmetrical with the large exception of wraps at the front of jackets and the much smaller exception of deliberately asymmetrical garments.

Wraps are a defined area where symmetry does not occur and is discussed later. It does not affect the basic "framework" discussed herein.

The program will expect the garment to be symmetrical when there is no design exception. The question then arises as to how this principle is affected if, as is nearly always the case, the body wearing the clothes is not symmetrical. To illustrate the principles involved we examine the very common situation of a consumer with one shoulder lower than the other.

In this case there are two tailoring choices. The first is to insert a pad in the lower shoulder to equalise the height. This solution is not, however, always appropriate.

The alternative is to raise the top of the back panel at the lower shoulder. This leaves the shoulder lower but provides a much better hang for the back of the garment.

With 3D Tailoring the garment is fitted holistically to the body and therefore automatically creates the required reduction in fabric underneath the lower shoulder.

This provides a further example of the inherent simplicity of the 3D Tailoring approach.

6.8 Garment Types

We now examine the operation of 3D Tailoring in the context of a number of garments. The garments covered are
1. Bodices (6.8.1) This is the element covering the upper trunk of the body that is part of jackets, shirts, cardigans as well as sleeveless bodices and capes. The section also includes bodice features such as yokes, collars, revers (lapels), and wraps. It is also a convenient location in the document to describe how 3D Tailoring handles elements not specific to bodices such as buttons and buttonholes, pockets, facings and linings.
2. Sleeves (6.8.2)
3. Skirts (6.8.3)
4. Dresses (6.8.4)
5. Trousers (6.8.5)

6.8.1 The Bodice

FIG. 1 is a diagram of a basic woman's bodice block. Its appearance will be very familiar to Pattern Makers. It contains the main fit related design points for a bodice.

In the preferred embodiment the location of these design points would be graphically indicated on the digitised pattern pieces. Alternatively the Pattern Maker would add the points onto the digitised pattern pieces manually using a points editor.

We start by identifying the centre back, side seam and centre front line. (See FIG. 1, 2 or 3.)

6.8.1.1 The Centre Back Line

Design Points 1, and 7 (FIG. 2) Design Point 1 is the nape point and has been defined above. Design Point 6 is the point on the Centre Back line from where any centre back slant begins. A drop down menu defining its 3D location could provide the following options.
1. On the Centre Back line midway between the Bust Line and the Nape Point (default for women)
2. On the intersection of the Centre Back line and the Chest line (default for men).
3. Maintaining the same relationship as a proportion between the nap line and the bust (chest line) as found in the base design on The Model.
4. Maintaining the same absolute distance down from the nape line as found in the base design on The Model.
5. Maintaining the same absolute distance up from the bust/chest line as found in the base design on The Model.
6. As defined through a parameter input screen permitting Pattern Makers to define rules in simple terms that are automatically turned into machine understandable rules.

Design Point 7 identifies the hemline point on the back seam. It may incorporate a slanted centre back seam. A drop down menu defining its 3D location could provide the following options.
1. Directly beneath the nape point (Design Point 1) on the hem line
2. As defined through a parameter input screen permitting Pattern Makers to define rules in simple terms that are automatically turned into machine understandable rules.

6.8.1.2 The Side Seam

Design Points 5, 7, 8, and 9 (FIGS. 1,2, and 3) Design Point 5 is the underarm point and is at the top of any side seam. Its 2D location on the pattern pieces is therefore very easy to establish. (See for example Design Point 5 on FIGS. 1,2, and 3.)

Its 3D location is defined in relation to the underarm body region and is normally directly beneath it or slightly behind it, the distance down from the underarm body region being a function of the design and of the construction of the sleeve.

A second Design Point (Design Point 5A) could also be used for Kimono and Raglan sleeves whose Design Point 5 is also very commonly "forward" of the line directly beneath the underarm body region.

The options for distance beneath the underarm body region would be
1. A fixed distance beneath the underarm body region.
2. The same distance beneath the underarm body region as found in the base design on The Model.
3. As defined through a parameter input screen permitting Pattern Makers to define rules in simple terms that are automatically turned into machine understandable rules.

The options for a point "forward" or "back" from directly beneath the underarm body region would be
1. A fixed distance forward or back
2. The same distance forward or back as found with The Model.
3. As defined through a parameter input screen permitting Pattern Makers to define rules in simple terms that are automatically turned into machine understandable rules.

Advanced 2D Tailoring may vary the location of the side seam (that runs up to the underarm point) to reflect the shape and size of individual figures. Experience with the application of the invention may lead to sophisticated rules being developed for very unusual body shapes and sizes.

However, it is likely that satisfactory results in such situations may be simply and automatically obtained through the combination of
1. A holistic approach to the warping process that seeks to reconcile the various rules in one overall 3D Tailoring process; and
2: The inherent flexibility introduced into the process by the use of body regions (as opposed to body points).

Design Point 8 is th point of maximum width of a concealed side seam dart. It is almost always on the waist construction line. A drop down menu defining its location could provide the following options.

1. On the waist construction line (default)
2. The same distance from the waist construction line as found on The Model
3. A fixed proportion of the distance from the waist construction line to Design Point 5 (the underarm point)
4. As defined through a parameter input screen permitting Pattern Makers to define rules in simple terms that are automatically turned into machine understandable rules.

Design Point 9 is the point of intersection of the side seam with the hip construction line.

Design Point 10 is at the end of the side seam on the hem. It should be at the same distance beneath the waist construction line as the centre back hem line point (Design Point 7)

6.8.1.3 The Centre Front Line

Design point 3 The centre front line drops down directly beneath the front neck point. (See definition above.) Note that the centre front line is critical to the definition of many style and fit features.

6.8.1.4 Bust Darts

Design points 11 and 12 (FIGS. 4A and 4B) Design Points 11 and 12 define the start and the end of any bust darts.

The 2D locations of the two design points are obvious on the pattern pieces.

Design Point 11 locates the 3D position of the point nearest the nipple and is defined by reference to the nipple body region. The logic of this relationship is that the dart is taking out the fullness of the cloth needed as a result of the curvature of the body. The biggest reductions need to be made at the main curves in the figure, namely the shoulder blades at the back (for men and women) or the bust at the front (for women).

Design Point 12 can be in any of six different places and each of them has the effect of taking fullness out of the cloth in the bust region.

Design Point 12 is always on a seam or at an angle to another dart. The six basic bust dart endings (Design Point 12) are 1. On the shoulder (FIG. 4A)
2. On the side seam (FIG. 4B) or armhole
3. In the waist or hem
4. In the neckline
5. In the Centre Front line
6. Concealed in seams of pattern pieces.

Combinations of darts (e.g. a shoulder and an underarm bust dart) are used as the two smaller darts can produce a better result than one larger one.

In theory different dart positions ensure the same fit i.e. the same amount of contour shaping. In practice, however, some dart positions are more suitable and becoming for certain types of figures. In advanced 3D Tailoring it is expected that variable options will be introduced as described below.

With the above in mind the preferred embodiment would include the following options to allow the Pattern Maker to define the number of bust darts to be used and the 3D location of Design Points 11 (11A, 11B etc.) and Design Points 12 (12A, 12B etc.)

Number and Type of Bust

1. The pattern pieces for the base design will normally indicate the number and types of bust darts that will be used.

2. In very advanced 3D Tailoring the Pattern Maker may (should the Pattern Maker so wish) include supplementary darts (or alternative bust dart endings via the location of Design Point 12) that were not present in the base design but which could be used for particular shapes of individual consumers. The Pattern Maker would use a manual points editor capability to indicate on the 2D pattern pieces the start and end points of the alternative positions that could be used for Design Point 11 and the end point of possible supplementary bust darts. Inputs would be made to indicate if the design intention was for the new darts to be alternative or supplementary or whether they could be both.

In the preferred embodiment the warping programme described below would treat these supplementary darts as part of the design and would allocate fullness reduction (i.e. width) as required.

3D Location of Design Point 11 (11A, 11B etc.) A drop down menu defining its location could provide the following options.

1. The same distance and direction or vector from the nipple as found with The Model (default).
2. A defined distance from the nipple and the same direction (or vector) as found with The Model.
3. A defined distance from the nipple and a defined x, y angle from the nipple with the distance from the body being the same as found with The Model.
4. As defined through a parameter input screen permitting Pattern Makers to define rules in simple terms that are automatically turned into machine understandable rules.

3D Location of Design Point 12 (12A, 12B etc.) A drop down menu defining its location could provide the following options.

1. The location of Design Point 12 divides the seam or the other dart on which it is found in the same proportion as found on The Model. (default)
2. Design Point 12 is a fixed distance from another design point (e.g. for a Design Point 12 on the armhole, 10 cms down from the shoulder point (Design Point 5).
3. The dart maintains the same angle to a seam or the other dart as found with The Model.
4. As above but with the additional condition that Design Point 12 should not be less than a given distance (e.g. 1–2 cm) from other design points (e.g. the side neck point, the shoulder point etc. Such a condition might be included so as not to create unseemly extra thickness where seams interconnect.)
5. At the top of a front panel seam (when the bust dart is hidden in a front panel seam).
6. As defined through a parameter input screen permitting Pattern Makers to define rules in simple terms that are automatically turned into machine understandable rules.

The width of the modified It is important to recognise that the creation of a 3D representation of a modified garment does not require knowledge of the width of darts. So darts can be present with any width including a width of zero that would merely indicate the availability of a dart that was not in practice used.

The workings of the program described in sections 6.12 and 6.13 below automatically generate the width of dart needed to meet the constraints of the 3D Tailoring rules on the consumer in question.

6.8.1.5 Dart Concealed in Back Seam

Design points 13 (FIG. 1) The function of a dart concealed in the back seam is to reduce the fullness arising from the curvature of the spine and the fullness at the waist.

Design Point 13 is the widest part of centre back dart point directly beneath the nape point (Design Point 1) and normally on the Waist Line. Its function is to define the widest part of a back centre dart concealed in a back seam.

A drop down menu defining its location could provide the following options.

1. Directly beneath the nape point and on the waist construction line.
2. Directly beneath the nape point and x cms above or below the waist construction line.
3. A defined proportion of the distance from the nape point to the waist construction line above or below the waist construction line.
4. As any of the above but with the further condition that the maximum width of the dart not exceed x cms (e.g. 2 cms).
5. As defined through a parameter input screen permitting Pattern Makers to define rules in simple terms that are automatically turned into machine understandable rules.

6.8.1.6 Shoulder Blade Dart

Design Points 14 to 15 (FIG. 5) The function of this dart is to take out the small amount of fullness required to accommodate the shoulder blade. The dart is normally small and the alternative is to provide ease in the shoulder seam or taking in on the back seam.

Design Point 14 is the shoulder blade upper dart point. It function is to define the top of the small back panel dart described above.

A drop down menu provides th following 3D location options.

1. The location of Design Point 14 divides the shoulder seam in the same proportion as found on The Model (default)
2. Design Point 14 is a fixed distance from another design point e.g. from the Shoulder Point (Design Point 4)
3. The dart maintains the same angle to the shoulder seam as found with The Model.
4. As above but with the additional condition that Design Point 14 should not be less than a given distance (e.g. 1–2 cm) from Design Points 4 and 5.
5. As defined through a parameter input screen permitting Pattern Makers to define rules in simple terms that are automatically turned into machine understandable rules.

Design Point 15 is the shoulder blade point that defines the lower end of the shoulder blade dart. Its 2D location on the pattern piece is obvious.

A drop down menu provides the following 3D location options.

1. The same distance and direction or vector from the shoulder blade region as found with The Model (default).
2. A defined distance from the shoulder blade region and the same direction (or vector) as found with The Model.
3. A defined distance from the shoulder blade region and a defined x, y angle from the shoulder blade region with the distance from the body being the same as found with The Model.
4. As defined through a parameter input screen permitting Pattern Makers to define rules in simple terms that are automatically turned into machine understandable rules.

6.8.1.7 Back Waist Dart (Design Points 16 to 18 FIG. 1) The function of the back waist dart is to take out waist fullness.

Design Points 16 is the upper back dart point. In the 3D representation it will be directly above the back dart full width point when sewn (Design Point 17).

A drop down menu defining the height above this point could provide the following options.

1. A fixed distance in cms above the waist construction line or beneath the bust (or true bust) construction line
2. The fixed distance in cms above the waist construction line or beneath the bust (or true bust) construction line as found with The Model.
3. A defined percentage of the distance between the waist construction line and the bust (or true bust) construction line.
4. The defined percentage of the distance between the waist construction line and the bust (or true bust) construction line as found with The Model.
5. As defined through a parameter input screen permitting Pattern Makers to define rules in simple terms that are automatically turned into machine understandable rules.

Design Point 17 is the back waist dart full width point and is virtually always on the waist construction line in the 3D garment (i.e. with the dart sewn). Its function is to define the location of the point of fullest width of a back dart that seeks to reduce fullness at the waist.

A drop down menu defining the location of the back waist dart could provide the following options.

1. Directly below the shoulder point region and on the waist construction line (default).
2. On the waist construction line but a defined distance to the left or the right of the default.
3. On the waist construction line but the distance to the left or the right of the default as found with The Model.
4. On the waist construction line but a fixed percentage of the distance between the side seam and the intersection of the Centre Back line and the waist construction line.
5. As any of the above but with the further condition that the maximum width of the dart not exceed x cms. (e.g. 2 cms).
6. As defined through a parameter input screen permitting Pattern Makers to define rules in simple terms that are automatically turned Design Points 18 is the lower back dart point. In the 3D representation it will be directly below the back dart full width point when sewn (Design Point 17).

A drop down menu defining the height below this point could provide the following options.

1. A fixed distance in cms below the waist construction line or above the hip construction line
2. The fixed distance in cms below the waist construction line or above the hip construction line as found with The Model.
3. A defined percentage of the distance between the waist construction line and the hip construction line.
4. The defined percentage of the distance between the waist construction line and the hip construction line as found with The Model.
5. As defined through a parameter input screen permitting Pattern Makers to define rules in simple terms that are automatically turned into machine understandable rules.

6.8.1.8 Darts Concealed in Back Panel Seams

Design points 16 and 19 to 20 (FIGS. 6 and 7) Darts concealed in back panel seams connect back waist darts and back shoulder darts in effect replacing the two darts with a single concealed dart. They are curved to remove fullness from the back and the waist.

Design Point 17 defined the point of maximum width of the back dart when sewn. It is the same point as where the maximum width of a concealed back seam dart would be.

Figure 6:
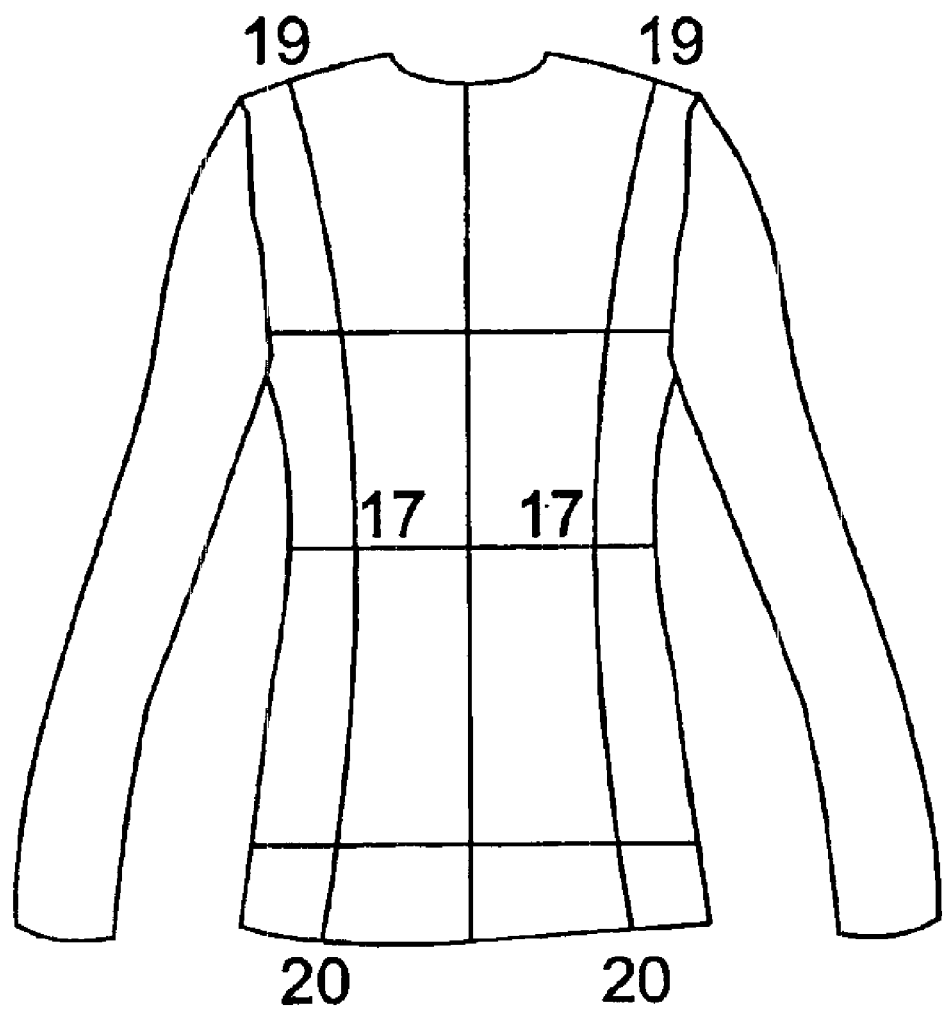
Figure 7:
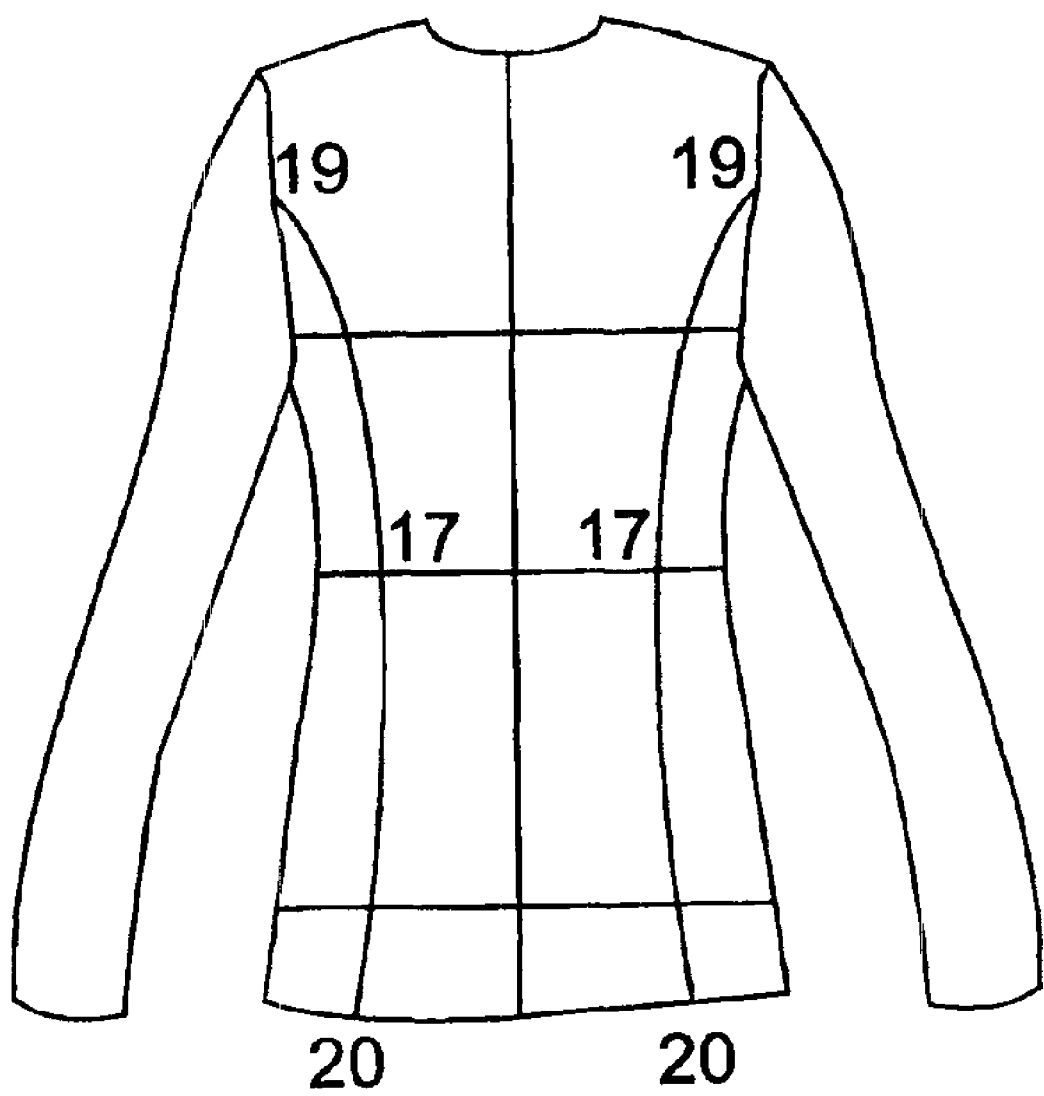

Design Point 19 is the top of the back seam that could be on the shoulder line or the armhole (See FIGS. 6 and 7). The point has many similarities to the point at the top of the bust dart when located at the shoulder (Design Point 12).

In formal terms a drop down menu could provide the following options

1. A point that divides the seam on which it is found in the same proportion as found on The Model (default)
2. A fixed distance from another design point (e.g. for a Design Point 19 on the armhole, 10 cm down from the shoulder point, Design Point 4).
3. A point fixed so that the dart maintains the same angle to the seam as found with The Model.
4. As above but with the additional condition that the Design Point should not be less than a given distance (e.g. 1–2 cm) from other design points. (Such a condition might be included so as not to create unseemly extra thickness where seams interconnect.)
5. At the top of a back panel seam (when the shoulder dart is hidden in a back panel seam).
6. As defined through a parameter input screen permitting Pattern Makers to define rules in simple terms that are automatically turned into machine understandable rules.

Design Point 20 is at the bottom of the back seam. A drop down menu could provide the following options.

The Vertical location of Design Point 20 is:

1. The same distance from the hip construction line as found with The Model.
2. The same proportionate distance between the hip and the waist construction line as found with The Model.
3. As defined through a parameter input screen permitting Pattern Makers to define rules in simple terms that are automatically turned into machine understandable rules.

The horizontal location of Design Point 20 is

1. The same distance from the Centre Back Line as found with The Model
2. The same distance from the Side Seam Line as found with The Model
3. The same proportionate distance between the Centre Back and the Side Seam lines as found with The Model
4. As defined through a parameter input screen permitting Pattern Makers to define rules in simple terms that are automatically turned into machine understandable rules.

6.8.1.9 Font Waist Darts

Design Points 21, 22 and 23 (FIGS. 8 and 9) The function of the front waist dart (of which there may be more than one on each side) is to allow the fabric to mould itself to the contours of the body in the manner illustrated by the base design. The front waist dart may be a half diamond ending at a seam or a full internal diamond shaped dart. As set out below the front waist dart may become incorporated into a front panel seam.

Figure 8:
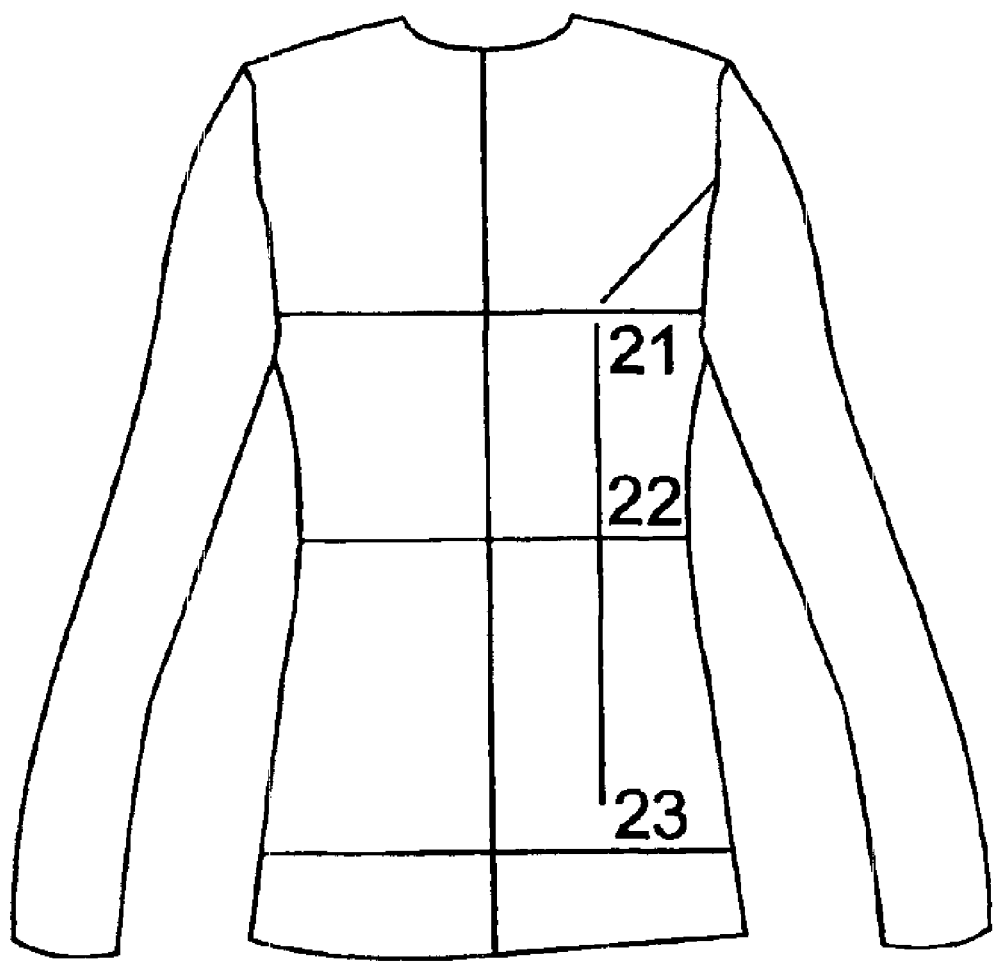
Figure 9:
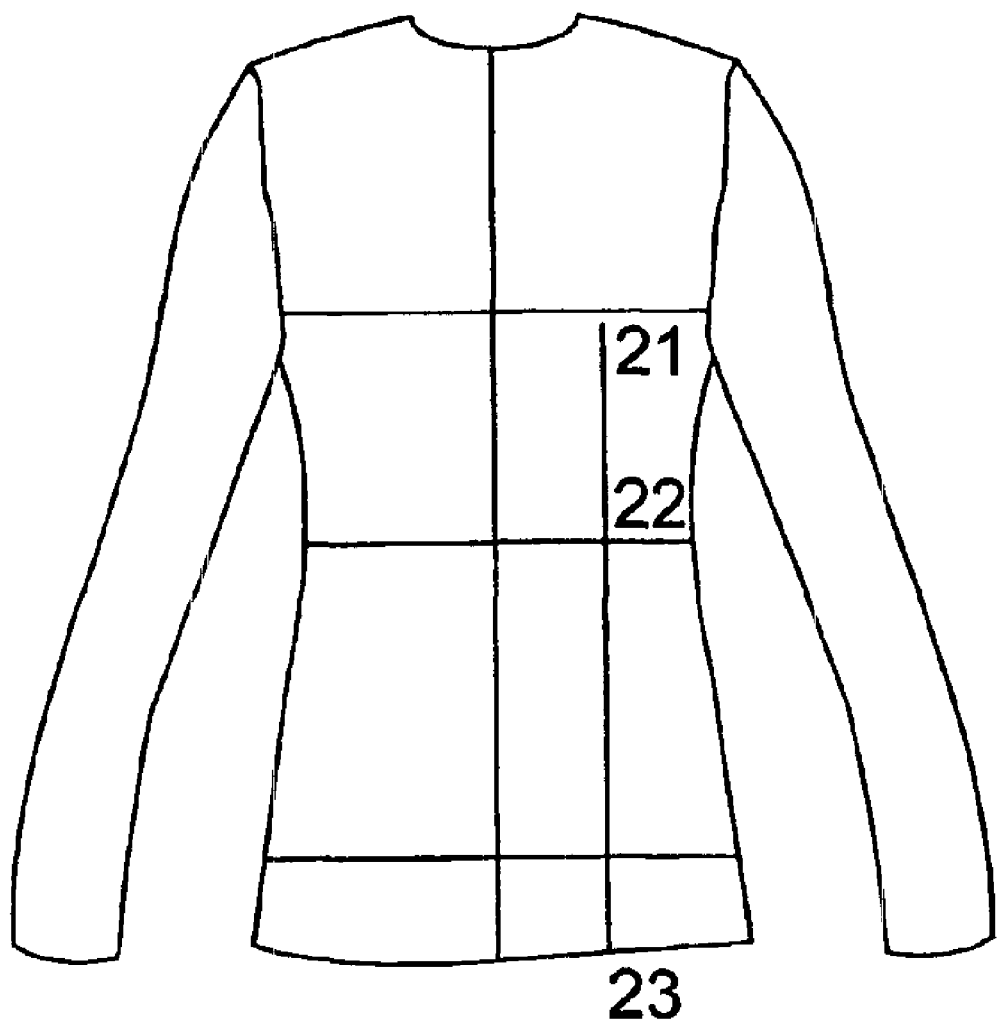

FIGS. 8 and 9 illustrate two very common front darts, a simple internal waist dart that runs above and below the Waist Line (FIG. 8) and a half dart/half cut (FIG. 9) where there is a dart to the Waist Line running into a panel seam extending to the bottom of the bodice. Design Point 21 is used to define the top of the dart as the location is defined in relation to the nipple body region in the same way as for the nipple end of the bust dart.

Design Point 22 is the point, normally on the waist construction line, that is the widest part of the internal dart (FIG. 8) or that marks the point where the dart becomes a cut (FIG. 9). A drop down menu could provide the following options.

1. The point on the waist construction line directly beneath Design Point 21 (default).
2. A defined distance above or below the waist construction line as found with The Model and directly beneath Design Point 21.
3. A defined proportion of the distance between the true bust line (or the hip construction line) and the waist construction line as found with The Model and directly beneath Design Point 21.
4. As defined through a parameter input screen permitting Pattern Makers to define rules in simple terms that are automatically turned into machine understandable rules.

Design Point 23 is found at the lower end of the full internal dart (FIG. 8) or the hemline (FIG. 9). A drop down menu could provide the following options for the full internal dart.

1. A point directly beneath Design Point 22 when sewn that is the fixed distance (i) below Design Point 22 when sewn or (ii) above the hip construction line as found with The Model.
2. A point directly beneath Design Point 22 when sewn that is the fixed proportion of the distance between Design Point 22 when sewn and the hip construction line as found with The Model.
3. As defined through a parameter input screen permitting Pattern Makers to define rules in simple terms that are automatically turned into machine understandable rules.

Advanced 3D Tailoring could provide the option to use either the full dart or the half dart/half cut approach depending on the waist measurement of the consumer (the half dart/half cut approach is particularly suitable for slim women as it accentuates the slimness of their waists.)

Multiple darts are referred to as 21A, B etc. Advanced 3D Tailoring could specify the use of multiple darts for specific body shape types.

In both of the examples of advanced 3D Tailoring our preferred embodiment would be to define the applicable subset of rules by reference to the matching Eigen shapes of consumer for whom the garment is being made.

6.8.1.10 Combined Bust and Waist Darts

Figure 10:
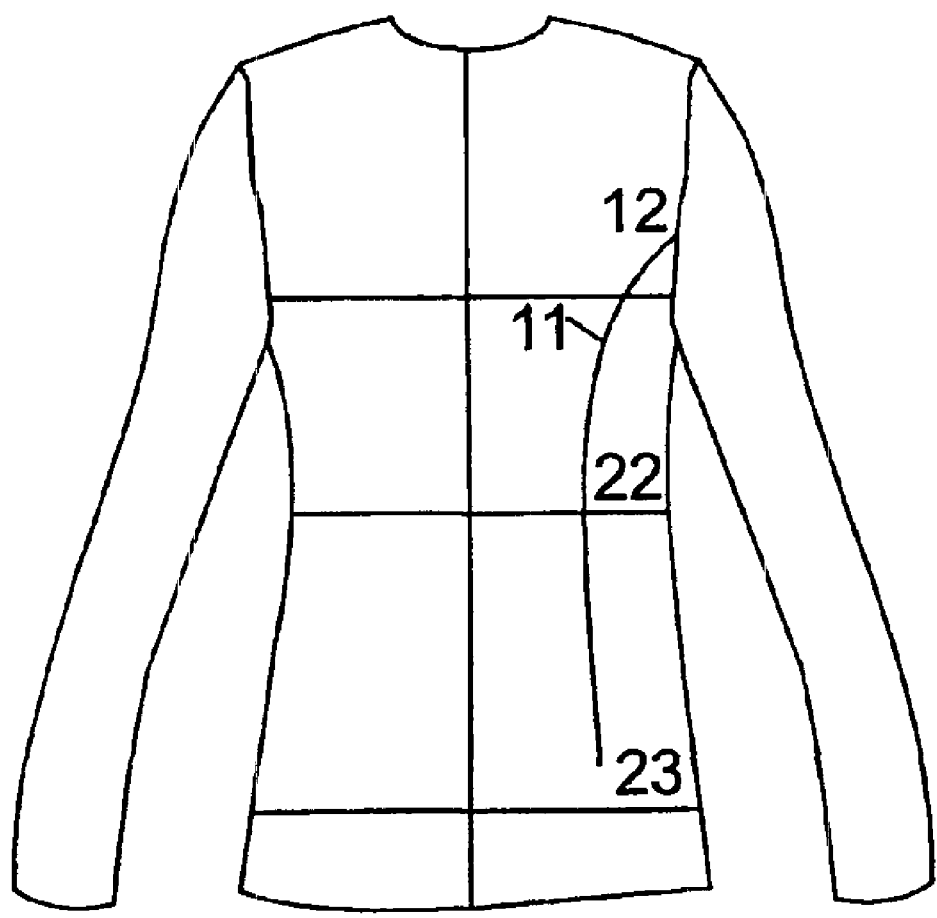
Figure 11:
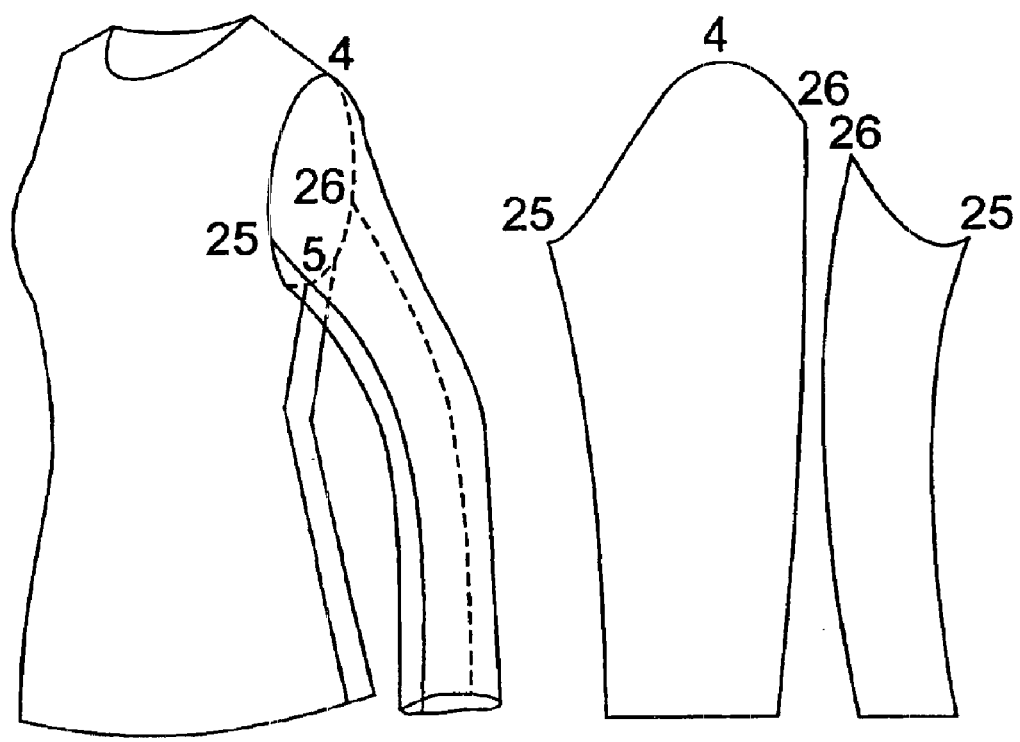

Design Points 11, 12, 22 and 23 (FIG. 10) FIG. 10 illustrates a combined bust and waist dart. It is an example of the specialised darts that are occasionally used. The location of the design points can be defined using Design Points 11 and 12 from the bust dart and Design Points 22 and 23 from the waist dart (see above).

6.8.1.11 Slanted Centre Front Seam

Design Point 24 The presence of a slanted centre seam would be apparent from the pattern pieces. The point of maximum width is Design Point 24. A drop down menu could provide the following options.

1. On the centre front line and on the waist construction line (default)
2. On the centre front line the same distance above or below the waist construction line as found with The Model.
3. As defined through a parameter-input screen permitting Pattern Makers to define rules in simple terms that are automatically turned into machine understandable rules.

6.8.1.12 Armholes

Design points 4, 5, 25 and 26 (FIGS. 1,2,3 and 11) The section examines the armhole into which the crown of the sleeve (discussed above) will fit. The figures show various views of armholes. The shoulder point (Design Point 4) and the underarm point (Design Point) will have already been defined.

Design points 25 and 26 (FIG. 11) show where the seams of the sleeve connect to the armhole. The front Point 25 is the standard place for a seam to be made out of one pattern piece; the back point 26 is used where two pattern pieces are used for the sleeve.

A drop down menu could provide the following options for points 25 and 26.
1. The same proportion of the distance between the shoulder point and the underarm point as found with The Model, in the case of Design Point 25 at the front and Design Point 26 at the back.
2. As defined through a parameter input screen permitting Pattern Makers to define rules in simple terms that are automatically turned into machine understandable rules.

Discussion The armhole is a critical element in the fit of a garment. In conventional clothing technology it can be increased or decreased by variations in height (determined by the shoulder point), the depth (determined by the underarm point) and the width (see below).

In 3D Clothing Technology the armhole size will automatically be changed for each consumer because of variations in the underarm and shoulder body region.

As an example of this process it is a premise of quality tailoring that raising the shoulder point on the pattern pieces is a viable method of increasing the size of the armhole, but only where the subject has "square shoulders". In 3D Tailoring, square shoulders mean a higher "shoulder region" than normal. This higher shoulder region automatically creates a higher shoulder point.

This inherent mechanism for adjusting the garment to different shapes is supplemented by the working of the program that is described in 6.8 and 6.9 below namely that the 3D process should (a) work holistically and (b) minimise the changes to the base design. As a result the shape and proportions of the armhole should maintain an optimised relationship to the shape and proportions of the armhole of the base design.

As an example of this mechanism it is recognised by those expert in the traditional trade that decreasing the width of the bust and shoulder dart increases the available fabric at the armhole and therefore increases the width of the armhole. If excessive this can produce a gaping armhole whose neatness has been lost.

The working of the program described in 6.8 and 6.9 below seeks out the solution that minimises the changes to individual parts of the garment. This is almost certainly the process that a good traditional tailor would intuitively or consciously adopt when modifying a base design (or block) for a bespoke garment. The "minimisation of change" process should automatically minimise the chances of problems such as the gaping armhole described above.

The 3D program also, however, incorporates an iterative evaluation of the many available options to find out which option best accommodates the constraints of the 3D Tailoring rules (within the flexibility provided by body regions as opposed to body points) whilst minimising change. This iterative process compresses what could be weeks and months of trial and error into a very few seconds.

It could be found, however, that the 3D Tailoring rules need to be modified to obtain good results from certain shapes of person.

In the preferred embodiment therefore, the Pattern Maker working in 3D would be provided with the upper arm measurement and the total size round its perimeter of the armhole. By way of explanation the optimum size of the armhole is conventionally considered to be 12–13 cms larger than the upper arm. The comparison between the upper arm +12–13 cms and the length of the armhole perimeter therefore provides a cross check on the size of the armhole that is derived as a result of using the 3D process. If the results are not satisfactory the Pattern Maker could in theory
1. Raise or lower the shoulder point
2. Raise or lower the underarm point
3. Alter the bust looseness rules to provide more width Given the automated handling of the shoulder point and the general undesirability of lowering the underarm point, the Pattern Maker would almost certainly focus on the width of the armhole providing the best area for an adaptation of the 3D Tailoring rules.

The width of the armhole is a function of the total bust width. The 3D Tailoring rules for the total bust width are governed by the bust looseness, which is distributed between the back and the front panels and the armhole.

Given the above the most natural gloss to the basic 3D Tailoring rules is likely to be an instruction to alter the bust looseness by (for example) slightly increasing bust looseness (as compared to The Model) for the fuller figures. (This mechanism is provided for in the bust looseness options described in 6.6.1 above.)

6.8.1.13 Halter Necked Bodices

Figure 12:
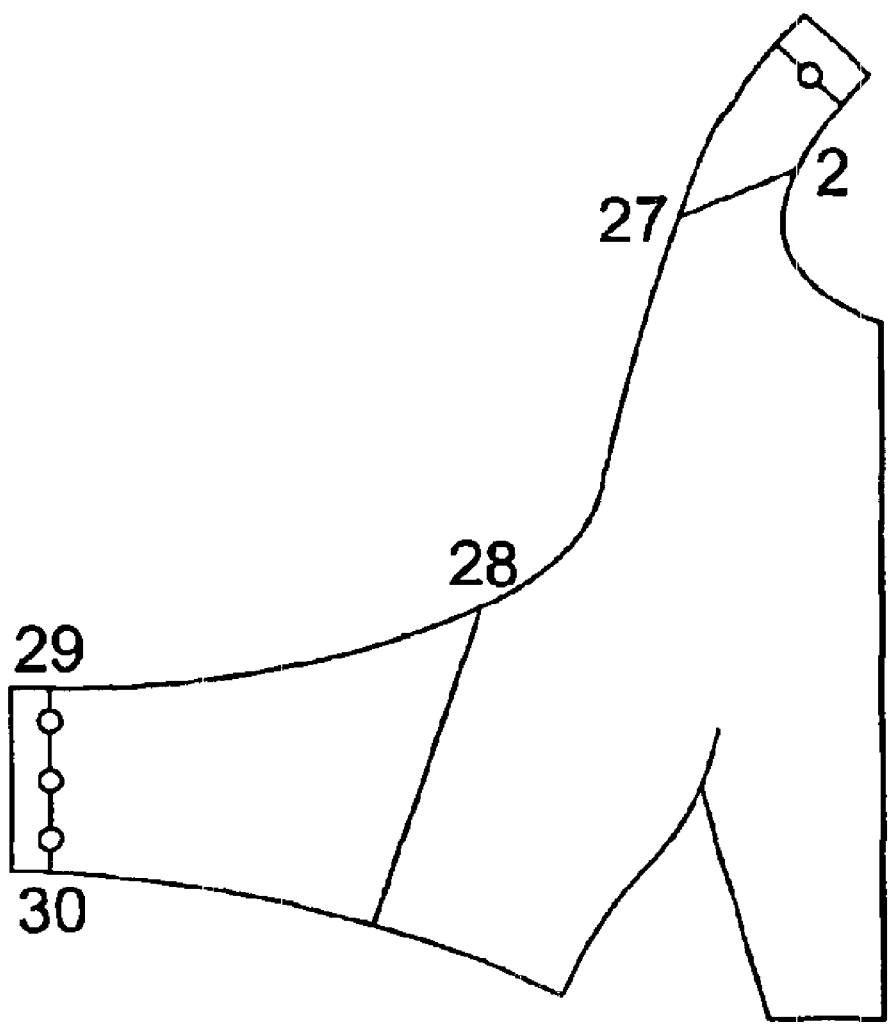

Design Points 2 and 27 to 30 (FIG. 12) FIG. 12 shows a halter necked bodice. The normal design points are Design Point 2 The side neck point Design Point 27 The mid shoulder line point (a distance as found with The Model from the side neck point along the shoulder line). Design Point 28 The halter underarm point as found on the pattern piece from The Model (NOTE: The facilities of the preferred embodiment makes all points on the 3D representation of the garment relatable to the equivalent position on the pattern piece. The underarm point with a halter necked bodice is unusual in that its location on the pattern piece is problematic.)

Design Point 29 The halter upper back point. It is defined horizontally by reference to the centre back line (nearly always on it) and vertically by reference to the waist construction line Design Point 30 is the bottom of the bodice on the centre back line and is defined by the position found with The Model relative to the waist construction line.

6.8.1.14 Cardigans and Sleeveless Bodices

The garments can be defined using subsets of the general bodice design point facilities.

6.8.1.15 Yokes

FIGS. 13 and 14

Yokes are very commonly used in shirts, blouses, and dresses as well as sports clothes. With a yoke garment the front and/or the back of the garment is cut into an upper part (the yoke) and the lower remaining part of the bodice.

The bottom of the yoke can be straight, square, curved or almost any shape imaginable. This profusion of designs makes it inappropriate to attempt to provide any standard set of design points. The design points set out below are therefore used only to indicate the principles of 3D Tailoring of Yokes.

There are innumerable style variations and the locations of the key points of the design will be defined according to the general principles set out herein.

There are, however, some critical principles that normally apply.

Figure 13A:
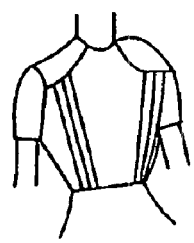
Figure 13B:
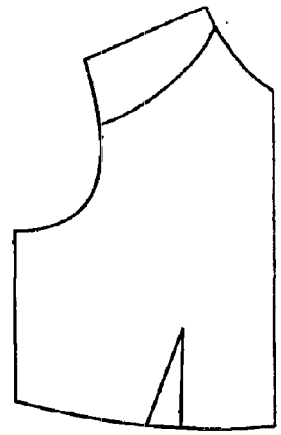
Figure 13C:
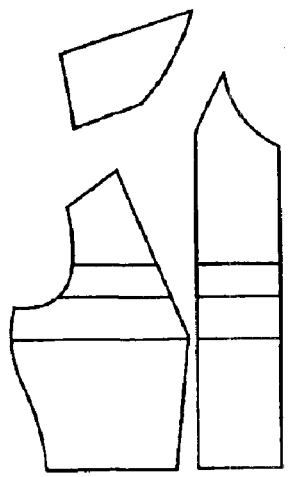
Figure 13D:
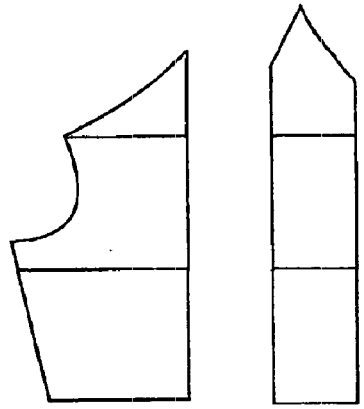
Figure 14A:
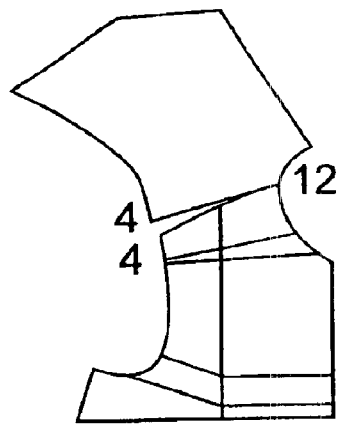
Figure 14B:
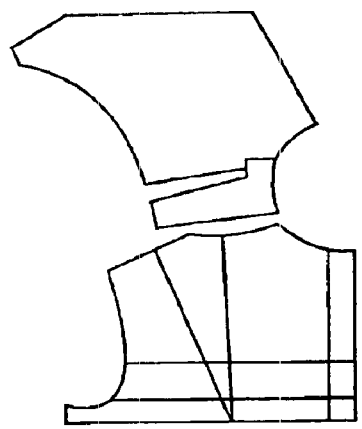
Figure 14C:
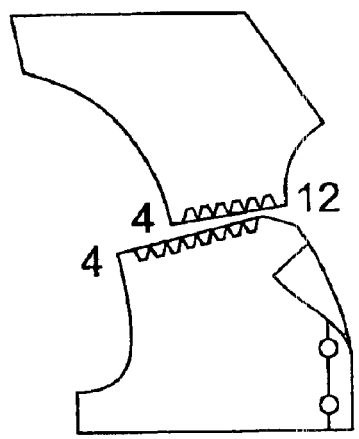
Figure 14D:
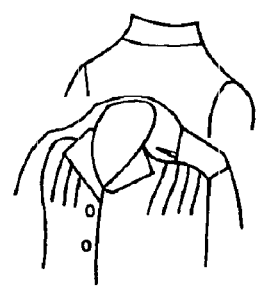

1. The shape of the bottom of the yoke. One or more obvious points on the bottom edge of the yoke can define the shape of the bottom of the yoke. The vertical location is nearly always by reference to the intersection of a horizontal line through the point in question and the centre front line (or the shoulder point) with depth being the depth down the front centre line (or the shoulder point) on The Model. This depth down can be absolute (x cms) or a proportion (which may be greater than one) of the distance to the bust line.
2. The bust dart. The remainder of the bodice under the yoke normally contains that portion of a bust dart (normally to the shoulder) as would have been present in a conventional bust darted bodice. However the notional dart is opened out creating fullness. The yoke, however, has the shape that it would have had were the dart still present. This means that the top of the remainder of the bodice is bigger than the yoke seam to which it is stitched. The surplus fullness is lost at the seam, normally through gathers and this produces pleasing design effects. FIG. 13A provides an example.
3. Additional fullness. The design effect may require more surplus fullness than would otherwise be present. Inserting a vertical panel into the remainder of the bodice panel can provide this. FIGS. 13B, 13C, 13D show how the pattern piece evolves to create the effect shown in FIG. 13A.
4. The degree of additional fullness in 3D Tailoring. The degree of additional fullness is the width of the notional shoulder dart for a notional complete bodice but at the edge of the yoke (whose location has been defined under (1) above) plus the difference (if any) between this distance and the degree of additional distance as found with The Model.
5. Notch marks (balance marks). The base garment will contain notches (or balance marks) that define the area between which the gather (or other fullness reducing mechanism) is to be implemented. These notch points will be in a certain relationship to the body of The Model. An unambiguous relationship must be defined in the manner described on multiple occasions herein.

FIGS. 1A, 14B, 4C and 14D illustrate these principles with one of the classical yoke styles, a saddle yoke. With this saddle yoke the yoke is cut to a shoulder band width and cut in with the back of the garment or with a back yoke (very common with a mans shirt).

The shapes of the pattern pieces of the base garment have incorporated the procedures set out above. It is for the Designer/Pattern Maker to define unambiguous locations for the design points as indicated on FIG. 14A.

6.8.1.16 The Neckline of Collars

Design Points 1, 2 and a We start with a neckline formed by the bodice that normally becomes the neckline of the collar. (See above) In many cases the neckline of the bodice will correspond to the neckline on the body. In any event, however, the neckline of the collar can be defined by the relationship between the three body regions, (the nape, side neck and the front neck) and the corresponding design points.

Tightening the neckline of the collar Stretching of the fabric may lead to the neckline of the collar separating from the neck. To counter this the neckline of the collar is tightened in one of two ways.

1. Th lower edge collar may be slightly smaller than the bodice, pulling in the neckline. Any differences in the length found with The Model would be maintained.
2. The more commonly used method is to make the neckline of the collar slightly smaller than the neckline of The Model ("blocking in") for both the bodice and the collar. In 3D Tailoring the options would therefore include an instruction to "block in" the collar by x cms.

Looseness in the neckline Conversely the neckline may be loose. The desired looseness can be defined by reference to the looseness of the neckline with The Model at each of the design points.

6.8.1.17 The Stand

The stand is the height of the collar. Variations in height are formed by the effect of curving the collar with different inner and outer edges. In 3D Tailoring the procedure is to create the correct height and shape on the virtual body of the consumer and to then unwrap the virtual collar to form the shape of the flat collar that will form the pre-defined end result.

As with the neckline itself defining the desired end result is an inherently simple procedure.

1. The height of the stand at the back, side and front is defined by the height as found with The Model. (The height of a stand is very often different at these points.)
2. The top of collar looseness at the back, side and front is defined by the looseness as found with The Model.

Note that the looseness of the collar can be defined to suit the preferences of individual consumers.

Figure 15:
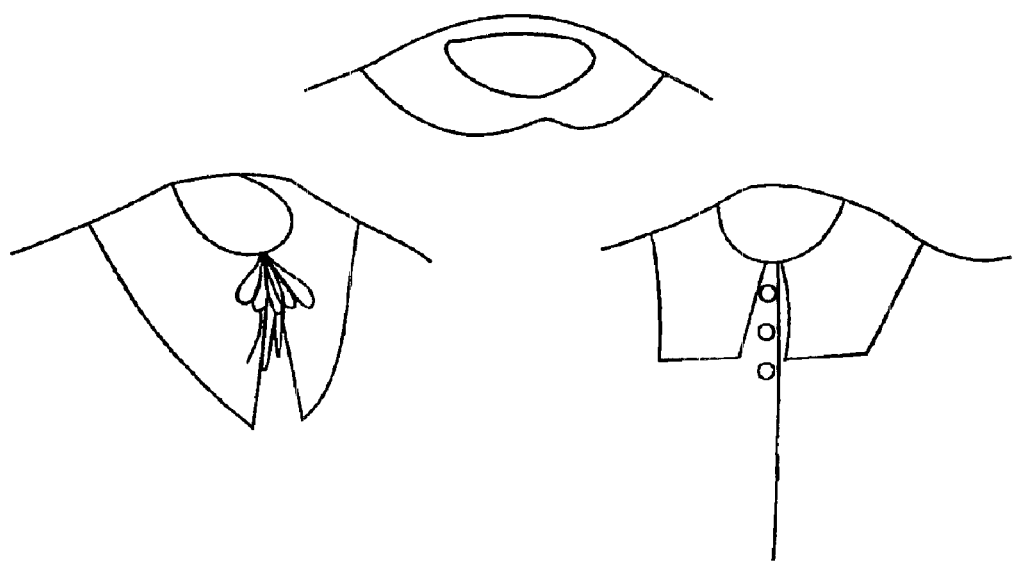

6.8.1.18 Styles of Collar (FIG. 15)

The height of the stand provides the first subset of collars. Each subset is then further divided. The warping program will apply the constraints needed to obtain a good fit (a function of the neckline) the desired looseness and the height and shape of the stand (determined as an end result and achieved in the unwrapped piece by the differences between the inner and outer edges of the collar). The general procedures for maintaining all elements of the garment in as close a form to the base design as possible (whilst meeting the constraints) will allow quite dissimilar styles of collar to be modified in a satisfactory manner. (See FIG. 15)

6.8.1.19 Revers

Design Points 31, 32, 33 (FIGS. 16A and 16B) Revers (or lapels) are the front edges of a bodice, blouse, jacket or coat that fold back over a line known in the trade as the "crease line". Three key points need to be defined.

Figure 16A:
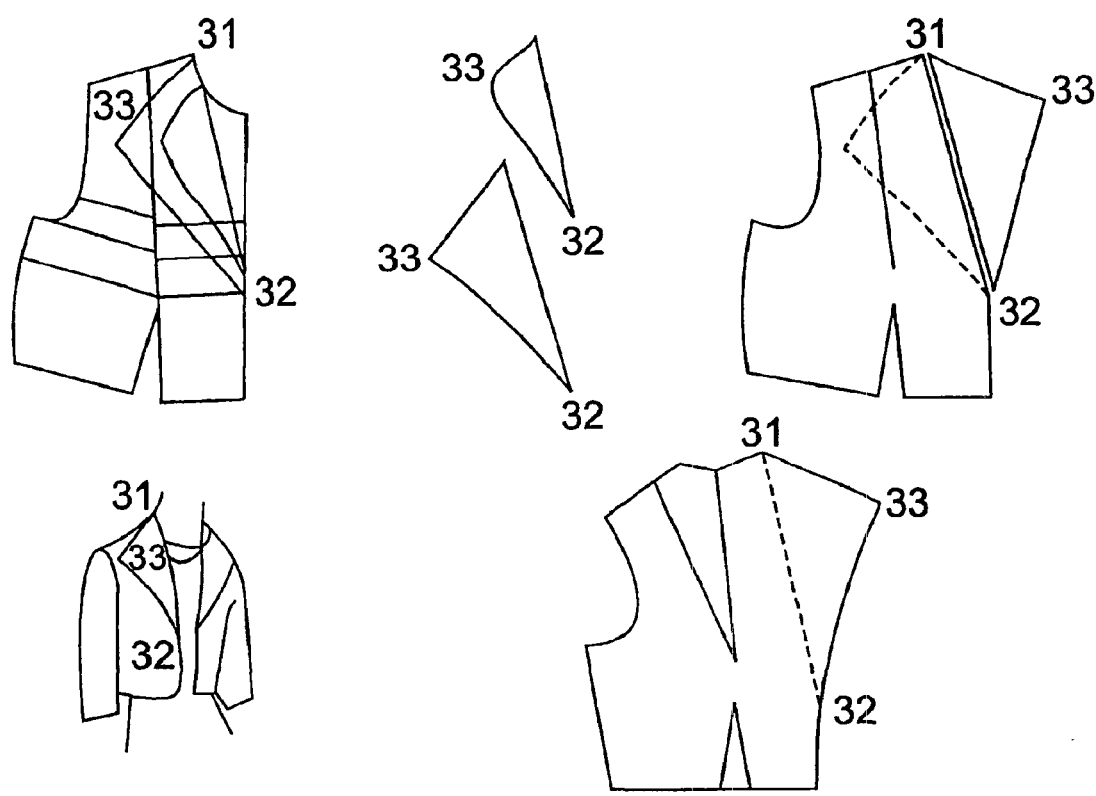
Figure 16B:
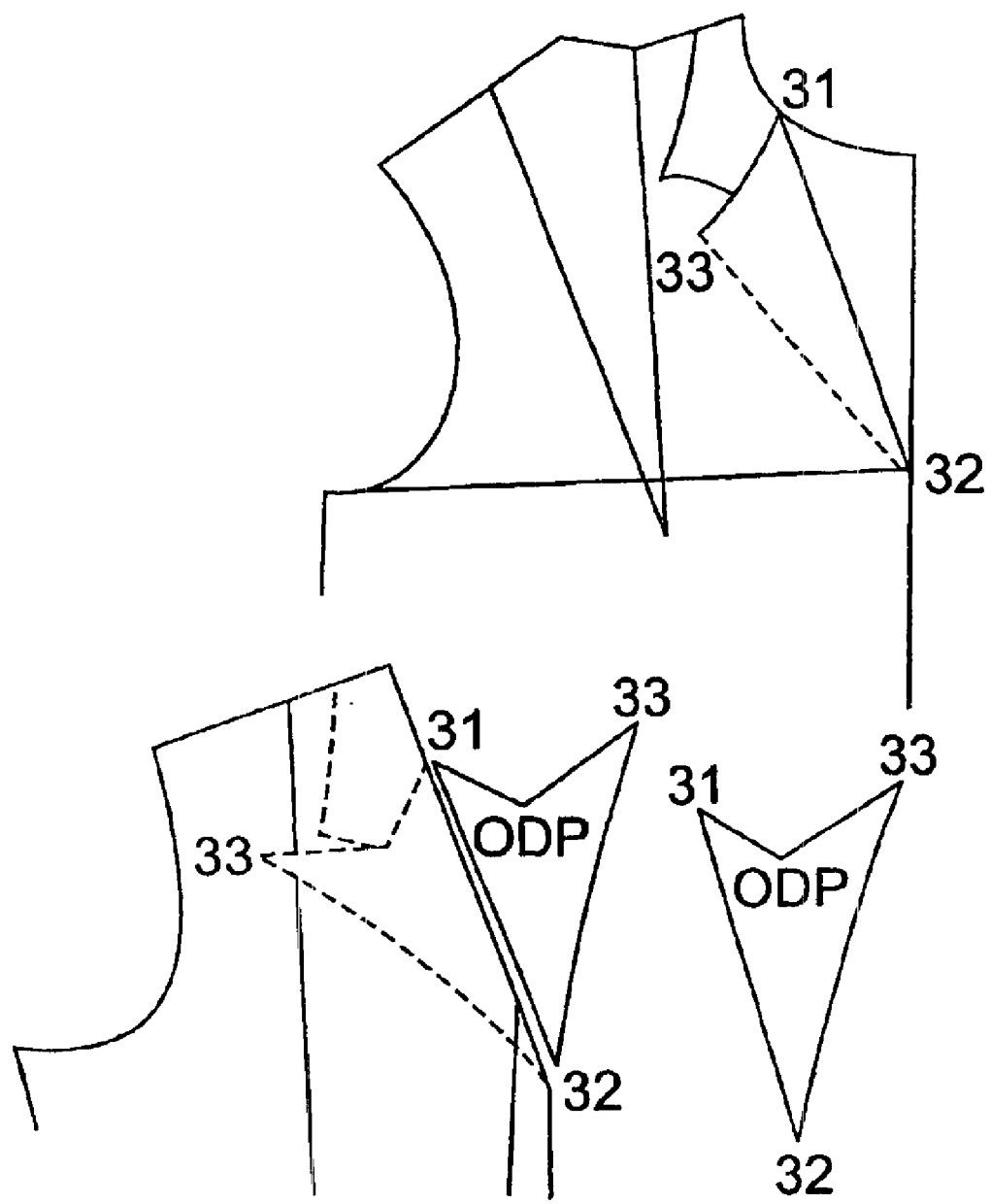

FIG. 16A shows a rever without a collar or wrap (a "bolero") and FIG. 16B with a collar.

Design point 31 is the rever neck point. A drop down menu could provide the following options.

1. The distance and vector from the side neck point as found with The Model.
2. The proportion of the distance from the side neck point to the bottom of the rever as found with The Model.
3. The actual distance from the side neck point to the bottom of the rever as found with The Model.
4. The distance and vector from the intersection of the line from neck point to the bottom of the rever at the point where the edge crosses the neckline. (For FIG. 16B)

5. As defined through a parameter input screen permitting Pattern Makers to define rules in simple terms that are automatically turned into machine understandable rules.

Design Point 32 is the bottom of the rever. In the bolero it is on the centre line. Where there is a wrap there will be an overlap taking the design point to the right of the centre line.

A drop down menu could provide the following options.

1. On the centre line and the proportion of the distance from the bust line to the waistline as found with The Model.
2. On the centre line and the actual distance down from the bust line (or up from the waist line) as found with The Model.
3. As for (1) or (2) but shifted the amount to the right as found with The Model.
4. As defined through a parameter input screen permitting Pattern Makers to define rules in simple terms that are automatically turned into machine understandable rules.

Design Point 33 is the "rever wing point" (see FIG. 16A) A drop down menu could provide the following options.

1. The height relative to the height of the shoulder point (or the front neck point, or the bust line) as found with The Model.
2. The actual (or proportionate) distance from the centre line (to the side line) as found with The Model
3. As defined through a parameter input screen permitting Pattern Makers to define rules in simple terms that are automatically turned into machine understandable rules.

The fancy shaped rever FIG. 16B would normally maintain the shape of the design through the general warping procedures. For absolute precision an optional design point ("ODP") could be added at the angle. (See FIG. 16B).

The right half of the rever is different where there is a wrap and would be separately defined using the above procedures.

In creating the unwrapped shape of the pattern piece the rever is reversed around the crease line.

6.8.1.20 Wraps

A wrap folds over the other half of the front of the bodice (nearly always the left half for women and the right half for men). It is largely a style feature.

FIG. 17 provides some examples.

Some or all of the following points would normally be identified by reference to The Model, using one of the standard approaches that have been explained above.

1. The depth of the neckline.
2. The point that the wrap crosses over the other half of the front of the bodice.
3. The level at which the wrap is at its widest.
4. The vertical position of the widest point
5. The level of the bottom of the wrap (nearly always the waist construction line)
6. The vertical position of the bottom of the wrap.

The wrap will be warped with these constraints in the normal manner.

6.8.1.21 Buttons and Buttonholes

Buttons would normally be defined from the location of the top and the bottom buttons relative to other design points. The default would be to spread the remainder of the buttons evenly. The buttonholes would follow the relationship to the buttons as found with The Model.

6.8.1.22 Pockets

The location of the pockets would be defined relative to other design points. The default would be to assume that the pockets were the same size as found with The Model. Note that in 3D Design mode the rules could be amended to provide a simple method of experimenting with different locations and sizes of pockets.

6.8.1.23 Facings, Interfacing, Linings, Interlinings

Facings, interfacings, linings and interlinings bear a constant relationship with associated pattern pieces. A simple default procedure for defining their shapes relative to the associated pattern piece as found with The Model would normally be sufficient, with a back up facility to make specific rules where required. The default would assume that the grain of a facing (normally in the fabric of the associated pattern piece) would be the same as for the associated pattern piece.

6.8.1.24 Capes

Figure 18:
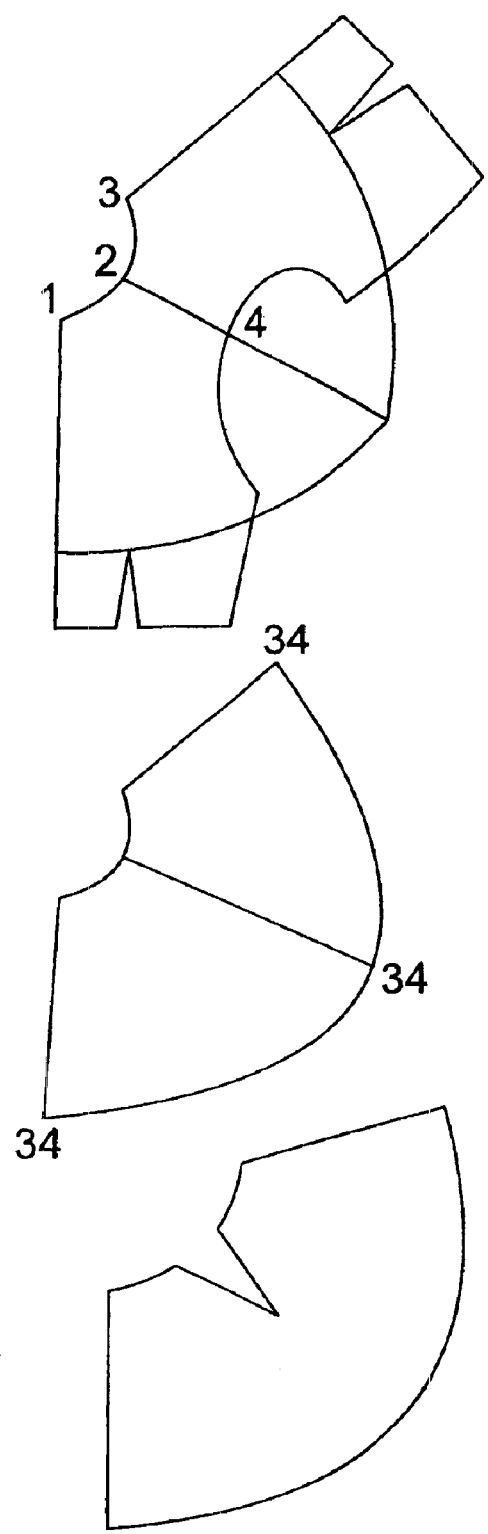

Design Points 1 to 4 and 34 (FIG. 18) The look of a cape is based on the degree to which it is shaped around the shoulder and its length. FIG. 18 shows one of the pattern pieces that make up a semi shaped cape with a shoulder dart (or a hidden dart in a shoulder seam).

Design Points 1, 2, 3 and 4 define the neckline and the shoulder point and have been considered above.

Design Point 34 is the outer parts of the hem of the cape. A drop down menu could provide the following options for the outer points 1. The distance dawn from the shoulder point, the front or back neck point as found with The Model.
2. The distance up or down from the elbow body region as found with The Model.
3. As defined through a parameter input screen permitting Pattern Makers to define rules in simple terms that are automatically turned into machine understandable rules.

The location and depth of the dart would conventionally be as found with The Model.

The length of the hem could be defined in a drop down menu as follows:

1. The ratio of the hem length to the line from the side neck point to the edge of the cape as found with The Model.
2. As defined through a parameter input screen permitting Pattern Makers to define rules in simple terms that are automatically turned into machine understandable rules.

Note that additional fullness at the hem is often also provided by flares (see below).

6.8.2 The Sleeve

Sleeves may be straight or shaped. These two basic styles are used in an almost infinite set of styles. The description set out below shows how the 3D shape and fit of the sleeve can be defined. The more exotic styles will require the incorporation of additional design points.

FIG. 19 is a diagram of a tight fitting sleeve block. Its appearance will be very familiar to Pattern Makers. It contains or indicates the main fit related design points for a sleeve. In the preferred embodiment the location of these design points would be graphically indicated on the digitised pattern pieces. Alternatively the Pattern Maker would add the points onto the digitised pattern pieces manually using a points editor. Sleeve construction lines most commonly used in 3D Tailoring The Depth of Crown line that runs horizontally through th underarm point.

The Elbow Line running horizontally through the elbow body region.

The Wrist line running horizontally through the top of the wrtst body region.

6.8.2.1 The Crown of the Sleeve (The Head of the Sleeve)

Design points 4, 5, 25 and 26 The crown of the sleeve has been discussed in its capacity as one of the key "framework" elements of the design, Note that the crown of the sleeve has the same design points as the armhole on the bodice. The design points should also be marked on the sleeves providing the 3D equivalent of notches to indicate the amount of ease that is required in each segment of the sleeve.

Discussion, Ease Ease is a sewing technique used where there is a seam constructed from two unequal lengths. The larger seam edge can be regarded as being "eased" into the smaller. The pattern piece with the larger seam has accordingly greater fullness than would be the case were the edges of the two pattern pieces the same.

The arm on a sleeve is always bigger than the armhole and this provides extra fullness in the upper arm whilst preserving an optimum shape for the armhole. Ease can, however, be used in many other parts of a garment.

With 3D Tailoring there is a base garment with a given amount of ease that can be established from the digitised pattern pieces. Notches will show the distribution of the ease round the armhole. (For example, the ease in an armhole is nearly always concentrated in the upper half of the armhole.) The ease function is then incorporated into the process of creating an initial 3D representation of the base garment.

The modified shape of the armhole will emerge from the warping of the pattern pieces that make up the armhole. Similarly the size and shape of the crown of the sleeve will flow from the 3D location of the shoulder point and the underarm point and the "best maintenance" of the shape of the crown as described below.

The warping process described in 6.11 below will slightly adjust the position of the notches to produce modified parameters for the distribution of the ease that is present. This overall process is used wherever ease is encountered.

6.8.2.2 The Shape of the Overall Sleeve

FIG. 19 illustrates a 2D perspective whose edges are the underarm and top lines. The shape of the arm can also be looked at from an infinite number of other perspectives.

In the preferred embodiment the overall shape of the sleeve would normally be derived from the 3D representation of the base design and carried through into modified designs through the general "minimalisation of change" procedures. In the preferred embodiment particular attention is given to the area around the wrist and the elbow The splines (i.e. the set of shaped curves that make up the overall 3D shape of the sleeve) could be for the whole of the sleeve or could be separately defined from the shoulder/underarm to elbow construction line and from the elbow construction line to the bottom of the sleeve.

The effect would be that the desired 3D shape of the sleeve (as defined by the Designer and the Pattern Maker) would be maintained.

If, however, the objective is one of a comfortable fit an additional rule would be inserted to maintain the degree of looseness at the elbow and its distribution around the elbow as found with The Model. The splines would stay as close as possible to that created in the base design but subject to this overriding constraint.

In addition a number of styles of sleeve would be more easily defined by incorporating the location of the sleeve relative to the wrist and the elbow into the constraints on the shape of the garment. In the case of such (often exotic) sleeve designs additional style related design points may be added.

6.8.2.3 The Hang of the Sleeve

A well-constructed sleeve hangs down perpendicularly from the shoulder point. This characteristic flows, however, from a correct fit of the sleeve into a correctly constructed armhole. In the preferred embodiment, the correct hang of the sleeve is an inbuilt constraint within the overall process that helps to ensure correct definition of the sleeve and armhole.

6.8.2.4 The Elbow Dart(s)

Design Points 35, 36 and 37 (if required 35A, 36A, 37A etc) (FIG. 19) FIG. 19 shows a tightly fitted (or "French") sleeve that follows the natural curve of the arm thereby providing for the bending of the arm at the elbow.

The balance marks on FIG. 19 indicate the need to lose seam length as the seams are sewn together. This can be done by easing or by the incorporation of small darts as indicated in FIG. 19.

One or more darts (or equivalent) are required to control the shape and fit of the sleeve. The more common type of dart is that illustrated in FIG. 19, namely a dart running across the elbow. The dart may be internal (as illustrated in FIG. 19) or a half dart ending at the seam. The alternative dart construction runs down the arm, usually from elbow to wrist.

In the preferred embodiment the centre (or upper) end of the dart is Design Point 35, the point of maximum width of the dart is Design Point 36, and the outer (or lower) end is Design Point 37.

A drop down menu could provide the following options to define the centre end of a horizontal dart. (The options are for a single pattern piece sleeve.)

1. The horizontal distance from the vertical line beneath the shoulder point as found with The Model
2. The horizontal distance from the seam of the sleeve as found with The Model
3. The proportionate distance between the vertical line beneath the shoulder point and the seam of the sleeve as found with The Model.
4. The vertical distance from the elbow construction line as found with The Model.
5. The vertical distance from the crown construction line as found with The Model.
6. The vertical distance from the wrist construction line as found with The Model.
7. A vertical distance that has the same proportion of the distance between the crown construction line and the elbow construction line or the same proportion of the distance between the wrist construction line and the elbow construction line as found in both cases with The Model.
8. As defined through a parameter input screen permitting Pattern Makers to define rules in simple terms that are automatically turned into machine understandable rules.

The same options can be used to define the centre and outer end of the dart.

6.8.2.5 The End of the Sleeve

Design points 38 to 41 The end of the sleeve is defined in 3D by its relationship to four equally spaced body regions, namely The underarm wrist body region, (directly beneath the underarm and at the centre of the inside of at the wrist), The top (or middle) wrist body region abov the middle finger on the line of th wrist, The forearm wrist body region above the thumb at the line of the wrist The back line wrist body region above the little finger at the line of the wrist.

The four design points are directly related to the four body regions. A drop down menu could provide the following options for the four points 1. The 3D relationship (distance and vector) to the relevant body region as found with The Model
2. As defined through a parameter input screen permitting Pattern Makers to define rules in simple terms that are automatically turned into machine understandable rules.

6.8.2.6 The Location of Sleeve Seams

Design Points 25+26 and 42+43 (FIG. 19) Design Points 25 and 42 relate to a front seam and 26 and 43 to a back seam (if two pattern pieces are used).

The location of the two wrist design points defining the end of the seam(s) (Design Points 42 and 43) would normally be defined by reference to the top (or middle), forearm and back line wrist design points in the case of the front seam and by reference to the underarm, forearm and back line wrist design points in the case of the back seam.

6.8.2.7 Kimono Styled Bodices

Design point 44 (FIG. 20) A Kimono styled bodice incorporates the sleeve into the bodice. The key crown of sleeve/armhole design points (i.e. the underarm point and the shoulder point) continue to be used together with such of the other bodice and sleeve design points as may be appropriate. Note that the underarm point will be much further away from the underarm body region than for normal crowns of sleeves. (See FIG. 20)

In the preferred embodiment the shape of the sleeve is defined in the general manner indicated above. However, in certain variations of style it may be desirable to use design points to define the points from which the shape of the sleeve becomes straight. (See FIG. 20)

A drop down menu could provide the following options for the Kimono Underarm Design Point (Design Point 44).

1. The same distance from the end of the sleeve as found with The Model.
2. The proportional distance between the notional underarm point as indicated on FIG. 20 and the end of the sleeve as found with The Model
3. As defined through a parameter input screen permitting Pattern Makers to define rules in simple terms that are automatically turned into machine understandable rules.

6.8.2.8 Raglan Sleeves

Design Points 1, 2 and 3 and 45, 46 (FIG. 21) Raglan sleeves extend across the shoulder or chest area to the neck of the garment. Starting with the notched pattern pieces the first two of the four key design points are the familiar front neck point (Design Point 3), and the underarm point (Design Point ). The options for the definition of the location of these design points relative to the neck body region and the underarm body region have been described above.

With a raglan sleeve the locations of the "Front Raglan Neck Point" (Design Point 45) and the "Back Raglan Neck Point" (Design Point 46) need to be defined.

A drop down menu could provide the following options for the Front Raglan neck point.

1. The distance from the side neck point as found with The Model (default).
2. The proportion of the distance from the nape point (Design Point 1) to the side neck point (Design Point 2) as found with The Model.
3. As defined through a parameter input screen permitting Pattern Makers to define rules in simple terms that are automatically turned into machine understandable rules.

A drop down menu could provide the following options for the Back Raglan neck point.

1. The distance from the side neck point (Design Point 2) as found with The Model (default).
2. The proportion of the distance from the side neck point (Design Point 2) to the front neck point (Design Point 3) as found with The Model.
3. As defined through a parameter input screen permitting Pattern Makers to define rules in simple terms that are automatically turned into machine understandable rules.

The remaining design points are obtained and defined according to the general bodice and sleeve procedures with the exception that the top line length of the sleeve is defined from the side neck design point rather than from the shoulder design point.

Note that the general 3D Tailoring procedures maintains a shape for the armhole/crown of sleeve that is as similar as possible to the base garment.

6.8.2.9 Cuffs

Cuffs conventionally pull in the bottom of the sleeve for a neater fit around the wrist but may also be a significant style element of the design. They have the effect therefore of effecting the shape of the garment as worn and this will be apparent from the 3D representation of the base design on The Model and the mechanics by which this is achieved will have been replicated in the process of creating the first 3D representation of the base design. (See section 6.2).

The changes in the 3D Tailoring process will be quite minor and readily handled by the general principles of the 3D process explained herein.

6.8.3 Skirts

Looseness The looseness of the skirt at the waist, hip and hem were discussed in 6.7.1 above.

Figure 22:
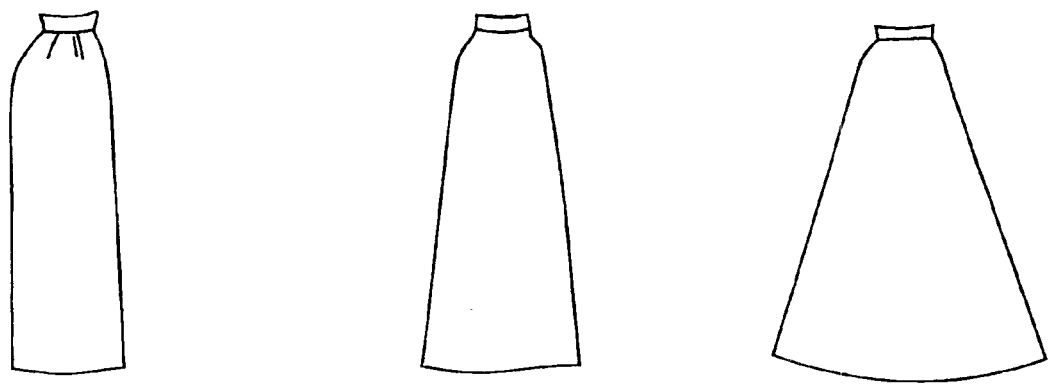
Figure 23:
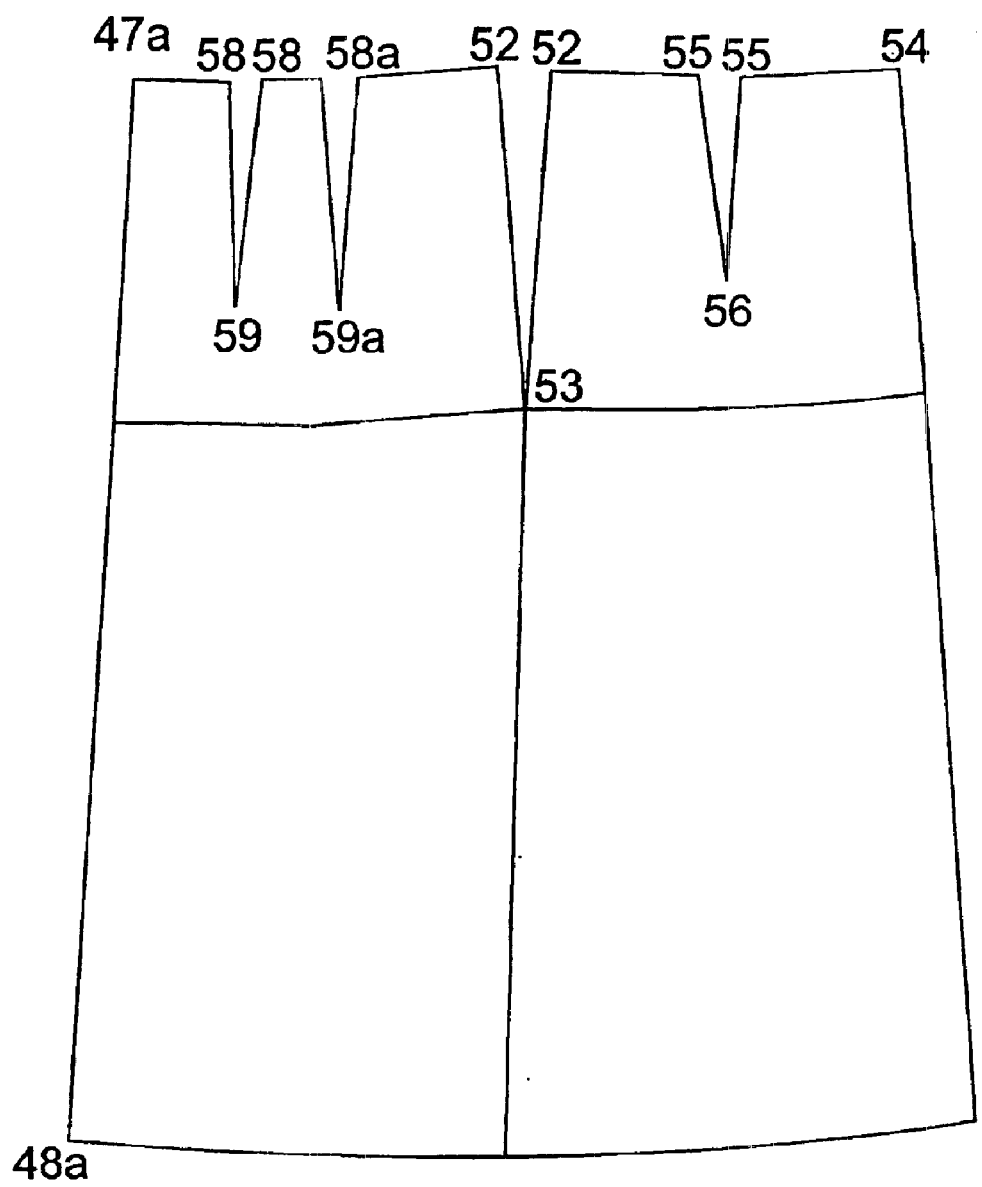
Figure 24:
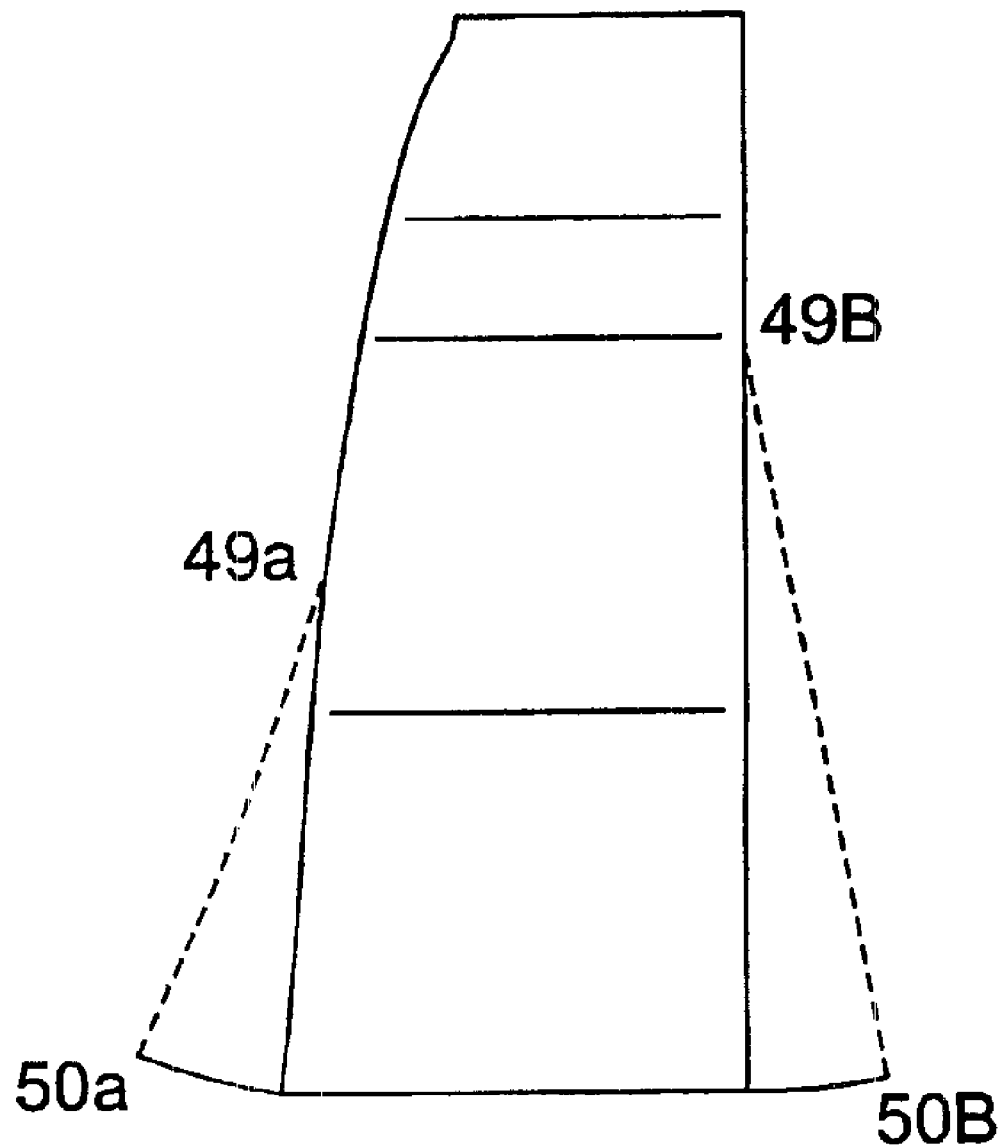
Figure 25:
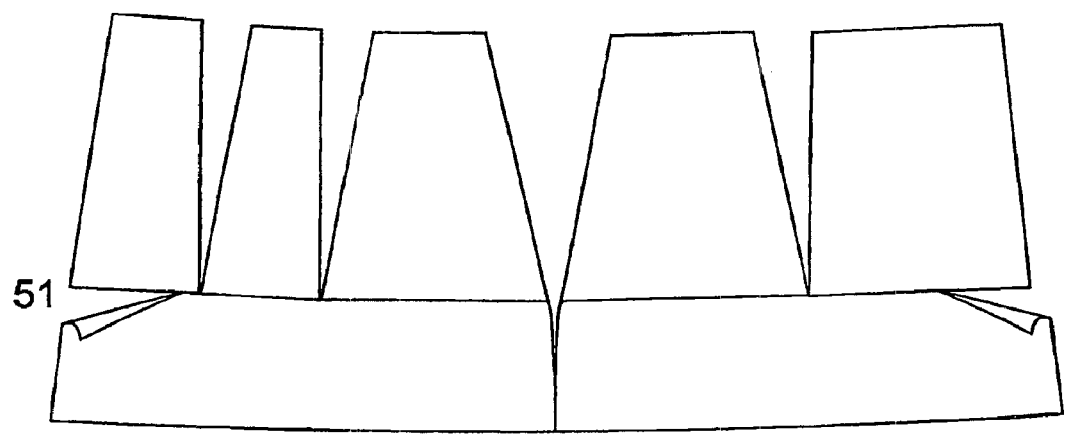

The basic shape of a skirt FIG. 22 shows the three basic shapes of a dress namely a straight skirt, a slightly shaped skirt and a bell shaped skirt. The hip width is normally constant making the waistline smaller with the widely flared bell shaped skirt and larger with the straight skirt. This leaves a greater or lesser waist reduction requirement in order to have a well fitting waist line.

We start by examining individual pattern pieces (or "gores" where there is fullness added to the panel) that make up the skirt. We go on from there to examine the 3D techniques for waist fullness reduction.

6.8.3.1 The Size and Shape of the Panel or Gore

Design Points 47A and 47B, 48A and 48B (FIG. 23) A skirt at its simplest has two panels or gores joined at the side seams. There may be 4, 6, 8, 12, 16 or (in theory) any number of panels or gores which may be of different widths. In a simple embodiment each panel or gore is individually defined. Those practiced in the art of computer programming will readily see methods of providing default but amendable solutions for each successive panel or gore based on the initial piece to be defined.

In this section we look at a simple form of panel (FIG. 23) that is, straight edged apart from a concealed seam dart. In the next section we go on to look at gores with additional fulln ss (also illustrated in FIG. 23.)

In 3D tailoring the number of panels or gores is a function of the base garment. The sum of the added width for each gore equals the overall additional width of the hem of the skirt providing the basic character of the skirt.

Note that the panels or gores may not be identical so that Design Points for each panel or gore may need to be input. In the preferred embodiment a logical sequence (from centre back and round the body) would be used. Note that the number of panels or gores could vary with the shape of the consumer. This would be constrained by rules as to maximum and minimum gore widths (normally at the top).

Design Point 47A and 47B The top of the panel or gore The location of the top corners of the panel or gore will be on or related to the waist construction line. A drop down menu could provide the following options for the vertical location.

1. The same distance from the waist construction line as found with The Model.
2. The same proportionate distance between the waist construction line and the hip construction line as found with The Model.
3. As defined through a parameter input screen permitting Pattern Makers to define rules in simple terms that are automatically turned into machine understandable rules.

The width as found with The Model is relevant (see below) although this may be varied with different consumers.

The depth of the panel or gore Two design points (Design Points 48A and 48B) define the depth of the panel or gore, the two points defining the two ends of the panel or gore. Note that to obtain a level hem additional length may be required for panels or gores at the back between the waist and the hip line. A drop down menu could accordingly provide the following options for Design Point 48A and 48B.

1. The distance beneath the hip line as found with The Model.
2. The distance above or below the knee line as found with The Model.
3. The distance above the ankle line as found with The Model
4. The proportion of the distance from the hip line to the knee line as found with The Model.
5. The proportion of the distance from the knee line to the line of the ankle as found with The Model.
6. As defined through a parameter input screen permitting Pattern Makers to define rules in simple terms that are automatically turned into machine understandable rules.

The bottom width of the gore Design Points 48A and 48B are used to define the additional width of the gore relative to the width of the gore at the waist. Both sides may need to be defined (hence the two divisions of the Design Point) since the additions may be uneven in order to produce specific style effects (e.g. to conceal a seam by a "flare").

A drop down menu could provide the following options
1. The actual additional width over the width at the waist as found with The Model
2. The proportionate increase over the width at the waist as found with The Model.
3. As defined through a parameter input screen permitting Pattern Makers to define rules in simple terms that are automatically turned into machine understandable rules.

6.8.3.2 Adding Fullness to Gores

Design Points 49A and 49B, 50A and 50B (FIG. 24) The gores may have width added and different gores in the skirt may have different additions. This will have been decided by the Designer/Pattern Maker when making the base garment.

Design Points 49A and 49B These Design Points define the position on the seam from where the fullness is added. (Note that the general capability of the 3D approach will handle the shape of the curve or "spline".)

A drop down menu could provide the following options for the location of the Design Points.
1. The same distance beneath (or above) the hip line (or knee line) as found with The Model.
2. As (1) but plus (minus) x percent of the increase (decrease) in the distance from hip to knee as compared to The Model.
3. As defined through a parameter input screen permitting Pattern Makers to define rules in simple terms that are automatically turned into machine understandable rules.

Design Points 50A and 50B These Design Points are located through a definition of the added fullness at the hem. A drop down menu could provide the following options for the location of the Design Points.
1. The same additional fullness on the side of the gore in question as found with The Model.
2. As (1) but plus (minus) x percent of the increase (decrease) in the distance from hip to knee as compared to The Model.
3. As defined through a parameter input screen permitting Pattern Makers to define rules in simple terms that are automatically turned into machine understandable rules.

6.8.3.3 Hip Yokes

Design Points 51 (FIG. 25) A shaped hip yoke may be part of almost any type of paneled or gored skirt (e.g. pleated, gathered, flared or plain).

Its function is the equivalent of the top of the skirt and the 3D definition of any darts is as below (Design Points 52 to 58). Design Point 51 determines the depth of the hip yoke.

Design Point 51 A drop down menu could provide the following options for the location of the bottom of the hip yoke.
1. The same distance down from the waist or up or down from the hip as found with The Model (default).
2. The same proportion of the distance from waist to hip as found with The Model.
3. The same distance up from the knee as found with The Model
4. The same proportion of the total skirt length as found with The Model.
5. The same proportion of the distance from waist to knee as found with The Model.
6. As defined through a parameter input screen permitting Pattern Makers to define rules in simple terms that are automatically turned into machine understandable rules.

Waist fullness reduction Waist fullness reduction for a skirt is normally obtained by a major (concealed) dart at the side seam and waist darts at the front and the back. The waist redution mechanisms for trousers are the same though their use is slightly different. (See section 6.8.6 below.)

6.8.3.4 Waist Shaping at the Side Seam

Design Points 52 and 53 (FIG. 23) Design Point 52 is the point on the waist at the centre of the side seam dart.

Its 3D location is defined in relation to the intersection of the waist construction line and the underarm line vertically beneath the underarm point.

Figure 27:
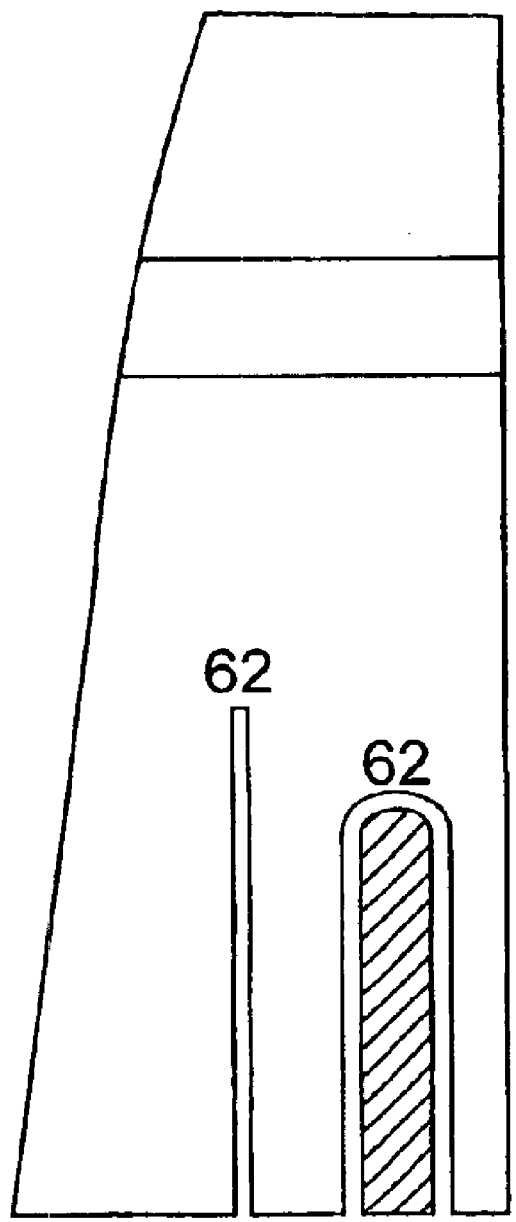

Design Point 52 is commonly at this precise point but may be a little to the front for a tailored skirt or a little back (e.g. to match the bodice side seam) with a dress seam. Trousers commonly have a side seam dart curved slightly to the front as shown with the main trouser diagram (FIG. 27).

The options for a point "forward" or "back" from directly beneath the underarm point would be 1. A fixed distance forward or back.
2. The same distance forward or back as found with The Model.
3. At the intersection with the waistline of the bodice side seam.
4. As defined through a parameter input screen permitting Pattern Makers to define rules in simple terms that are automatically turned into machine understandable rules.

Advanced 3D Tailoring may vary the location of the side seam (that runs up to the underarm point) to reflect the shape and size of individual figures. Experience with the application of the invention may lead to sophisticated rules being developed for very unusual body shapes and sizes.

However, it is likely that satisfactory results in such situations may (as with the bodice side seam) be simply and automatically obtained through the combination of 1. A holistic approach to the warping process that seeks to reconcile the various rules in one overall 3D Tailoring process; and
2. The inherent flexibility introduced into the process by the use of body regions (as opposed to body points).

Design Point 53 is the point of maximum depth of the side seam dart. The wider the dart (and this is a function of the shape of the individual consumer) the deeper it needs to be in order to avoid a "poke" at the top of the seam. So an additional option is appropriate in this instance (option (b) below). So a drop down menu could provide the following options 1. The same distance beneath (or above) the hip line (or waistline) as found with The Model.
2. As (1) but plus (minus) x times the increase (decrease) in the width of the dart as compared to The Model.
3. As defined through a parameter input screen permitting Pattern Makers to define rules in simple terms that are automatically turned into machine understandable rules.

Discussion: Curved Darts The technical methods of establishing the width of darts described below is inherently capable of producing curved, rather than straight edged, darts. It is recognised by those practiced in the art that the optimum shape of the side seam skirt dart is frequently curved with the degree of curve reflecting the individual's particular hip shape. In the preferred embodiment the option of providing curved dart edges would be provided for particular darts (e.g. the side seam dart for a skirt) or generally.

Logic suggests that minor improvements to fit will be obtained by using this automated facility. The constraint will be the willingness/ability of the sewers to accommodate the slightly more demanding technique that would be required.

6.8.3.5 The Centre Front Waist Point

Design point 54 (FIG. 23) The intersection of the centre front line with the waistline is used to locate the position of front darts and the front seam of a four-panelled skirt. The position is fixed and used in the preferred embodiment as a reference for other Design Points.

6.8.3.6 Front Waist Darts

Design points 55 and 56 (and 55A and 56A etc) (FIG. 23) Design Points 55 and 56 define the top and bottom of any front waist darts. The dart may be on the seam of a panel or gore and therefore be hidden. In this case the panel or gore itself determines the horizontal location.

Where the dart is within a panel or gore Design Point 55 is used to define its horizontal location.

Design Point 55 locates the top of the dart by reference to the side seam and or the centre front point. A drop down menu defining the 3D location could provide the following options.

1. The same distance from the centre waist point as found with The Model.
2. The same distance from the side seam as found with The Model.
3. The same proportion of the distance between the side seam and the centre waist point as found with The Model.
4. The same position as the end of a waist dart on a related bodice.
5. The position that allows the underlying program to maintain fit and style in conformity with the "minimalisation procedure".
6. As defined through a parameter input screen permitting Pattern Makers to define rules in simple terms that are automatically turned into machine understandable rules.

Design Point 56 Design Point 56 defines the depth of the dart whether hidden in a seam or within a panel or gore.

A drop down menu could provide the following options.

1. The same distance beneath (or above) the hip line (or waistline) as found with The Model.
2. As (1) but plus or minus x times the increase (decrease) in the width of the dart as compared to The Model.
3. As defined through a parameter input screen permitting Pattern Makers to define rules in simple terms that are automatically turned into machine understandable rules.

Number and type of front waist darts The pattern pieces for the base design will normally indicate the number and types of waist darts that will be used.

In very advanced 3D Tailoring the Pattern Maker may (should the Pattern Maker so wish) include supplementary darts that were not present in the base design but which could be used for particular shapes of individual consumers. The Pattern Maker would use a manual points editor capability to indicate on the 2D pattern pieces the start and end points of the alternative positions that could be used for Design Point 55 (if within a gore) and 56.

Inputs would be made to indicate if the design intention was for the new darts to be alternative or supplementary to the base design waist darts or whether they could be both.

In the preferred embodiment the warping program described below would treat these darts as part of the design and would allocate waist reduction (i.e. width) as required.

(Note: This is a comparable procedure to that used for supplementary bust darts.)

6.8.3.7 The Centre Back Waist Point

Design point 57 (FIG. 23) The intersection of the centre back line with the waistline is used to locate the position of back waist darts and the back seam of a four panelled skirt. The position is fixed and used in the preferred embodiment as a reference for other Design Points. It is immediately below the nape body region.

6.8.3.8 Back Waist Darts

Design points 58 and 59 (and 58A and 59A etc) (FIG. 23) Design Points 58 and 59 define the top and bottom of any back waist darts. As with the front darts the horizontal position of hidden darts is defined by the edge of the panel or gore.

Design Point 58 locates the horizontal position of the top of a hidden dart by reference to the side seam and or the centre back waist point. A drop down menu defining its 3D location could provide the following options.

1. The same distance from the centre back waist point as found with The Model.
2. The same distance from the side seam as found with The Model.

3. The same proportion of the distance between the side seam and the centre back waist point as found with The Model.
4. The position that allows the underlying program to maintain fit and style in conformity with the "minimalisation procedure".
5. As defined through a parameter input screen permitting Pattern Makers to define rules in simple terms that are automatically turned into machine understandable rules.

Design Point 59
1. The same distance beneath (or above) the hip line (or waistline) as found with Th Model.
2. As (1) but plus (minus)×times the increase (decrease) in the width of the dart as compared to The Model.
3. As defined through a parameter input screen permitting Pattern Makers to define rules in simple terms that are automatically turned into machine understandable rules.

Number and type of back waist darts The same procedures as for front waist darts apply.

Suitability: Discussion The waist/hip ratio can materially effect the suitability of different styles of skirts. For example a narrow waisted and large hipped lady is well suited to the bell shaped type of design on the right of FIG. 22. Conversely this type of style would generally be unsuitable for a wide waisted narrow hipped lady. Instead the straight type of style would tend to be more suitable.

In the preferred embodiment the use of a set of eigen shapes would enable Designers/Pattern Makers to make useful inputs on the suitability of the design that they are preparing for 3D Clothing technology.

6.8.3.9 Pleats

Design point 60—To where a pleat is sewn Pleats are most commonly found in skirts and dresses and are described at this point although they can in theory be found elsewhere. For similar reasons we describe folds and gathers at this point although they are frequently encountered in other garments.

A pleated skirt or dress is formed from one or more pattern pieces (possibly under a hip yoke). The pattern pieces may be straight or shaped.

The length is determined in the manner indicated above for the definition of the hemline.

The fit ver the hip is accomplished by the pleats so hip looseness is not relevant unless the pleat is to be stitched down. (In these circumstances the hip looseness is defined in the normal way.)

Design point 60, 60A etc This indicates the point down to which the pleat is to be sewn. A drop down menu could provide the following options.
1. The distance from the waist as found with The Model.
2. The distance from the hem as found with The Model.
3. The proportion from the top of the pattern piece to the overall length of the pattern piece as found with The Model.
4. As defined through a parameter input screen permitting Pattern Makers to define rules in simple terms that are automatically turned into machine understandable rules.

Width of the pleated gores at the hem: Number of pleats The main 3D tailoring variable with pleats is the width of the pattern pieces at the hem. There are no Design Points as the definition is based A drop down menu could provide the following options for the hem width and (a related function) the number of pleats.

1. Make the top width x times the hip measurement and/or as found with The Model (default).
2. Create an additional pleat (or reduce the number by one) if the width of an individual pleat exceeds y cms or is less than z cms.
3. Make the bottom width the same amount bigger than the top width as found with The Model.
4. As defined through a parameter input screen permitting Pattern Makers to define rules in simple terms that are automatically turned into machine understandable rules.

6.8.3.10 Folds

Folds are very similar to unpressed pleats but do not usually continue down to the hem of the skirt. There are no special features for 3D tailoring.

6.8.3.11 Gathers

Gathers may be introduced into skirts in sections i.e. as separate panels or gores. (An additional reason for the preferred embodiment to treat panels or gores individually.) The panels may be straight or shaped. The gather seam may be into a hip yoke.

The 3D tailoring facilities for yokes and pleats are sufficient to define the 3D shape, with the differences being reflected in how the garment hangs (a function of the creation of the 3D representation from the pattern pieces).

6.8.3.12 Flares

Design Point 61 (FIGS. 26A and 26B) Flares are created by manipulating the top edge of a pattern piece so that it drapes in such a way as to produce a fluted fullness often referred to as a "flounce". Traditional tailoring uses two methods to create the pattern pieces: (a) The "Standard Method" (or "Cutting up method"). This method produces the desired pattern pieces in stages. It is the harder of the two methods to operate and needs higher level of skills but can be used for all types of flares. (b) The "Drafting Method" consists of drafting the finished pattern piece, which already contains the flares. It is easier to use but is only suitable (with some exceptions) for circular flounces fixed along horizontal lines around the figure such as circular skirts.

In the preferred embodiment a 3D approach to the universally applicable "Standard Method" has been utilised.

There are four critical and interrelated elements involved.
1. The width of the pattern piece at the lower (normally hem) end.
2. Its relative length as compared to the top of the pattern piece (always bigger than the top, often substantially)
3. The height of the pattern piece.
4. The shape of the curve representing the top of the pattern piece. By way of explanation the overall pattern piece starts as the shape of a vertically (and therefore parallel) sided pattern piece whose top matches the shape of the pattern piece to which the flounce is to be sewn. However, when the bottom width is increased this causes the top to curve to a shape different from the pattern piece edge to which it is sewn. When these two dissimilar edges are sewn together and gravity applied the distortion at the seam combined with gravity produces the flares.

A skilled Pattern Maker uses experience and knowledge of the characteristics of the fabric being used to produce an end result that is pleasing.

In the preferred embodiment of 3D tailoring, flares/flounces are created in the following manner.

Step One Define the 3D location Design Point 61 the top of the flounce. A drop down menu could provide the following options.

1. The point relative to the intersection of the waist construction line and the Centre Line as found with The Model.
2. As defined through a parameter input screen permitting Pattern Makers to define rules in simple terms that are automatically turned into machine understandable rules.

Define the Hem Line as described above.

Step Two Create the remainder of the garment for the consumer in question. Extract the shape of the edge to which the flounce will be sewn. (See FIGS. 26A and 268).

Step Thre Define the height of the flounce. A drop down menu could pr vide the following options.
1. The height (highest part to lowest part) as on The Model.
2. The distance between Design Point 61 and the Hem Line Step Four Define the width of the bottom of the flounce. A drop down menu could provide the following options.
1. As found with The Model
2. As (1) multiplied by the quotient of the height of the flounce with the consumer divided by the height of the flounce with The Model.
3. As defined through a parameter input screen permitting Pattern Makers to define rules in simple terms that are automatically turned into machine understandable rules.

Step Five Create a new shape for the top of the pattern piece so that the bottom is fully flared out. This would be a smooth curve (or curves) that would be automatically computed using capabilities that are well known to those practices in the art.

These steps create the shape of the new pattern piece. It can be output directly for cutting and sewing once the top seam has been defined using the normal flattening methodology. It can be displayed using the procedures for 3D representations (in the currently preferred embodiment the Stitch programme).

Use of different fabrics—Discussion The optimum hem length will vary with the characteristics of the fabric. For this reason the choice of flounce fabrics used in a design is normally limited to those with similar draping characteristics.

Designers and Pattern Makers could well wish to experiment with different fabrics and different hem lengths. This is a 3D Design function of the overall 3D Clothing Technology. The process comprises the entry of the characteristics that effect drape into the Stitch programme (or equivalent). The 3D Tailoring rules are then iteratively amended to provide views of the effect on the drape of the flounce. When a pleasing effect has been created the design/fabric/3D Tailoring combination is adopted.

6.8.3.13 Side Flaring

Side flaring is the term used to describe a flared gore that is on the edge or side of a panel. It is a definite (rather than a general) way of setting and draping a fabric. The critical factors are the same as for a general flare or flounce, namely the height of the side flare, the shape of the upper seam and the additional width of the hem. The procedures set out above may be applied.

6.8.3.14 Godets

Design Points 62 and 63 (FIG. 27)

Godets are shaped sections inset into a straight pattern piece that give the effect of flaring. The inset is commonly a slit but may also be a strip of a certain width that may be pointed, square or curved at the top. Design point 62 is the location of the top of the godet and would normally be defined as a distance up from the hem. Design point 63 is the distance down that it is sewn and might be defined as a distance or a proportion of the height of the godet.

6.8.4 Dresses and Coats

Dresses and coats can be regarded as bodices with an extension to the hem or as a combined bodice and skirt. The more normal approach is to view a dress or a coat as a hip length bodice that has been extended. Plainly with a coat there is a much higher degree of looseness and quite different fabrics are used. However, there is no fundamental difference in the manner of construction.

6.8.5 Overalls

Overalls can similarly be viewed as combined bodices and trousers.

6.8.6 Trousers

Looseness Looseness at the waist and hip were discussed in 6.7.1. Three additional looseness that are particular to trousers are referred to herein, namely the looseness at the "High Yoke Line", at the knee and at the ankle.

Comparison to skirts In traditional tailoring a "block" for trousers builds on a skirt block. However the shape of trousers does not include the added width found at the bottom of the skirt (See FIG. 22) that with a skirt automatically provides a degree of fullness reduction at the waist. As a result there needs to be a greater degree of fullness reduction through waist darts and at the seams than for skirts.

6.8.6.1 Construction Lines

The waist and hip and hem construction lines have been discussed above. With trousers the "bottom trouser line" replaces the hem construction line. The knee point is a design point that provides a reference line. It is not of such major importance as to be deemed a construction line. Similarly the "High Yoke Line" is a line where the looseness is relevant. Again, however, it is not of such significance as to merit description as a construction line.

6.8.6.2 The Line of the Waist

Figure 28:
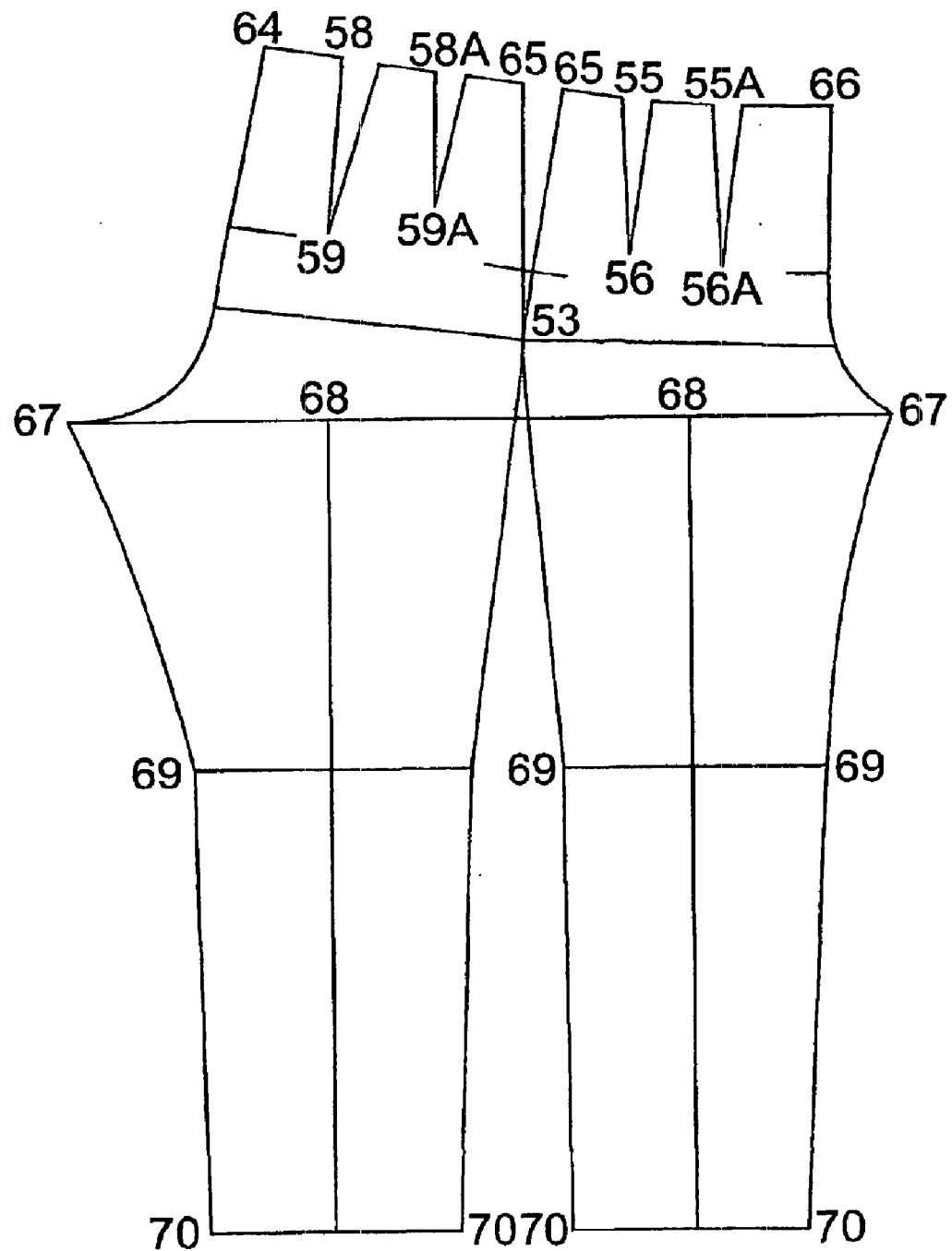

Design Points 64, 65 and 66 (FIG. 28) FIG. 28 shows a typical 2D trouser block.

Design Point 64 is the top of the waist on the garment at the back. A drop down menu could provide the following options.
1. On the back line the same distance from the waist construction line as found with The Model. (Default)
2. The same proportionate distance between the waist construction line and the hip construction line as found with The Model.
3. The same proportionate distance between the waist construction line and the high yoke line (see below) as found with The Model.
4. As defined through a parameter input screen permitting Pattern Makers to define rules in simple terms that are automatically turned into machine understandable rules.

(NOTE: Options (2) and (3) are of particular relevance with hipsters that might be some 5–6 cm below the waist construction line.)

Design Point 65 is the top of the waist of the garment at the top of the side seam. Design Point 66 is the top of the waist on the front line. Comparable options would be provided as for Design Point 64.

6.8.6.3 Waist Fullness Reduction

Design Points 52, 53, 54, 55, (55A etc) 56 (56A etc), 57, 58 (58A), 59 (59A) FIG. 28

The design points and drop down menu options for waist fullness for a skirt can be used for trousers and in the preferred embodiment the same numbers for the design points would be used.

6.8.6.4 Looseness

Waist and hip looseness at the front and the back (separate computations) have been described above with the bodice. (See 6.7.1.2 and 6.7.1.3) namely 1. Maintain the same looseness at the back and the front as found with The Model (default)
2. Increase (or reduce) the waist or hip looseness at the back and/or the front by x cms if the waist measurement is greater (less) than y cms.
3. Increase (or reduce) the waist or hip looseness at the back and/or the front by x cms for every y cms the waist measurement is greater (less) than z cms.
4. Increase (or reduce) the waist or hip looseness in the same manner as prescribed for a related Eigen shape.
5. As defined through a parameter input screen permitting Pattern Makers to define rules in simple terms that are automatically turned into machine understandable rules.

The looseness around the "High Yoke Line" is often helpful in ensuring a good fit to the garment.

A drop down menu could provide the following options for the location of the High Yoke Line.

1. The distance that the High Yoke Line is beneath the Waist Line is x cms (default 11 cms).
2. As defined through a parameter input screen permitting Pattern Makers to define rules in simple terms that are automatically turned into machine understandable rules.

A drop down menu could provide the following options for the looseness at the High Yoke Line 1. Maintain the same looseness at the back and the front as found with The Model (default)
2. Increase (or reduce) the High Yoke Line looseness at the back and/or the front by x cms if the waist measurement is greater (less) than y cms.
3. Increase (or reduce) the High Yoke Line looseness at the back and/or the front by x cms for every y cms the waist measurement is greater (less) than z cms.
4. Increase (or reduce) the High Yoke Line looseness in the same manner as prescribed for a related Eigen shape.
5. As defined through a parameter input screen permitting Pattern Makers to define rules in simple terms that are automatically turned into machine understandable rules.

The looseness at the knee and the ankle is rarely directly relevant since the line of the trouser leg is the dominant factor. However, the looseness in these two places would need to be defined so as to provide a minimum looseness. A drop down menu could provide the following options.

1. The looseness at the knee (or ankle) would not be less than x cms
2. The looseness at the knee (or ankle) would be as defined through a parameter input screen permitting Pattern Makers to define rules in simple terms that are automatically turned into machine understandable rules.

6.8.6.5 The Crotch Point

Figure 29:
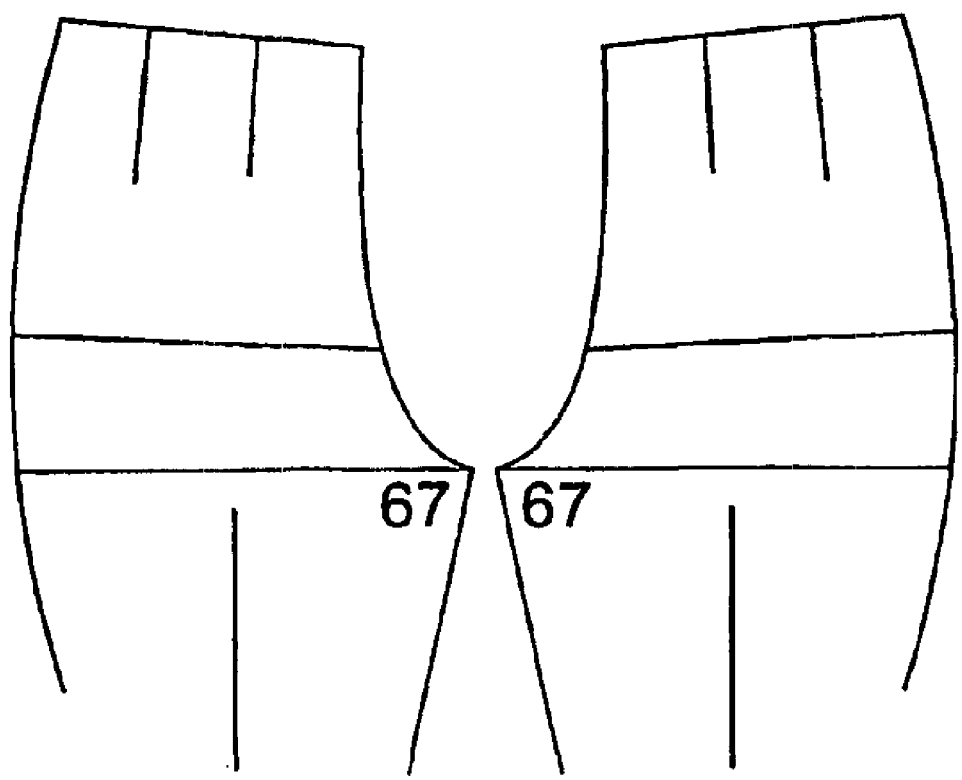

Design Point 67 (FIGS. 28 and 29) The crotch point is of comparably fundamental importance as the underarm point. It is defined by reference to the crotch body region. (The location of this body region will have been defined through the process described in section 6.4 above.) FIG. 29 shows a cross section of the seat were it viewed from the side with the half of the trouser (running from the front zip to the back of trouser seam) removed.

As with the crown of the sleeve various situations that require attention are now considered in order to illustrate the workings of the 3D Tailoring concepts incorporated into this invention.

1. Greater or lesser depths of the crotch (the "bodyrise") in different consumers. This is automatically catered for by the relative 3D positions of the crotch body region and the waist construction line (a body region related line) at the centre back and centre front.
2. Different distributions of the total crotch length between the seat and the front as between different consumers. The warping of the garment and the preservation of the back and front looseness at the hip and the high yoke lines automatically creates a new shape for the pattern pieces that distributes the total crotch length in a variable manner depending upon the individual shapes of the consumers.
3. Style differences. The style of the trousers may be more or less tight fitting. This is automatically picked up from the hip and high yoke looseness and the front and back distribution of the looseness as found with The Model. For instance with the loose fitting culotte style the crotch point will be lower than normal and with a more even distribution of total crotch length between the front and the back.

6.8.6.6 The Crease (or "Balance") Lines

Crease lines are used for getting a correct balance for the trousers through correct positioning of the leg seams.

Design Point 68 The front crease (balance) line (FIG. 28) A drop down menu could provide the following options for locating the vertical location of the front crease line at its intersection with a horizontal line running from the Crotch Point.

1. The mid point between Crotch point and the side seam line (default).
2. The relative distance between the Crotch Point and the side seam line as found with The Model.
3. As defined through a parameter input screen permitting Pattern Makers to define rules in simple terms that are automatically turned into machine understandable rules.

The grain line of the fabric will normally follow the front crease line, with "as found with The Model" providing a fullback for the very rare exceptions.

6.8.6.7 The Line of the Trousers

Design Point 69 and Design Point 70 (FIG. 28) The line of the trousers is normally a function of the style of the garment. A drop down menu could provide the following options.

1. Preserve as far as possible the line of the trouser from the line of the crotch to the bottom of the trouser as found with The Model.
2. Maintain the width at the knee and the ankle as found with The Model
3. As defined through a parameter input screen permitting Pattern Makers to define rules in simple terms that are automatically turned into machine understandable rules.

Where the width is to be maintained Design Point 66 defines the location of the knee level where the width is to be maintained as found with The Model and Design Point 67 the bottom of the trousers.

Design Point 69 The knee design point The location opposite the centre of the knee body region.

Design Point 70 The bottom of trousers A drop down menu could provide the following options.
1. The distance above or below the ankle body region as found with The Model.
2. The relative distance between the ankle and knee body region as found with The Model.
3. The distance beneath the knee body region as found with The Model.
4. As defined through a parameter input screen permitting Pattern Makers to define rules in simple terms that are automatically turned into machine understandable rules.

6.8.6.8 The Length of the Trousers

The length of the trousers is, of course, defined by Design Point 70.

6.9 3D Designing

The process described above can be used in a different manner to assist Designers and Pattern Makers in their work.

The nature of the base garment has been defined by the 3D Tailoring rules. If the rules were to be modified to fit The Model (or any consumer) the design itself would be modified. In practical terms any number of the features of the design described in detail above could be modified very simply making it possible to experiment with numerous iterations of the original version that the skills and expertise of Designer and/or Pattern Makers suggest would be worth while an experiment.

Fit can also be examined by Pattern Makers on the screen by turning the 3D garment into a mesh that enables the fit on the body to be readily inspected from whatever perspective is felt to be helpful.

As a further example, Pattern Makers might find that the initial version of the base design did not conform to the 3D Tailoring rules. They could then use the 3D Design facilities to create and unwrap a garment that did so conform thereby improving the quality of the pattern pieces.

6.10 3D Tailoring from a Traditional Perspective

This section describes the proc ss of 3D Tailoring from the perspective of those practised in the art of 2D Clothing Technology.

6.10.1 Recapitulation on the Outcome of the Steps to Date
1. The key fit related design points and style related design points have been identified in a 3D context. In effect the 3D effect of the design of the garment has been defined through these two sets of design points.
2. The manner in which fullness will be lost has been identified and defined. This will be some combination of darts (or dart tucks), gathers, open or closed tucks, or ease.
3. These definitions provide a clear framework that is capable of controlling the subsequent processes so that the general intentions of the Designer and of the Pattern Maker can be reflected in the modified garment.
4. The understanding of the Designer's and the Pattern Maker's intentions is further improved by knowledge of the proportionate use of these fullness reducing facilities through having a 3D representation of the base design on The Model that illustrates the design intention.
5. The use of body regions (as opposed to body points) provides a controlled degree of flexibility. It is well known by those practiced in the art that high class tailoring is an appropriate compromise between different and sometimes inconsistent objectives. The controlled flexibility provided by body regions allows for a programmable compromise process within the overall invention.

6.10.2 Creating a Modified 3D Representation

The first step in the task of creating a modified garment for an individual consumer is to create a 3D representation of the garment.

Step One is called "the linear warp". In this step the overall garment is made bigger or smaller to reflect the height of the consumer. All elements are scaled up or down and design features and fit mechanisms are unchanged.

The objective of Step One is to minimise the changes necessary in Step Two.

Step Two is to apply the constraints that are implicit in the 3D Tailoring rules so that the intentions of the Designer and the Pattern Maker are reflected in the modified garment.

An important programming principle has been adopted, namely that the changes to the shape of the pattern pieces will be minimised. The effect of this is that the process maximises the degree to which the features of style and fit are maintained.

The flexibility provided by the use of body regions is an important lubricant to a successful completion of this process.

6.10.3 Unwrapping the Pattern Pieces

We now have a 3D representation of the garment, in other words an initial version of what the garment will look like on the consumer. The garment cannot, however, be made until the 3D garment has been turned into 2D pattern pieces. This is a complex process that in the preferred embodiment governed by an overall process of "energy minimisation". The effect of this guiding "unwrapping" principle is to create pattern pieces that have minimised the stretching and pulling of the original pattern pieces. This adds to a maximised maintenance of the degree to which the features of style and fit are maintained.

The overall approach is inherently likely to produce good quality results. It should be noted that it might not be possible to completely flatten the pattern pieces from the 3D representation. This merely reflects the fact that some further very minor compromises will need to be made to accommodate the shape of the consumer in question. Remaking the pattern pieces might therefore produce a very slightly different garment to that seen following the warping process.

In the preferred embodiment a consumer would be presented with this remade garment before ordering a bespoke version of the design.

6.11 Warping

The process of modifying the 3D representation of the garment to fit fashion models or consumers is carried out by warping. The process of warping is well understood. Its application in this area and the manner of its application is novel.

The subsequent unwrapping process (described below) creates the shapes of the individual pattern pieces from and out of the modified 3D representation.

6.11.1 Connections between Design Points

The design points within each feature are the critical points of the design. The warping process described below seeks, as one of the objectives of the warping process, to preserve the 3D curve of the connecting line so far as is consistent with the other objectives of the warping process.

6.11.2 Conformation of the Consumer to the Same Pose as the Model and Subsequent Warping Process The required modification of the garment is suitably computed by warping. For the warping process to work effectively, the pose of The Consumer is conformed into the same pose as that of The Model.

We are presented with:
1. A 3D representation of an article of clothing, with design points identified;
2. A 3D representation (ADM) of The Model for whom the garment was made, which provides the exact relationship between the article of clothing and The Model's body;
3. A 3D model (ADM) of The Consumer, conformed and posed to The Model as closely as possible;
4. A set of 3D tailoring rules, which specify how to transform the clothing of 1 to clothing for 3.

The mechanism by which the rules of 4 are implemented is by a constrained warp, the mechanism for which is described below.

The warping process takes place in two steps:
1. The location of the relevant body points on The Consumer ADM is determined. The points that are relevant are determined by the rules in 4 above, and the location is determined using the clothing of 1 and the ADM of 3.
2. Given the precise location of the points on The Consumer ADM, the clothing model of 1 and the constraints imposed by the 3D tailoring rules of 4 a constrained warp is constructed which generates a model of the article of clothing tailored to The Consumer.

6.11.3 Location of Body Points on the Model

The Model is represented by an ADN. Each body "region" consists of a central point and a "plausible" area around the central point. The reason for use of a "plausible" area is that precise location of body points is difficult and can be subjective.

For any given body region, and a clothing design with its associated rules, there is a set S of design points, for which the distance between the design points and the body region is measured. If S is empty the location of the body point is the central point of the body region, otherwise the point p in the body region which minimises the sum of the distances from points in S to p.

In what follows a "body point" is the 3-D point, lying within the associated body region currently selected to be the "best" point within hte region for the current calculation.

6.11.4 Location of Body Points on the Consumer

The preferred method for location of body points on The Consumer ADM makes use of the 3D clothing model. A centr4 component of this method involves use of the solution to the Ordinary Procrustes problem [Gower, 1975, Goodall, 1991] (OPA). We briefly state the Procrustes algorithm, based on the discussion in [Goodall, 1991].

Given two sets of points $p_i$ and $q_i$, $i \in [1,N]$ we can represent them as Q,P:N×3 matrices. We wish to determine a transformation $(\gamma,\beta,\Gamma)$ such that $$Q = \beta P \Gamma + 1_N \gamma^T$$

where $\Gamma: 3 \times 3$, $|\Gamma|=1$, $\gamma: 3 \times 1$, and $\beta > 0$ is a scalar.

We proceed by removing the translation, scale and rotation in 3 separate steps.
1. Center both P and Q. Let $\overline{Q}=(I_N-1_N 1_N^T/N)Q$ and $\overline{P}=(I_N-1_N 1_N^T/N)P$
2. We remove the scale and rotation from $\overline{P}$. We have $\tau = \|\overline{P}\| = \sqrt{tr(\overline{P}^T \overline{P})}$, which gives the scale $\tau$. We also have $\overline{P}=\tau R=$ $\tau W\Gamma = T\Gamma$, where $\Gamma \in SO(3)$ is a rotation matrix with $|\Gamma|=1$ and W and T are lower triangular matrices with non-negative diagonal elements apart from $W_{33}$ $T_{33}$ which may be positive, negative, or 0. The decomposition $\overline{P}=T\Gamma$ is a QR decomposition computed using only Givens rotations in the QR decomposition [Golub and Van Loan, 1983].

In order to locate The Consumer body points we make use of the following information.

The 3D clothing model M.

The location of Design Points on the 3D clothing model.

The 3D vectors taking D sign Points to body points on The Model. If the Design Points are $d_i, 0 \leq i < n$, and the vectors are $v_i, 0 \leq i < n$, then the body points are $p_i = d_i + v_i$.

The location of the body points (body region centers) $q_i$ on The Consumer ADM.

Let $P = \{p_i | 0 \leq i < n\}$ and $Q = \{q_i | 0 \leq i < n\}$

Given this information the preferred algorithm for body point location on The Consumer ADM proceeds iteratively as follows:
1. Determine a Procrustes transform T from P to Q.
2. Adjust each point qi to be the closest point on The Consumer ADM lying within the plausible area to the transformed point $T(p_i)$.
3. Calculate the mean (pointwise) distance between T(P) and Q. If it less than the previous iteration goto 1 otherwise finish.

6.11.5 The Constrained Warp

Once body points are identified on The Consumer ADM, and the clothing model M the constrained warp is computed and applied.

A variety of choices for the underlying warp function are possible. The principle criteria which must be met are:

The warp should be a function $\phi: R^3 \to R^3$. This allows any topology of clothing to be handled.

The warp should be as smooth as possible. This is essential in order to avoid artifacts in the warp. Typically the solution to this problem is to use regularization [Bajcsy and Kovacic, 1989]. A standard m-th order regularizer is $$\int \sum_{j_1+\ldots+j_d=m} \frac{m!}{j_1! \ldots j_d!} \left| \frac{\partial^m f(x)}{\partial x_1^{j_1} \ldots \partial x_d^{j_d}} \right|^2 dx \qquad (1)$$

We are typically interested in 2nd order regularizers.

It should be possible to impose c nstraints on the warp. This is necessary in order to ensure that the constraints derived from the 3D tailoring rules are met.

Any warp which meets these criteria is suitable for generating the constrained warp. In the preferred implementation we use radial basis function warps, otherwise known as thin plate splines as they have useful variation-diminishing properties [Duchon, 1977]. In three dimensions, for example, the radial function $\phi(x)=|x|$ minimises the 2nd order regularizer of equation 1 among all square integrable functions defined over $R^3$ which meet the pointwise warp constraints.

Other choices of warp, with lower performance in terms of minimization of the regularization term, but with improved computational performance can also be used. An example is the mechanism described in [Szeliski and Lavallee, 1996].

The warp in the preferred implementation is a radial function warp defined as a linear combination of radial basis functions.

$$f(x) = \sum w_i \pi(d_i(x)) + Tx \quad (2)$$

where T is a linear transformation, the function $\phi: R \to R$ is a basis function and $d_i(x)$ is the distance of x to the ith data point $p_i$, or $\|x-p_i\|$. These functions are called radial, since they depend only on the distance of the point x from the data points.

There are many choices of basic function. Examples can be found in [Dyn, 1987,

Schumaker, 1963,

Franke and Nielson, 1991,

Franke, 1982,

Ruprecht and Müller, 1993]. As mentioned above, in three dimensions the choice $\tau(d)=d$, minimises the second order regularizer of equation 1.

In equation 2 T is a general linear transformation. Without this term the use of radial basic functions is unsatisfactory, as warping will take place even if all points retain their original positions (i.e. $p_i=q_i, \forall i$). In three dimensions this linear polynomial term is required in rder to obtain the variation-diminishing properties mentioned above. Calculation of the coefficients of the radial functions is discussed below.

The function f in Equation 2 above is separable, in that $f \equiv (f_x, f_y, f_z)$, with warping performed separately in x, y, and z. If we let $\{\xi_i : i=1, 2, 3\}$ denote the components x, y, z of 3-space, then we are seeking functions $f_\xi$ satisfying $$f_\xi(p) = \sum_i \lambda_i^\xi \|p - p_i\| + \pi_\xi(p), \pi \in \Pi_1 \quad (3)$$

$$f_\xi(p_i) = q_i, 0 \leq i < n \quad (4)$$

$$\sum_i \lambda_i^\xi q_\xi(p_i) = 0, q_\xi \in \Pi_1 \quad (5)$$

where $\pi_1$ is the class of linear polynomials.

A measure of the overall smoothness (sometimes called the bending energy) of a warp f is given by the function:

$$J(f_\xi) = \int_{R^3} \sum_{i=1}^{3} \sum_{j=1}^{3} \left[\frac{\partial^2 f_\xi(p)}{\partial \xi_i \partial \xi_j}\right]^2 dp \quad (6)$$

where the index $\xi$ indicates any of the $\xi_i$, $\leq i < 2$. This expression is minimised by the radial function $\phi(d) = d^2 \log d$ in 2-D, and by $\phi(d) = d$ in 3-D. This expression is the same as that for the regularization term in Equation 1. The calculation of the basis function weights also provides a measure of $J(f_\xi)$ as follows. If, following the definition of the warp function f above we let $\phi_{ij} = \phi(\|p_i - p_j\|)$ and $\Phi = (\phi_{ij})$, then if $\Lambda^\xi = (\lambda_0^\xi, \ldots, \lambda_{n-1}^\xi)^{Ta}$, the expression $$\sum_\xi \Lambda^{\xi T} \Phi \Lambda^\xi \quad (7)$$

is the bending energy. This is the expression to be minimised when we come to consider the use of constraints.

For simplicity of exposition we first consider basic warping without constraints.

The broad outline of the process is:

1. Identify a set of points $P = p_i, 0 \leq i < n$ on the source surface, and matching points $Q = q_i, 0 \leq i < n$ on the target surface.

2. Determine a radial-basis warp W from P to Q.

The identification of the target points in 1 is now recapitulated. The stages by which the target points are acquired are:

1. Scans are made of a Model, with (MC) and without (MU) clothing, and of The Consumer without clothing (CU). Scans (MU) and (CU) have an ADM fitted.

2. Design points, are identified on the clothing worn by The Model from scan (MC).

3. The Model's ADM from (MU) is posed to the body in (MC).

4. The vector between the design points on (MC), and the body points on MU is determined for each design point $d_i$. Let these vectors be $v_i$. If the body points on the posed ADM for (MC) are $p_i$, then $p_i = v_i + d_i$.

5. The Consumer ADM, from (CU), is posed to the The Model's ADM from stage 3.

6. Let the body points on the posed Consumer ADM be $q_i$.

We now explain the form of the Radial Basic Warp in point 2 above, and the algorithm by which it is calculated. For the basic warp we establish a smooth 3-D space warp mapping $p_i$ to $q_i$.

The system of equations solved for is:

$$f_\xi(p) = \sum_i \lambda_\xi \|p - p_i\| + \pi_\xi(p), \pi \in \Pi_1$$

$$f_\xi(p_i) = q_i, 0 \leq i < n$$

$$\sum_i \lambda_\xi q_\xi(p_i) = 0, q_\xi \in \Pi_1$$

where $\pi_1$ is the class of linear polynomials. Note that there 3 values for $\xi$ (the x, y, and z axes), so there are 3 systems being solved for.

This system can be written in matrix form. We write $\phi(p_i, q_j) = \|p_i - q_j\|$ as $\phi_{ij}$, and we write the $\xi$th component of point p as $p^\xi$.

$$\begin{pmatrix} \phi_{00} & \cdots & \phi_{0n} & 1 & p_0^x & p_0^y & p_0^z \\ \vdots & \vdots & \vdots & \vdots & \vdots & \vdots & \vdots \\ \phi_{n0} & \cdots & \phi_{nn} & 1 & p_n^x & p_n^y & p_n^z \\ 1 & \cdots & 1 & 0 & 0 & 0 & 0 \\ p_0^x & \cdots & p_n^x & 0 & 0 & 0 & 0 \\ p_0^y & \cdots & p_n^y & 0 & 0 & 0 & 0 \\ p_0^z & \cdots & p_n^z & 0 & 0 & 0 & 0 \end{pmatrix} \begin{pmatrix} \lambda_0^\xi \\ \vdots \\ \lambda_n^\xi \\ t_{\xi 3} \\ t_{\xi 0} \\ t_{\xi 1} \\ t_{\xi 2} \end{pmatrix} = \begin{pmatrix} q_0^\xi \\ \vdots \\ q_n^\xi \\ 0 \\ 0 \\ 0 \\ 0 \end{pmatrix} \quad (8)$$

For notational convenience we can write this as $$\begin{pmatrix} \Phi & P \\ P & 0 \end{pmatrix} \begin{pmatrix} \Lambda^\xi \\ t^\xi \end{pmatrix} = \begin{pmatrix} q^\xi \\ 0 \end{pmatrix} \quad (9)$$

In our preferred implementation these equations are solved by LU decomposition (see [Golub and Van Loan, 1983]). We have not encountered numerical stability problems, although if the leading n×n submatrix above is ill-conditioned the approaches of [Dyn et al., 1986] and [Dyn and Levin, 1983], improved in [Sibson and Stone, 1991] are applicable.

It should be noted that if we write $$A = \begin{pmatrix} \Phi & P \\ P & 0 \end{pmatrix}$$

and identify the the upper n×n submatrix of $A^{-1}$ as $\Theta$, then $$\sum_\xi q^{\xi T} \Theta q^\xi = \sum_\xi \Lambda^{\xi T} \Phi \Lambda^\xi \quad (10)$$

In many cases this provides a more convenient expression for the bending energy, as it is dependent only on q.

It should be noted that direct solution of Equation 9 requires $o(n^3)$ time and $o(n^2)$ space. This makes it infeasible to solve problems with more than about 1000 points with the current generation of desktop computers, and makes it infeasible to solve problems with more than 100,000 points for the foreseeable future.

6.11.6 The Constraint Framework

We now turn to consideration of constraints. Recall that certain points on the body are associated with points on the clothing. These provide an initial warp specification. Additional constraints, aimed at maintaining the shape of the clothing are specified between points and arcs on the target clothing.

Let us assume that an initial warp function f has been defined from the source to the target clothing. This warp is fixed to the extent that we insist on the mapping between the points defining it. Consider a point p on the source clothing, which we wish to constrain somehow (with constraint C). The "natural" mapping for p is to $f(p)=q$. If q satisfies the constraint we are done, otherwise we shall need to modify the warp f so that p maps to a point q' which does satisfy the constraint. Let us call the modified warp f'. In general there will be many points q' which satisfy C. How do we choose q'? The choice we make is the point q' which minimises the overall smoothness of the resulting warp f'.

Recall from Equation 7 that the expression. $\Sigma_\xi \Lambda^{\xi T} \Phi \Lambda^\xi$ represents the total bending energy of the warp f. This provides us with an optimization framework for calculating f'. Let us assume that we have constraints $C_j, 0 \le j < n_c$ which contain additional source points $p_k, n \le k < n+m$ and their corresponding target points $q_k$. The location of the additional source points is known, the location of the target points is to be determined, as are their weights $w_k, n \le k < n+m$. The system to be solved then becomes $$\min\left(\sum_\xi \Lambda^{\xi T} \Phi \Lambda^\xi\right) \text{ subject to} \quad (11)$$

$$\begin{pmatrix} \Phi & P \\ P & 0 \end{pmatrix} \begin{pmatrix} \Lambda^\xi \\ t^\xi \end{pmatrix} = \begin{pmatrix} q^\xi \\ 0 \end{pmatrix}$$

$$C_i = 0, \ 0 \le i < n_c$$

The variables that ar being solved for here are the co-efficients $\lambda_i^\xi, 0 \le i < n+m$ and the locations of the targ t points $q_i, n \le i < n+m$.

A more efficient formulation, that only involves a single solution of the radial basis equations is based on the expression of Equation 10 for the bending energy $$\min\left(\sum_\xi q^{\xi T} \Theta q^\xi\right) \text{ subject to } C_i = 0, \ 0 \le i < n_c \quad (12)$$

In this simplified version we are solving just for the location of the target points $q_i, n \le i < n+m$.

There are various methods available for solving a system of this type. In the preferred implementation we cast it into a nonlinear least squares framework by the use of Lagrange multipliers. If we have to minimize a (multivariate) function f, subject to constraints $c_i = 0, i \in I$, this is equivalent to solving the system $\nabla f - \Sigma_i \lambda_i \nabla c_i = 0$ and $c_i = 0, i \in I$. Since this system of equations is non-linear it is important that the solution process starts with a good initial approximation. This is provided by the original warp solution, as by assumption the constraints should make only a small change to the total warp. The nonlinear least squares solution procedure used is the variant of the Levenberg Marquandt procedure described in Moré, 1978].

An alternative solution method is to use a specialised code for constrained nonlinear equations, such as LANCELOT [Conn et al., 1992].

Once the system of Equation 12 is solved we have a warp specified on n+m points.

The iterative constraint solution algorithm is the 3D equivalent of the traditional 2D based process of multiple fittings for made to measure clothing. However, the 3D Tailoring enables a series of "virtual tailoring" iterations to occur almost instantly.

6.11.7 Specific Constraints and their Implementation

We now illustrate constraints which are required in order to maintain the lines of a clothing design during warping. The framework is general, and a wide variety of constraints can be used.

Shapes The preservation of a shape can be done in terms of constraints on its constituent points. Our definition of shape in this context is very specific. We shall consider a configuration of points $\{p_i: 0 \le i < n\}$, with a distinguished point $p_0$. In the general warp, there is a preliminary Affine transform, which we represent by a 4×4 matrix $M_0$, with inverse $M_0^{-1}$. Let $p_0' = M^{-1} f(p_0)$. Let $t_0 = p_0' - p_0$, and let $p_i' = p_i + t_0$. If we now define differences $\{d_j = p_{j-1}: 0 < j < n\}$ then the shape constraint can be specified as: $\{f(p_j) = f(p_0) + Mt_j: 0 < j < n\}$. The initial value for M is $M_0$.

Lines We can specify that a point lies on a line between two other points. This may be either in a plane (typically the x-y plane) or in 3-space. In the collinear 3D case let the point be p, and the points between which it must lie be $p_0$ and $p_1$ (in the source clothing model). Labelling the target points as $q_i$ the constraint is simply that $q = tq_0 + (1-t)q_1$. In the case where the point must lie on the same line when seen from the x-y plane, we simply omit the restriction on the z-axis.

Angles We can specify that the angle formed by three points $p_0$, $p_1$, and $p_2$ is fixed. Let the angle be $\theta$. Let $a_1 = (q_1 - q_0)/\|q_1 - q_0\|$ and $a_2 = (q_2 - q_0)/\|q_2 - q_0\|$. The constraint is that $a_1 \cdot a_2 = \cos \theta$.

Ratios We can preserve the ratio between two line segments. In general we can assume that the line segments contain four distinct points. Let the points in the target be $q_0$, $q_1$, $q_2$, and $q_3$, with line segments $q_1 - q_0$ and $q_3 - q_2$. The constraint is that $\|q_1 - q_0\| = \|q_3 - q_2\|$.

Penetration/Incidence A critical physical constraint is that the clothing must stay outside the body. This constraint is naturally handled as an inequality constraint $(c(x) \ge 0)$, if we induce a signed distance function g on 3-space from the posed Consumer body, with points lying inside the body having a negative value equal to the distance to the body surface, and points outside the body having a positive value equal to the distance to the body surface.

Given this signed distance function the constraint we wish to apply at every node n with location p(n) in the triangle mesh for the clothing is that $g(p(n)) \geq 0$.

6.12 Flattening Pattern Pieces for UV Mapping

When a garment is scanned, and the pattern pieces marked up, the 3D shape corresponding to each pattern piece is, under the assumption that the fabric does not stretch a developable surface [DoCarmo, 1976]. This is a surface that can be flattened without stretching or distortion.

Assume that the segmented pattern piece is represented as a mesh M. For each vertex v of M, let the vertices adjacent to v be $N_v$. Let the location of v be $p_v$. A flattening is a map of the vertices to the UV plane, and we assume for a flattening S of M that the location v is $s_v$. The aim of S is to preserve the distances between the nodes of M as far as possible.

We now describe the preferred implementation of a method for determining a flattening S of M. It is based upon the algorithm of [Ma and Lin, 1988b], refined in [Maillot et al., 1993].

1. Develop an initial approximation to the flattening.
   (a) Set done list to EMPTY
   (b) Set todo list to an arbitrary triangle t in M
   (c) Set node to EMPTY
   (d) Select a triangle t from todo that is not on done. Remove t from todo. If there is no such triangle STOP. Add all the neighbouring triangles (sharing an edge) of t to todo is they are not in done or on todo already.
   (e) If any node v of t is not on node, assign a UV coordinate to v which is consistent with the other labellings of nodes in t and is minimal distance-vise. If there are no such labellings, assign UV mappings consistent with the distance between the nodes of t.
   (f) Add t to done
   (g) Goto id
2. Improve the initial approximation by relaxation. For a node v in M we define a measure of fit $C_v = \Sigma_{v_i \in N(v)} (d(p_v, p_{v_i}) - d(s_v, s_{v_i}))^2$. For the. mesh M we have $C = \Sigma_{v \in M} C_v$. A gradient descent procedure is applied to minimise C, as described in [Ma and Lin, 1988b].
3. Apply the same gradient descent procedure as in step 2 but this time alter the locations of nodes in M, rather than in the UV map.

The algorithm as described leaves a residual error. This error can be minimised by adjusting the positions of the mesh nodes as well as the UV map. This is done in step 3 above.

Given the UV mapping S for the mesh corresponding to a pattern piece M it is possible to generate mapping coordinates for texture mapping by supplying a scale and orientation for the mapping.

6.13 Flattening Pattern Pieces for Cutting

Once a pattern piece has been warped, as described above, it is necessary to flatten it in order to produce adjusted pattern pieces which can be cut to form a garment.

The unflattening process described above is satisfactory for applying a UV map but not for creating pattern pieces which can be used in garment construction. There are two main reasons for this.

1. Although the results are locally correct the global shape is not sufficiently constrained, which leads to (for example) straight lines becoming curves and the pattern pieces being unsuitable for manufacture.
2. It is not feasible to flatten all the pattern pieces for a garment simultaneously, as the overall garment is not a developable surface. There are constraints which apply between pattern pieces which allow them to be sewn together. The previous flattening mechanism cannot handle these constraints.

A different mechanism for manufacturing of pattern pieces is used in this invention. This mechanism operates as follows.

Figure 31:
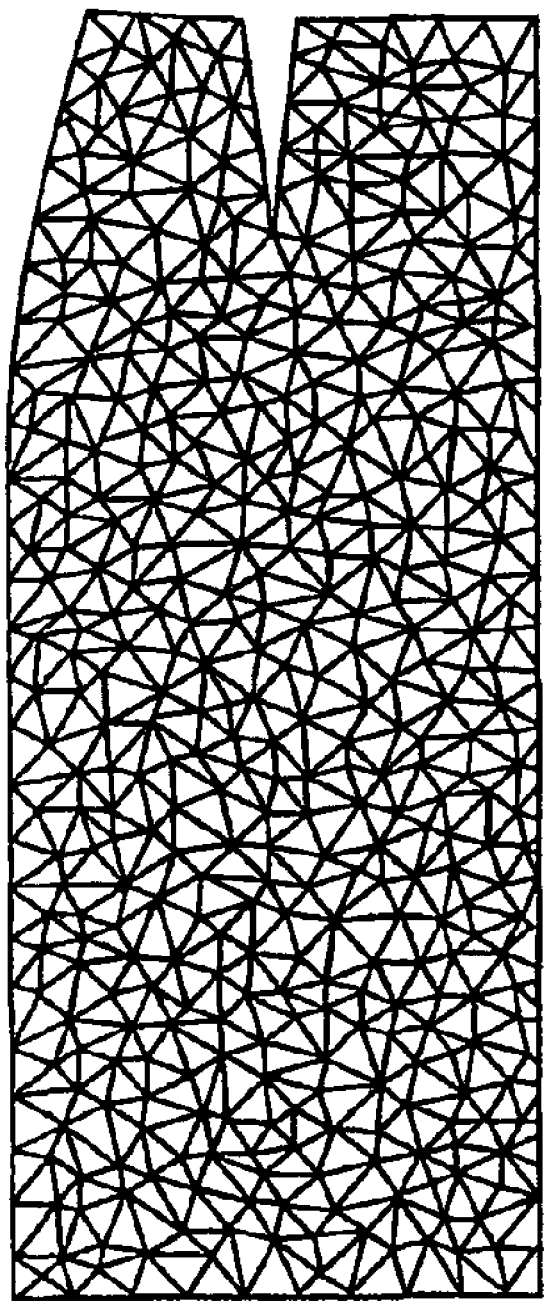
FIG. 31 shows a triangulated pattern piece for skirt

1. An initial set of pattern pieces is created for a source figure. Each pattern piece is represented as a mesh $M_0$ of triangles. One such triangulated pattern piece is shown in FIG. 31. The triangles can be constructed using an algorithm for constrained Delaunay triangulation in 2 dimensions such as that of [Chew, 1989] or [Ruppert, 1995]
2. The pattern pieces are draped on the source (virtual) figure as a stitched garment. This can be done using a program for cloth simulation, such as the Stitch plug-in for 3D Studio Max produced by Size8 Software of Florida, USA.
3. The garment is warped to fit a destination figure using the warping process described above.
4. Each of the warped pattern pieces is flattened, using the constrained flattening method described below. The essential components of this method are
   (a) The shape of the pattern piece mesh $M_0$ is parameterized. The parameters specify the set of possible shapes which the mesh can assume by warping of its triangles. The parameterization is constrained to ensure both that this pattern piece will fit appropriately with the other pieces of the garment, and that the shapes assumed will reflect the original design intention.
   (b) The warping, or distortion, of the original pattern piece is expressed as an internal energy, or strain. A numerical optimization procedure is used to determine the values of the parameters in 4a which minimize the internal energy. The result is a reshaped, flat, pattern piece fitted to the destination figure.

6.13.1 Constrained Flattening Method

We now describe in more detail the preferred method by which a warped pattern piece is flattened by a means of a constrained optimization. The motivation behind the method is to overcome the problems described above which arise in relation to the difficulty of achieving a good global result from a local flattening process and the existence of constraints between pattern pieces.

We are given the original (source) mesh $M_0$ with edges $e_i^0, i \in I$ for the pattern piece, and the destination or warped mesh M with edges $e_i$. Let the lengths of the edges in the original mesh $M_0$ be $l_i^0$, and in M be $l_i$. We can associate a strain energy $\frac{1}{2}\Sigma_i \kappa_i (l_i - l_i^0)^2$ with M. This corresponds to the potential energy of the mesh edges considered as springs with rest length $l_i^0$. Note that many possible formulations of strain energy of this type are possible. This includes, for example, that of [Maillot et al., 1993] considered earlier. Where the type of cloth is significant it may be useful to introduce more sophisticated models, such as that of [Baraff and Witkin, 1998]. In cases where the garment in bias cut a formulation of the mesh as a Tchebychev net [Aono et al., 1996] may be appropriate (this allows shear in the fabric). The formulation we have provided is the simplest and easiest to work with, and suitable in the majority of cases.

Rather than flattening this mesh directly, which leads to the difficulty of achieving a good global solution, we proceed by constraining the flattening to satisfy the constraints necessary for the resulting article of clothing to be constructible.

Figure 32:
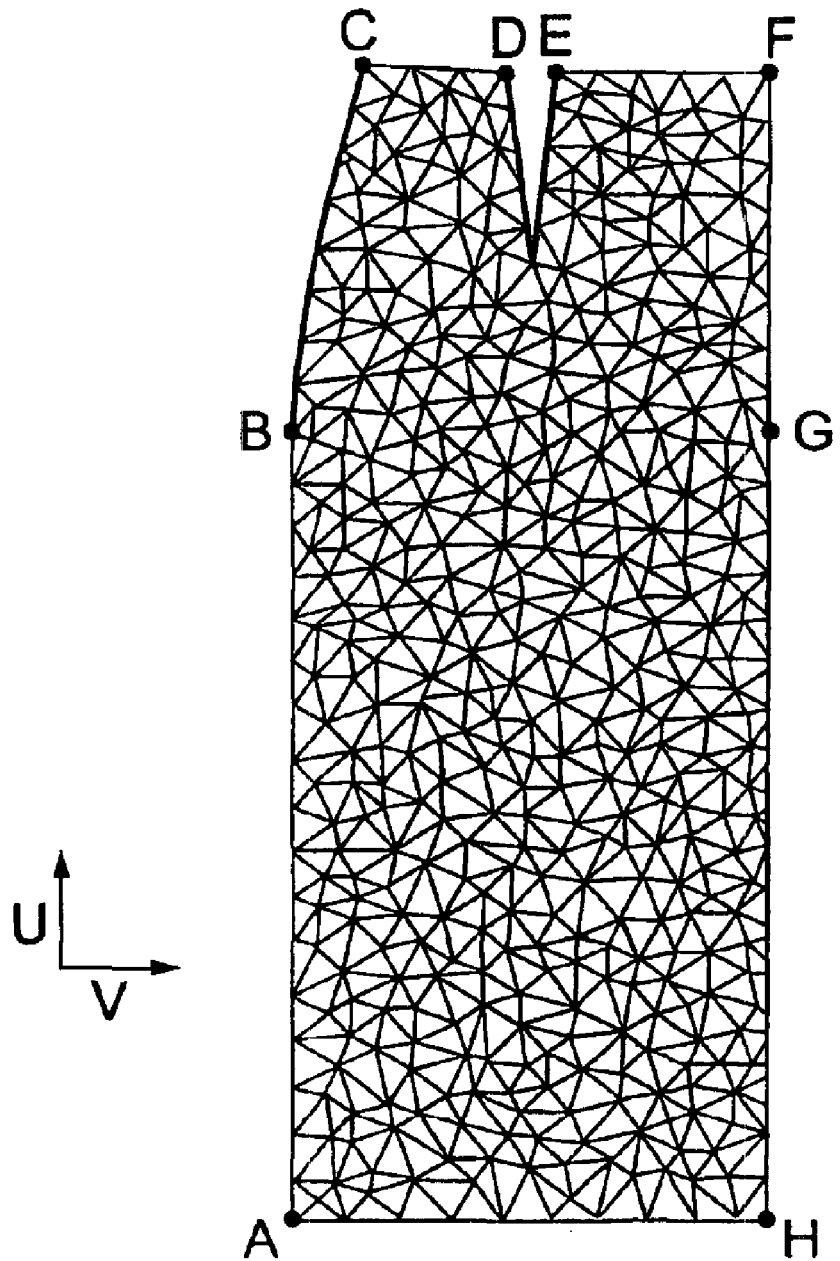
FIG. 32 shows a triangulated pattern piece with rules

FIG. 32 illustrates operation of these constraints, which are constructed in two ways.

1. Each pattern piece's shape is parameterized.
2. Constraints between pattern pieces are imposed.

Shape parameters We illustrate several classes of parameter used to parameterize shapes. The first class is the scaling parameters. In FIG. 32, there is one parameter scale for the overall scaling of the pattern piece in both u and v. A second parameter hscale is for relative scaling on the v axis.

A third scaling parameter relA relates the relative scaling on the u axis between ABGH and BCFG.

The second class is the class of shape parameters. These parameters specify ways in which fullness can be removed in order to shape a garment to better fit a customer.

Fullness is typically removed by the use of darts. In FIG. 32 the segment BC forms a hidden seam dart, while segment DE is a normal dart. The parameter dartBC specifies the dart in terms of the distance between point C and the segment AB extended upwards along the u axis. The parameter dartDE specifies the distance between D and E.

These parameters are illustrative of the ways in which the shape of a pattern piece can be constrained to change. For any class of garment, where the overall number and shape of pattern pieces is similar the parameters can be gathered into a rule set, where only small changes to the value of the parameters is necessary from design to design.

Constraints between and within pattern pieces In order for a garment to be constructible it is necessary to impose constraints between pattern pieces. In the case of the pattern piece of FIG. 32 there is a piece to the left, mirroring the one we see and the distance FG is constrained to be equal to the same length on the other piece. Similarly AB and BC are constrained to have lengths matching their companion seams.

In additional to simple constraints of this kind, it is also desirable to impose constraints which enforce symmetry, or other rules. For example the amount of fullness lost by DE should be equal to that lost by the corresponding dart on the other side of the waist.

The solution mechanism The objective function to be minimised is the strain energy (over all pattern pieces in the design). The variables are the parameters (for all pattern pieces). Typically there will be 100 or less parameters. The constraints used are linear and bounds constraints. There are several codes that solve a constrained nonlinear problem of this sort. A suitable code is LANCELOT [Conn et al., 1992].

The formulation of the system is designed to ensure the fit of the clothing. In general there is a small difference between the warped shape and the unwrapped pattern pieces. This is due to the constrained system being more restricted than the warp. One mechanism by which problems arising from this difference can be minimized is to bias the energy measure, so that it is more desirable to create a garment slightly larger than the warped garment in some dimensions, rather than slightly smaller. This can be done in the case of spring energy weights by reducing the spring constant when the spring is extended rather than compressed.

7 Visualisation

The invention-enables the appearance of the clothes to be visualised, enabling The Consumer to experiment with different textiles and accessories, such as buttons, belts and zips, in a given design.

To capture the texture of the textiles and accessories a separate scan is made of selected textile materials. A flat bed scanner or a suitable camera can be used to capture the appearance of the design in terms of colours, pattern and pattern size. Features such as reflectance (shiny/matt) and surface finish (smooth/rough) may be captured by photographic techniques or coded manually. This collection of data defining the characteristics of a particular textile material is referred to herein as "texture" data. It may also be useful to include the "handle" of the material, i.e. its ability to flow or drape, which can be coded manually, although for many purposes the drape of the material will be suitably captured by the 3D scanning of the garment.

The image data of The Consumer is combined with the image data of the garment and the texture data, and the resulting image displayed on a screen.

A beneficial consequence of this procedure is that the presentation of the clothing textures will be greatly improved since the textiles can be optimally captured when captured separately. This approach has the significant added advantage of allowing any captured fabric to be used with any garment design.

The same principle applies to the accessories used in the design.

The following process is used to combine the garment geometry data defining the garment shape with the garment texture data defining the appearance of the textile.

Step One is to segment the garment into separate tailored components, in practice the pattern pieces that make up the garment. The location of the different accessories is also defined.

Step Two is to define the scale of the fabric, in particular to establish the algorithms that define how the repeat of the features of the fabric are applied, and the "attitude" of the fabric. Textiles are sewn to be horizontal, vertical, or diagonal left and diagonal right to the path of the fabric when unrolled, and the attitude defines this.

Step Three involves the laying out of the segmented pattern pieces in virtual 2D. This is a critical step that also plays a significant role in the production of pattern piece dimensions and shapes for the physical creation of the garment for The Consumer. The laying out of the fabric in 2D enables UV (texture mapping) coordinates to be added. These UV coordinates can then be carried back to the 3D image. The regularity of the UV images makes for top quality texture mapping.

Step Four is to capture images of all the various textiles that could be used with the design in question, which could be done at a location different from that of the garment capture.

Step Five is for The Consumer (or any other operator) to select the fabric and/or accessories to be displayed on the image of The Consumer wearing the garment.

The details of which fabrics are suitable (and available) for a given design is held on the database product described below.

A further refinement may optionally be used in relation to the appearance of The Consumer. It is not possible to define the entire surface of a human body in a scanning operation of a practicable nature, since such a scanning operation should be relatively short and with the subject in a reasonably comfortable and conventional pose. Thus, for example, in an unclothed scan the areas of the underarms and crotch will be undefined. Accordingly, it is preferred to include in the processing of the scan data an operation to "fill in" some approximation of the missing parts of the body. In a modification of the foregoing, instead of capturing a full data set uniquely identifying the person's dimensions, the person is related to one (or a small number) of body shapes predefined in a library of body shapes.

To make this effective requires a large and representative library, perhaps 1000 for each sex. This enables body shape statistics to be obtained by Principal Components Analysis, in terms of variations from the mean body shape for each sex. These principal components (together with the mean body) are described as "eigen-bodies".

Once such statistics have been gathered each scanned body can be described as a generic "mean" body for each sex, and a weighted combination of the principal components.

Cluster analysis of a sample population of actual scanned persons is used to set the component weights at values that make it likely that any person will find a useful match in the library. This technique may enable simplified forms of scanning, or other body identifying techniques, to be used. The closest library body shape for the person would then be used as an avatar in creating a virtual image or pattern piece data.

8 Different Lighting

Environment Lighting & Rendering

It is possible to capture the same images in different lighting conditions and to apply all of these images to the 3D geometry to provide a much higher dynamic range of rendering.

At its most basic the process requires a Dome to be placed around the 3D Data and for the requisite image to be applied outwards to the dome. Lights are then distributed around the dome that correspond to the colour value of the image at a particular location on the dome.

This process provides a convincing and natural lighting effect on the geometry of the garment.

There are two main alternative processes.

1. The first is to apply the lighting to the rendered images (the complete representation of the consumer wearing a garment in particular fabrics). As computer power increases, there is no reason why this process cant be done in real time, though with current PCs the process would currently be too slow to work satisfactorily.
2. An alternative process requiring much less computing power and that can be utilised on current PCs is to "bake" the lightmap (luminance modulation only) as an image to be applied to the geometry in real time. This process would be carried out as a new garment was being prepared for the overall process at the time for example when the first 3D representation of the garment was being created. In the preferred embodiment a set of Domes would be prepared. These Domes would be useable for all garments, with individual decisions being made as to which to use for specific garments.

The initial 3D representation of the garment would be placed into the chosen set of Domes and this would "bake" the lightmap onto the geometry.

The lightmap would transfer quite satisfactorily to the modified geometry and the variable textures of the consumers and the different fabrics used would accept the chosen lighting.

A second and separate use of lighting is to apply shading parameters to the cloth itself through the shader itself. This applies "fresnel" specularity—a type of falloff lighthandling and some bumpiness to the texture. Here the shininess property applies only to the render. There are a number of existing real-time 3D display technologies that handle bumpiness that are known to those practiced in the art.

A third use of lighting is to provide settings on the virtual camera that better matched that of the human eye. This produces a more naturalistic contrast in the rendered image effect.

The three uses of lighting described above can be used combinationally. These basic techniques that have been utilised in the above processes are not novel per se. However, the capability to automatically illuminate The Consumer wearing any garment prepared for that Consumer has major novelty and value within the context of the overall process herein described as well as novel application generally.

9 Suitability

This aspect also builds on the core process whose output has been a 3D geometrical representation of the garment on The Consumer.

In this aspect, the invention enables the suitability of designs for differ nt consumers to be established. The method involves 1. Creation of a database of 3D "eigen-bodies" selected following cluster analysis to ensure that a very high proportion of consumers will have body shapes and dimensions that are very close to one of the Eigen bodies. In the envisaged operation a database of eigen-bodies is created to ensure that the combination of variations from the mean enables a high proportion of consumers to be relatable to an eigen-body.
2. Analysis of each individual design by comparison with the Eigen database to establish the members of the Eigen database for whom the design is suitable.
3. Using the relationship between individual consumers and their "matching eigen-body" to establish which designs in an overall database of designs would suit them best.

10 Recapitulation of the Preferred Embodiment

The procedure described makes it possible to define the garment in terms of core fit related design points and non core feature related design points each of which is related to and spaced in a given relationship from one or more body regions (or in a relationship to other design points directly derived from body regions).

The described procedure works for any garment prepared for 3D Tailoring. The end result of the process is that the key elements of the garment are defined three-dimensionally by reference to a three-dimensional body. The key points on the garment can be relocated to fit any second person by use of the person's 3D size and shape coupled with the various fit and feature rules which constrain the warp used to generate the modified 3D representation of the garment.

The modified 3D representation of the garment is used to produce 2D pattern pieces. These pieces are produced by a constrained energy minimization process, which produces pieces consistent with the modified 3D representation, which can be constructed as a garment.

11 Practical Uses of the Core Facilities

The core facilities are considered to be the ability

To create a 3D representation of the garment and The Model.

To define any garment through the medium of the relationship between the Design Points and the Body Regions (the 3D tailoring rules).

To provide geometric and visual 3D representations of consumers (or fashion models) wearing modified garments enhanced, if required, by the use of special lighting.

To automatically create customised pattern pieces from the 3D representations of the modified garments.

To provide a database of body shapes (the eigen shape database) together with the facility to assess the suitability of designs for individual consumers.

These core facilities can be combined and put to use in many very common clothing situations. The list of scenarios list set out below is indicative only and those practised in the art will find other uses.

11.1 Scenario 1

To create sets of pattern pieces for a range of different sizes possibly using the eigen database of representative shapes and sizes.

11.1.1 The Market Requirement

The task of grading using conventional technology is well known and reasonably efficient. However, the pr cess has to be repeated for each garment.

In addition it is desirable but often impractical to see the sized garments on sample consumers, for example of different ages or races.

11.1.2 The Solution Afforded by the Core Facilities

The core facilities referred to above can be used as follows:—

The base design is created.

Shapes are selected from the eigen database that those responsible for the sizing process consider to be most suitable for the market in which they are selling. Alternatively, a set of representative body models are created from measurements. Alternatively again existing body models are warped to vary specific measurements.

The core facility to fit the garment onto any known 3D shape is used to create the set of pattern pieces from the base design.

The big advantage at this stage is that a single set of body shapes assessed as being suitable for a market can be used for hundreds of designs. In effect the whole grading function can be very substantially automated.

The suitability of the designs in the different sizes can be assessed by viewing the designs on cross sections of the target population.

Sets of pattern pieces can be unwrapped and used to print paper pattern pieces on a chart plotter, for cutting and making up in the traditional way, or can be supplied as a data set to drive a computer controlled cutting machine.

11.2 Scenario 2

To create tweaks to a design by modifying the relationship rules

11.2.1 The Market Requirement

The process of bringing a new garment design to market normally involves frequent changes to the design. These changes are often discussed by many parties in many different locations. Fresh pattern pieces are made following the changes and these pattern pieces (or the re-sewn garment) are frequently dispatched round the world for participants in the re-design process to see the results.

The market requirement is for the process to occur digitally and for the results of changes to be close to instant. This produces time and cost savings even where all the parties are in one location.

11.2.2 The Solution Afforded by the Core Facilities

The core facilities referred to above are used as follows:—

A 3D representation is created of the garment

The 3D tailoring rules are input

Sized versions are created (see Scenario 1)

Inspection of the garment on cross sections of the target population produce unsatisfactory results. The 3D tailoring rules are amended to tweak the design. For example (a) the rules defining the location of the front dart are changed (b) the rules specifying the location of the shoulder point on the garment are brought towards or set further away from the shoulder point body region of the consumer. Amending any of the 3D tailoring rules has the effect of changing the base design. The results can be viewed as a new base design and, if satisfactory, a range of sizes using the facilities described in Scenario One can be produced for insepction, and so on.

11.3 Scenario 3

To use the original 3D representation of the garment, or data modified to fit a selected range of models, to display the clothes in a 3D Catalogue. The 3D Catalogue provides the facility to exchange fabrics and trim as requested and to see different combinations of clothing worn together. Such 3D Catalogue may be used in sales within the trade and to consumers.

11.3.1 The Market Requirement

Those wishing to sell clothing over the Internet or with CDs or DVDs need to be able to show the clothes to best advantage. The first requirement is to display clothes on models, the second to permit consumers to be their own models and to see the clothes as worn by themselves.

In addition it is highly desirable to have an easy to use and rapidly operating facility that allows the garment to be seen with different fabrics and/or different trim. In further addition consumers will wish to see combinations of garments either on a fashion model or on themselves.

These facilities are important to the retailer since good facilities will both increase sales and (by allowing the consumer to see themselves wearing the clothes) reduce misconceived purchases that result in the garment being returned.

11.3.2 The Solution Afforded by the Core Facilities

Those selling garments to the retailer provide the retailer with the 3D representation of the garments together with the 3D tailoring rules and scans of the fabrics and trim used.

The retailer decides on a suitable selection f fashion models to wear the garments. Particular fashion models may be used at the election of the consumer or as determined by the retailer.

The fashion models are simply bodyscanned and there is no requirement for them to model any of the clothes. This makes the use of a wide selection of models entirely practicable. The clothes can be displayed in a variety of different lightings, for example indoors and outdoors. The lighting facility can also be used to show the consumers or the fashion models features to best advantage. The consumer will be able to swap fabrics and trim and to see combinations of clothes. Any facility showing the model can be used with any bodyscanned consumer being able to replace the fashion model. The suitability of designs can be assessed based on the size and shape of the consumer. Consumers can (as one embodiment) elect not to be presented with garments that are unsuitable for them.

11.4 Scenario 4

To use the modified data representing the Consumer wearing the garment to produce instructions for the creation of the pattern pieces that, when sewn together, will produce an actual garment to fit the Consumer.

11.4.1 The Market Requirement

Large numbers of consumers find it difficult to find clothes that suit them and fit them well. In addition sized garments leave considerable amounts of space to minimise the number of consumers that will obtain a poor fit. This limits the degree to which commonly available clothes are well tailored.

From the perspective of the retailer ready to wear clothes tie up money in stock and carry the risk of the garment not being sold.

With a garment made following an order from a consumer these costs are greatly reduced making it feasible to consider a long term evolution towards bespoke clothing not costing significantly more than ready to wear clothes.

11.4.2 The Solution Afforded by the Core Facilities

- Consumers see themselves wearing sized clothes in a 3D Catalogue.
- They like the design but find that it fits them poorly
- They view themselves wearing a bespoke version of the garment and like what they see.
- An order is placed and the system generates the required pattern pieces.
- These are cut out manually or the (2D) digital shape of the pattern pieces are exported to a conventional 2D CAD system that produces an optimum lay of the pattern pieces to minimise wasted fabric. If a computer controlled cutting machine is available the fabrics are cut automatically to the required shape and size. The garment is sewn in the same way as a sized garment (though the organisation of a factory sewing bespoke clothes may be different).
- The finished garment is shipped back to the retailer or directly to the consumer.

11.5 The Database Product

Figure 33:
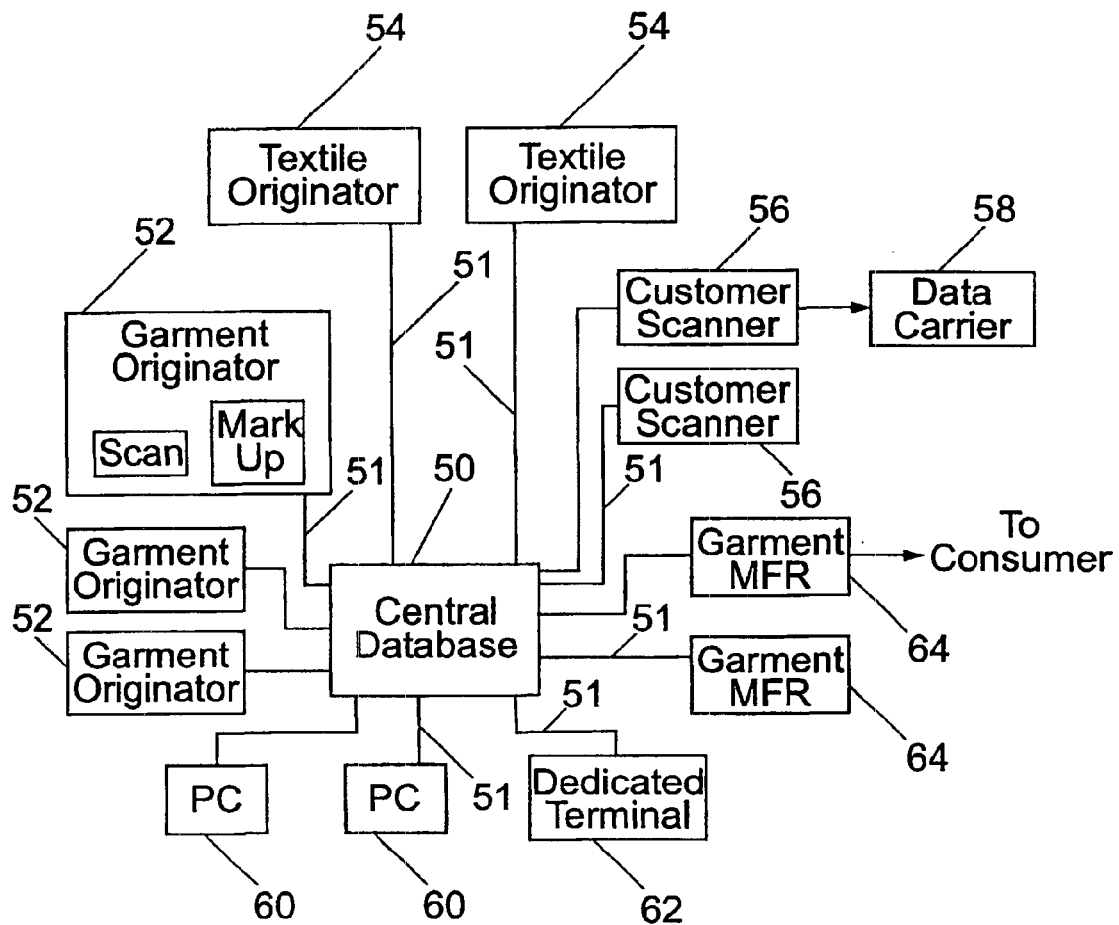
FIG. 33 is a block diagram of a distributed system forming a further embodiment of the invention

Turning now to FIG. 33, a further embodiment of the invention will be described, in which the features described above are used in a distributed system.

The system is based on a central database 50 that communicates with remote locations via communications links such as 51 which may be any suitable communications channel such as landline or cellular telephone or ISDN link. However, the preferred link is via the Internet.

The central database 50 receives and stores data relating to garments from a number of garment originators 52, who may be for example clothing manufacturers or independent design houses. Each garment originator has facilities to scan and mark up the scanned images, and download the data to the central database 50.

The system includes a number of textile originators 54. A textile originator 54 could also be a garment originator 52, or a separate entity such as a textile manufacturer. The textile originators 54 capture and download to the central database 50 data defining texture of various textiles.

The system further includes a number of customer scanners 56. It is envisaged that the scanners 56 would be located in retail premises, but it is also contemplated that the scanners could be provided in the form of stand-alone units similar to photobooths and positioned in locations such as shopping malls.

Each scanner 56 comprises a 3D digital scanner as discussed above, located within a secure enclosure for reasons of privacy and having, for example, a pair of foot positions and a pair of hand grips to assist the user in assuming a standardised pose. The scanner is operated to obtain data defining the body shape of the customer. Such data could be downloaded to the central database 50. However, for reasons of customer privacy and confidentiality, it is preferred that this data is uniquely stored on a data carrier 58 which remains within the custody and control of the customer, with the only data passing to the central database 50 being an identification code identifying that customer. The data carrier 58 may be any convenient storage means such as a floppy disc, CD-ROM or smart card.

To use the system, the customer accesses the central database 50 from any convenient remote location. This could be done via a PC 60, which could for example be in the customer's home, or via a dedicated terminal 62, which could for example be in a retail outlet. The customer loads her/his data carrier 58 in the chosen machine, and can then browse the garments available from the various manufacturers, each in a variety of textiles. Typically, the garments will be viewed in their original size on the garment originator's model, until a garment of particular interest is found. The user can then request to view her/himself in that garment, whereupon the garment data is modified as described above and merged with image data of the exposed parts of the user, to provide a virtual image of the customer wearing that garment as made to her/his size (a "virtual mirror"). Since the data is essentially three dimensional, the virtual image can be manipulated to allow viewing from any chosen angle. L Whenever desired, the customer can input a request to be supplied with the garment as viewed. The central database 50 then downloads data defining that specific garment to a garment manufacturer 64 who can then cut, sew and finish the garment and forward it to the customer, either directly or via a selected retail outlet. It is of course also possible to integrate a conventional payment arrangement in this ordering process, for example by secure transmission of credit card data.

An important preferred feature of the system of the third embodiment is that all the users of the system operate with data in a common format or language. The precise format is not significant so long as all parts of the system are fully interoperable. In this way, the system can function as a network in which users can inter-operate with as few or as many members of the network as they desire. A retail chain could operate with only in-store facilities ordering a limited range of garments from a small number of suppliers, while on the other hand a small specialist manufacturer could offer a bespoke service to individual customers. Data defining garments and textiles can of course be coded to limit availability to predefined users.

Considering the database product in more detail, in preferred forms the database will hold the following information:

- 3D images of each garment
- The rules relating the design points on the garment to a body region or regions
- The textiles and accessories in which that garment is available and, if more than one fabric is used, the sets of pattern pieces that utilise the different textiles
- Images of those textiles and accessories
- Rules defining the manner in which the textiles drape
- Data relating to the orientation of the fabric in the design
- Textual descriptions of the designs, textiles and accessories
- The eigen bodies for which each design is suitable (possibly with a coding system to reflect the difference between "perfectly suitable", "fairly suitable", "unsuitable" etc)

The important feature is that the database is in a standard form. This means that the creators of Virtual Clothes Shops can electronically assemble a selection of clothes from a variety of different suppliers (but all using the 3D Tailoring technology) in an economic and simple manner. Without the standardisation that the database provides, the task of creating Virtual Clothes Shops using 3D Tailoring from multiple suppliers would clearly be a very complex and difficult task. Given the rapidity with which clothing designs change, to reflect prevailing fashions, construction of a standard format database is therefore important to the widespread utilisation of the invention.

Thus in its preferred form, the database product interconnects a number of garment originators, textile originators, garment manufacturers and high street and virtual shops all remote from the location of the database. Improvements and modifications may be incorporated without departing from the scope of the invention as defined in the appended claims.

The invention is based on the concept of modelling a garment design in terms that include a set of rules that define the 3D relationships between particular design points on the garment and particular body regions. In conventional tailoring, the complexity of the 2D based process has severely restricted the designs which can be graded and/or made to measure in any practical or useful way, whereas the present invention allows designs to be readily tailored to individuals, or to be made to order in a much fuller range of "standard" sizes.

The specific design points, body regions, construction lines, relationship rules etc. set out in the foregoing description, whilst representing the preferred embodiments of the invention, should be understood as being exemplary and illustrative, and may be replaced, in whole or in part, and/or supplemented by equivalent, different or additional points, regions, lines, rules etc. Similarly, the particular mathematical models and methods described in relation to body modelling, warping, flattening etc. may be replaced or supplemented by similar or equivalent models and methods.

It will be seen that the invention, in its various aspects, embodiments and applications, provides the basis for integrated processes and systems for designing, manufacturing and selling clothes in a manner that has not hitherto been described or suggested.

REFERENCES

[Aono et al., 1996] Masaki Aono, Paolo Denti, David E. Breen, and Michael J. Wozny. Fitting a woven cloth model to a curved surface: Dart insertion. *IEEE Computer Graphics and Applications*, 16(5):60–70, September 1996.

[Atick et al., 1996a] Joseph J. Atick, Paul A. Griffin, and A. Norman Redlich. Statistical approach to shape from shading: Reconstruction of three-dimensional face surfaces from single two-dimensional images. *Neural Computation*, 8(6):1321–1340, 1996.

[Atick et al., 1996b] Joseph J. Atick, Paul A. Griffin, and A. Norman Redlich. The vocabulary of shape: Principal shapes for probing perception and neural response. *Network: Computation in Neural Systems*, 7:1–5, 1996.

[Bajcsy and Broit, 1982] R. Bajcsy and C. Broit. Matching of deformed images. In *Proc. 6th Int. Joint Conf. Patt. Recog.*, pages 351–353, 1982.

[Bajcsy and Kovacic, 1989] R. Bajcsy and S. Kovacic. Multiresolution elastic matching. *Computer Vision, Graphics, and Image Processing*, 46(1):1–21, April 1989.

[Baraff and Witkin, 1998] David Baraff and Andrew Witkin. Large steps in cloth simulation. In Michael Cohen, editor, *SIGGRAPH 98 Conference Proceedings*, Annual Conference Series, pages 43–54. ACM SIGGRAPH, Addison Wesley, July 1998. ISBN 0-89791-999-8.

[Bennis et al., 1991] Chakib Bennis, Jean-Marc Vézien, Gérard Iglésias, and André Gagalowicz. Piecewise surface flattening for non-distorted texture mapping. In Thomas W. Sederberg, editor, *Computer Graphics (SIGGRAPH '91 Proceedings)*, volume 25, pages 237–246, July 1991.

[Cachier et al., 1999] Pascal Cachier, Xavier Pennec, and Nicholas Ayache. Fast non rigid matching by gradient descent: Study and improvements of the "demons" algorithm. Technical-report, Inria, Institut National de Recherche en Informatique et en Automatique, 1999.

[Carignan et at., 1992] Michel Carignan, Ying Yang, Nadia Magnenat-Thalmann, and Daniel Thalmann. Dressing animated synthetic actors with complex deformable clothes. *Computer Graphics (SIGGRAPH '92 Proceedings)*, 26(2):99–104, July 1992.

[Chew, 1989] L. Paul Chew. Guaranteed-quality triangular meshes. Technical Report TR89–983, Cornell University, Computer Science Department, April 1989.

[Conn et at., 1992] Andrew R. Conn, Nick I. M. Gould, and Philippe L. Toint. Lancelot: *A Fortran Package for Large-Scale Nonlinear Optimization (Release A)*. Number 17 in Springer series in computational mathematics. Springer-Verlag, Berlin, Germany/Heidelberg, Germany/London, UK/etc., September 1992.

[DoCarmo, 1976] Manfredo P. DoCarmo. *Differential Geometry of Curves and Surfaces*. Prentice-Hall Inc., Englewood Cliffs, N.J., 1976.

[Duchon, 1977] J. Duchon. Spline minimizing rotation-invariant semi-norms in sobolev spaces. In W. Schempp and K. Zeller, editors, *Constructive Theory of Functions of Several Variables*, volume 571 of *Lecture Notes in Mathematics*, pages 85–100, 1977.

[Dyn and Levin, 1983] Nira Dyn and David Levin. Iterative solution of systems originating from integral equations and surface interpolation. *SIAM Journal on Numerical Analysis*, 20(2):377–390, April 1983.

[Dyn et at., 1986] N. Dyn, D. Levin, and S. Rippa. Numerical procedures for surface fitting of scattered data by radial basis functions. *SIAM J Sci. Stat. Comput.*, 7:639–659, 1986.

[Dyn, 1987] N. Dyn. Interpolation of scattered data by radial functions. In C. K. Chui, L. L. Schumaker, and F. I. Utreras, editors, *Topics in Multivariate Approximation*, New York, 1987. Academic Press.

[Franke and Nielson, 1991] Richard Franke and Greg M. Nielson. Scattered data interpolation and applications: A tutorial and survey. In H. Hagen and D. Roller, editors, *Geometric Modelling: Methods and their Application*, pages 131–160, Berlin, 1991. Springer Verlag.

[Franke, 1982] Richard Franke. Scattered data interpolation: tests of some methods. *Mathematics of Computation*, 38(157):181–200, January 1982.

[Golub and Van Loan, 1983] Gene H. Golub and Charles F. Van Loan. *Matrix Computations*. Johns Hopkins Series in the Mathematical Sciences. The Johns Hopkins University Press and North Oxford Academic, Baltimore, Md., USA and Oxford, England, 1983.

[Goodall, 1991] C. R. Goodall. Procrustes methods in the statistical analysis of shape (with discussion). *J. Roy. Statist. Soc. Ser. B*, 53:285–339, 1991.

[Gower, 1975] J. C. Gower. Generalized procrustes analysis. *Psychometrika*, 40:33–51, 1975.

[Kass et at., 1987] M. Kass, A. Witkin, and D. Terzopoulos. Snakes: Active contour models. In *Proc. of IEEE Conference on Computer Vision*, pages 259–268, London, England, 8–11 1987.

[Kirby and Sirovich, 1990] M. Kirby and L. Sirovich. Application of the karjunen-loeve procedure for the characterization of human faces. *IEEE Transactions on Pattern Analysis and Machine Intelligence*, 12(1):103–108, 1990.

[Lee et al., 1995] Yuencheng Lee, Demetri Terzopoulos, and Keith Waters. Realistic face modeling for animation. In Robert Cook, editor, *SIGGRAPH 95 Conference Proceedings, Annual Conference Series*, pages 55–62. ACM SIGGRAPH, Addison Wisley, August 1995. held in Los Angeles, Calif., 6–11 August 1995.

[Ma and Lin, 1988a] S. D. Ma and H. Lin. Optimal texture mapping. In P. Duce, D. A.; Jancene, editor, *Proceedings of the European Computer Graphics Conference and Exhibition*, pages 421–428, Nice, France, September 1988. North-Holland.

[Ma and Lin, 1988b] S. D. Ma and H. Lin. Optimal texture mapping. In P. Duce, D. A.; Jancene, editor, *Proceedings of the European Computer Graphics Conference and Exhibition*, pages 421–428, Nice, France, September 1988. North-Holland.

[Maillot et al., 1993] Jérôme Maillot, Hussein Yahia, and Anne Verroust. Interactive texture mapping. In James T. Kajiya, editor, *Computer Graphics (SIGGRAPH '93 Proceedings)*, volume 27, pages 27–34, August 1993.

[Moré, 1978] J. J. More. The Levenberg-Marquardt algorithm: Implementation and theory. In *G. A. Watson, Lecture Notes in Mathematics 630*, pages 105–116, Berlin, 1978. Springer-Verlag.

[Okabe et al., 1992] Hidehiko Okabe, Haruki Imaoka, Takako Tomiha, and Haruo Niwaya. Three dimensional apparel CAD system. In Edwin E. Catmull, editor, *Proceedings of the 19th Annual ACM Conference on Computer Graphics and Interactive Techniques*, pages 105–110, New York, N.Y., USA, July 1992. ACM Press.

[Powell, 1995] M. Powell. A thin plate spline method for mapping curves into curves in two dimensions, 1995.

[Ruppert, 1995] Jim Ruppert. A Delaunay refinement algorithm for quality 2-dimensional mesh generation. *Journal of Algorithms*, 18(3):548–585, May 1995.

[Ruprecht and Miller, 1993] Detlef Ruprecht and Heinrich Müller. Free form deformation with scattered data interpolation methods. In G. Farin, H. Hagen, and H. Noltemeier, editors, *Geometric Modelling (Computing Suppl.* 8), pages 267–281. Springer Verlag, Wien, 1993.

[Schumaker, 1963] L. Schumaker. Fitting surfaces to scattered data. In G. Lorentz, C. Chui, and L. Schumaker, editors, *Approximation Theory II*. Acedemic Press, 1963.

[Sederberg and Parry, 1986] Thomas W. Sederberg and Scott R. Parry. Free-form deformation of solid geometric models. *Computer Graphics*, 20(4):151–160, 1986.

[Sibson and Stone, 1991] Robin Sibson and G. Stone. Computation of thin-plate splines. *SIAM Journal on Scientific and Statistical Computing*, 12(6):1304–1313, November 1991.

[Szeliski and Lavallee, 1996] R. Szeliski and S. Lavallee. Matching 3-d anatomical surfaces with non-rigid deformations using octree splines. *IJCV*, 18:171–186, 1996.

[Turk and Pentland, 1992] M. A. Turk and A. P. Pentland. Face recognition using eigenfaces. In *Proceedings IEEE Computer Society Conference on Computer Vision and Pattern Recognition*, pages 586–590, Hawai, June 1992.

[Weil, 1986] J. Weil. The synthesis of cloth objects. *Computer Graphics (SIGGRAPH '86 Proceedings)*, 20(4):49–54, August 1986.

TABLE ONE

BODY REGIONS AND CONSTRUCTION LINES

Body region Description

| | |
|---|---|
| 1. | Nape |
| 2. | Side Neck |
| 3. | Front Neck |
| 4. | Shoulder |
| 5. | Underarm |
| 6. | Nipple |
| 7. | Elbow |
| 8. | Underarm wrist |
| 9. | Top wrist |
| 10. | Forearm wrist |
| 11. | Back line wrist |
| 12. | Crotch point |
| 13. | Knee |
| 14. | Ankle |

Construction Lines etc

Bust/Chest
True Bust
Waist
Hip
(Hem)
Centre Front Line
Centre Back Line
High Yoke Line (for trousers)
Knee Line
(Bottom of trouser Line)

TABLE TWO

DESIGN POINTS

| | Design Point Description | Associated body region or construction line |
|---|---|---|
| 1. | Nape Point | Nape body region (BR1) |
| 2. | Side Neck Point | Side neck body region (BR2) |
| 3. | Front Neck Point | Front neck body region (BR3) |
| 4. | Shoulder Point | Shoulder body region (BR4) |
| 5. | Underarm Point | Underarm body region (BR5) |
| 6. | Centre Back Slant Line | Centre Back Line |
| 7. | Hemline back seam point | (Hem Line) |
| 8. | Side seam dart max width point | Underarm body region (BR5) |

TABLE TWO-continued

DESIGN POINTS

| | Design Point Description | Associated body region or construction line |
|---|---|---|
| 9. | Side seam hip line | Hip construction line (Hem Line) |
| 10. | End of side seam | Nipple body region (BR6) |
| 11. | Bust dart, nipple point | |
| 12. | Bust dart ending | (Miscellaneous) |
| 13. | Centre Back Dart - widest point | Centre Back Line |
| 14. | Shoulder Blade Dart upper point | Side Neck and Shoulder (BR2/BR4) |
| 15. | Shoulder Blade Dart lower point | Side Neck and Shoulder (BR2/BR4) |
| 16. | Back Waist Dart upper point | Waist and bust construction lines |
| 17. | Back Waist Dart full width point | Waist construction line |
| 18. | Back Waist Dart lower point | Waist and hip construction lines |
| 19. | Concealed back panel darts (upper) | Side Neck and Shoulder (BR2/BR4) |
| 20. | Concealed back panel darts (lower) | (a) Hip and waist construction lines (b) Centre back line and underarm body region (BR5) |
| 21. | Front Waist Dart upper point | Nipple body region |
| 22. | Front Waist Dart full width point | Nipple body region and waist construction line |
| 23. | Front Waist Dart lower point | Nipple body region and hip construction line |
| 24. | Slanted centre front seam, full width point | Centre front line and waist construction line. |
| 25. | Sleeve front seam connection to armhole | Shoulder body region (BR4) and underarm body region (BR5) |
| 26. | Sleeve back seam connection to armhole | Shoulder body region (BR4) and underarm body region (BR5) |
| 27. | Halter mid shoulder point | Side neck body region (BR2) and Shoulder body region (BR4) |
| 28. | Halter underarm point | Underarm body region (BR5) |
| 29. | Halter centre back buttons top | Centre back line and waist construction line. |
| 30. | Bottom of halter back line | Centre back line and waist construction line. |
| 31. | Rever neck point | Side Neck point body region |
| 32. | Rever bottom point | (a) Centre line (b) Bust and waist construction lines |
| 33. | Rever wing point | Miscellaneous |
| 34. | Outer part of a cape point | Nape body region (BR1) Shoulder body region (BR2) Front Neck body region (BR3) Elbow body region (BR7) |
| 35. | Upper (inner) elbow dart point | Elbow body region (BR7) and others |
| 36. | Maximum width elbow dart point | Elbow body region (BR7) and others |
| 37. | Lower (outer) elbow dart point | Elbow body region (BR7) and others |
| 38. | The underarm wrist point | The underarm wrist body region (BR8) |
| 39. | The top wrist point | The top wrist body region (BR9) |
| 40. | The forearm wrist point | The forearm body region (BR10) |
| 41. | The back line wrist point | The back line body region (BR11) |
| 42. | Front sleeve seam wrist point | The wrist body regions (BR12) |
| 43. | Back sleeve seam wrist point | The wrist body regions (BR9–12) |
| 44. | Kimono underarm point | Underarm body region (BR5) |
| 45. | Raglan front neck point | Side neck (BR2) and front neck (BR3) body regions |
| 46. | Raglan back neck point | Side neck (BR2) and nape (BR1) body regions |
| 47. | The top of the gore (A and B) | The waist construction line |
| 48. | The bottom of the gore (A and B) | Hip and or knee construction lines |
| 49. | Start point for added width to gore (A and B) | |
| 50. | Hem location of added width point | Hip construction line |
| 51. | Depth of hip yoke point | Waist and Hip construction lines |
| 52. | Centre of skirt waist side seam dart | Underarm body region and waist construction line |
| 53. | Max depth of waist side seam dart | Waist and or hip construction lines |
| 54. | Centre front waist point | Miscellaneous |
| 55. | Top of front waist dart (skirt) | Miscellaneous |
| 56. | Bottom of front waist dart (skirt) | |
| 57. | Centre Back Waist point | Back centre line and waist construction line |
| 58. | Top of back waist dart (skirt) | Miscellaneous |
| 59. | Bottom of back waist dart (skirt) | Miscellaneous |
| 60. | Point to where a pleat is sewn | Waist construction line + hemline |
| 61. | Top of flounce point | Miscellaneous |
| 62. | Top of godet point | Miscellaneous |
| 63. | End of sewn godet point | Miscellaneous |
| 64. | Top of trouser at waist back | Waist construction line and back line |
| 65. | Top of trouser at waist side | Waist construction line and Underarm body region |
| 66. | Top of trouser at front | Waist construction line and front line |
| 67. | Crotch Point | Crotch body region |
| 68. | Front trouser crease | Crotch body region, underarm point |
| 69. | Knee design point | Knee body region |
| 70. | Bottom of trousers | Ankle and knee body regions |

What is claimed is:

1. A method of processing information relating to a garment, the method comprising:

providing or obtaining information defining the 3D shape of a garment designed to fit and as worn by a first body of a person of a first size and shape;

providing or obtaining data defining the first body's size and shape in 3D without the garment in question;

identifying defined body regions on the first body;

identifying one or more design points on the garment, each design point being related in 3D to one or more the defined body regions of the first body person;

providing relationship rules that define the said 3D relationships between said design points and said body regions;

storing data defining the garment, the design points, the body regions, and the relationship rules, and providing data defining a second body size and shape in three dimensions;

processing said data to identify the defined body regions of the second body; and modifying the data for the garment to define a modified 3D garment which fits the second body by bringing each design point into a predetermined relationship with the associated body region of the second body through the use of the relationship rules.

2. The method of claim 1, wherein modifying the data for the garment to define the modified 3D garment comprises defining a constrained 3D warp function on the basis of the 3D locations of the design points, the body regions of the first body and the body regions of the second body, and the relationship rules, and applying said warp function to the data for the garment.

3. The method of claim 2, wherein the warp function is further constrained so as to maintain selected lines of the garment during warping.

4. The method of claim 2, wherein the warp function is constrained by reference to selected sets of points on the garment, and/or to selected lines on the garment, and/or to angles formed by selected sets of three points on the garment, and/or to ratios between selected line segments on the garment.

5. The method of claim 1, including the further step of producing a three dimensional visual representation of the modified garment utilising the 3D data of the garment and the 3D data of the second body.

6. The method of claim 5, in which said display includes features of the real person from whom the second body size and shape are derived utilising the 3D data of the second body.

7. The method of claim 6, using higher resolution cameras and/or headscanners to capture the geometry and texture of the head of the second body.

8. The method of any of claims 5, including the further step of combining the data defining the geometry of the garment with fabric and/or accessory texture data sets selected from a library defining the texture of a range of fabrics and accessories, each data set comprising some or all of the colour, pattern, bias or grain line and handle of a given cloth.

9. The method of claim 8, in which the data is combined by:
(a) performing a computation to segment the garment into developable segments,
(b) parameterising said segments in such a way as to preserve the metric properties of the surface, and
(c) texture mapping an image of the desired fabric onto the surface.

10. The method of any of claims 1 including the step of outputting pattern piece information in a format permitting cloth to be cut for production of the modified garment.

11. The method of claim 10, in which the pattern piece information is generated by performing an unwrapping operation on the 3D representation of the modified garment, the unwrapping operation comprising (a) defining parameters and constraints of each of the original pattern pieces in the garment, and (b) performing a numerical optimization to determine values of the parameters which minimize the internal energy in each pattern piece in the modified garment within the constraints defined in relation to the original pattern pieces.

12. The method of claim 11, wherein the constraints defined for each of the original pattern pieces are selected so as to maintain predetermined relationships between respective pattern pieces following said numerical optimization.

13. The method of claim 12, wherein the constraints include constraints selected to ensure that predetermined linear edge dimensions of adjacent pattern pieces remain equal or in predetermined relationships following said numerical optimization.

14. The method of claim 12, wherein the constraints include constraints selected to ensure that predetermined symmetrical relationships between respective pattern pieces are preserved following said numerical optimization.

15. The method of any one of claims 12, wherein the constraints comprise linear constraints and bounds constraints.

16. The method of any of claim 10, in which the pattern piece information is output as two-dimensional pattern piece templates for use in manual cutting.

17. The method of any of claim 10, in which the pattern piece information is output as control instructions for a cloth cutting machine.

18. The method of claim 1, further comprising:
modifying one or more aspects or features of the design of the garment by varying the relationship rules relating to said one or more aspects or features.

19. The method of claim 1, wherein the relationship rules define the locations of at least some of said design points in 3D space relative to the locations of at least some of said body regions in 3D space.

20. The method of claim 1, wherein the 3D relationship between a design point and at least one corresponding body region comprises:
(a) the design point being immediately outside a corresponding body region; or
(b) the design point having a predetermined relationship to at least one corresponding body region; or
(c) the design point having a relationship to at least one corresponding body region determined by one or more user-variable parameters.

21. The method of claim 20, wherein said predetermined relationship is a vector relationship.

22. The method of claim 21, wherein the vector relationship is a fixed vector relationship.

23. The method of claim 21, wherein the vector relationship is a proportional vector relationship.

24. The method of claim 1, wherein said body regions are selected from a group comprising: nape, side neck, front neck, shoulder, underarm, nipple, elbow, underarm wrist, top wrist, forearm wrist, back line wrist, groin point, knee and ankle.

25. The method of claim 1, including defining one or more construction lines by reference to said body regions and wherein the relationship rules define 3D relationships between selected design points and selected construction lines.

26. The method of claim 25, wherein a 3D relationship between a design point and at least one construction line comprises:
(a) the design point being at a predetermined point on a construction line; or
(b) the design point having a predetermined relationship to at least one construction line; or
(c) the design point having a predetermined relationship to at least one construction line and at least one predetermined body region; or
(d) the design point having a relationship to at least one construction line determined by one or more user-variable parameters; or
(e) the design point having a relationship to at least one construction line and at least one predetermined body region determined by one or more user-variable parameters.

27. The method of claim 26, wherein said predetermined relationship is a vector relationship.

28. The method of claim 27, wherein the vector relationship is a fixed vector relationship.

29. The method of claim 27, wherein the vector relationship is a proportional vector relationship.

30. The method of any of claim 25, wherein said construction lines are selected from a group comprising: bust/chest, true bust, waist, hip (or seat), one or more hems, centre front line, centre back line.

31. The method of claim 1, wherein the design points include a set of design points relating predominantly or exclusively to the fit of the garment.

32. The method of claim 31, wherein the design points include a further set of design points relating predominantly or exclusively to the style of the garment.

33. The method of any preceding claim 1, in which a 3D bodyscanner is used to capture the data defining a representation of the first body wearing the garment.

34. The method of claim 1, in which a 3D bodyscanner is used to capture the data defining a representation of at least one of the first and second bodies without the garments.

35. The method of claim 1, in which 3D data representing the garments on the first body (or an avatar representing the first body) is obtained from digitised versions of 2D pattern pieces that are virtually sewn into 3D representations of the garment.

36. The method of claim 33, in which 3D data representing the garments on the first body (or an avatar representing the first body) is also obtained from digitized versions of pattern pieces that are virtually sewn into 3D representations of the garments, followed by forming a combination of the data captured by the 3D bodyscanner and said 3D data obtained from digitized versions of the pattern pieces.

37. The method of claim 1, in which the body regions on the first and/or second body are identified automatically.

38. The method of claim 37, in which the body regions of a given subject are identified by: (a) manually identifying the body regions on a significant sample of 3D representations of male and female bodies; and (b) warping the shape and dimensions of the nearest match from the sample to the shape and dimensions of the new subject, the body region locations being carried by the warping process exactly or very close to the appropriate location or the body regions on the subject.

39. The method of claim 38, in which some or all of the sample are virtual figures.

40. The method of claim 39 in which the matching of the subject to the sample is effected by principal component analysis.

41. The method of claim 1, in which the garment design is created on-screen in conjunction with a virtual representation of a person of said first size and shape.

42. The method of claim 1, including the further step of assessing the suitability of the design, or of the design, fabric and accessory combination, for any potential wearer of these clothes by matching the 3D shape of the potential wearer to the 3D shape of a closest member of a set of 3D sample body shapes, said suitability having first been assessed for each member of the sample set.

43. The method of claim 42, in which an eigen body representation is used to provide a measure of closeness.

44. A method of producing pattern piece information from a three-dimensional representation of a garment, said three-dimensional representation having been formed by modifying data defining an original set of pattern pieces representing an original garment of one size and shape to produce data defining a modified set of pattern pieces representing a modified garment of another size and/or shape;

the method comprising performing an unwrapping operation on the 3D representation of the modified garment, the unwrapping operation comprising (a) defining parameters and constraints of each of the original pattern pieces in the garment, and (b) performing a numerical optimization to determine values of the parameters which minimize the internal energy in each pattern piece in the modified garment within the constraints defined in relation to the original pattern pieces.

45. A data processing system programmed to perform the method claimed in claim 1.

46. A data carrier bearing data defining a program for performing the method of claim 1.

47. A computer program for performing the method of claim 1.

48. A system for use in implementing the method of claim 1, the system comprising a central garment database holding in a standard format that data defining the shape and construction of a plurality of garments which is necessary in performing said method.

49. The system of claim 48, further including a central textile database holding data in a standard format defining characteristics of a plurality of garment materials.

50. A system according to claim 49, in which the central garment database and the central textile database are each in communication with a plurality of sources of data, and said data is held and communicated in a common format and/or according to common protocols.

51. A system according to claim 48, further including means for communicating with one or more remote computers, the or each remote computer being operable to merge data about the garments and their constituent parts held on the central database with data relating to the second body held on the remote computer.

52. A system according to claim 51, in which personal data for a given customer is permanently stored only on a data carrier within the possession or control of that customer.

53. A data carrier for use on the system claimed in claim 52, the data carrier bearing data defining the body of a single customer.

54. The method of claim 44, in which each pattern piece is represented as a triangulated mesh, and the optimization is performed by minimizing internal energy in the modified mesh.

55. The method of claim 44, in which the energy measure is biased to favour dimensions being slightly increased as compared with being slightly reduced.

56. The method of claim 44, in which said parameters relate to shapes within the garment and said constraints include constraints ensuring that adjacent modified pattern pieces have edges that match in a manner comparable to the original pattern pieces.

57. The method of claim 56, in which said parameters include scaling parameters defining relative scaling on one ore more axes, and shape parameters defining means of removing fullness.

58. The method of claim 57, in which the scaling parameters include a first parameter for overall scaling of the pattern piece in both u and v directions, a second parameter for relative scaling on the v axis only, and a third parameter for relative scaling between two defined regions of the pattern piece.

59. The method of claim 57, in which the shape parameters define dimensions of one or more darts and/or tucks and/or gathers.

60. The method of any of claims 44, wherein the constraints defined for each of the original pattern pieces are selected so as to maintain predetermined relationships between respective pattern pieces following said numerical optimization.

61. The method of claim 60, wherein the constraints include constraints selected to ensure that predetermined linear edge dimensions of adjacent pattern pieces remain equal or in predetermined relationships following said numerical optimization.

62. The method of claim 60, wherein the constraints include constraints selected to ensure that predetermined symmetrical relationships between respective pattern pieces are preserved following said numerical optimization.

63. The method of claim 44, wherein the constraints comprise linear constraints and bounds constraints.

* * * * *